(12) United States Patent
Ramani et al.

(10) Patent No.: US 8,429,174 B2
(45) Date of Patent: Apr. 23, 2013

(54) METHODS, SYSTEMS, AND DATA STRUCTURES FOR PERFORMING SEARCHES ON THREE DIMENSIONAL OBJECTS

(75) Inventors: Karthik Ramani, West Lafayette, IN (US); Natraj Iyer, West Lafayette, IN (US); Kuiyang Lou, West Lafayette, IN (US); Subramaniam Jayanti, Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 3251 days.

(21) Appl. No.: 10/763,741

(22) Filed: Jan. 23, 2004

(65) Prior Publication Data
US 2004/0249809 A1 Dec. 9, 2004

Related U.S. Application Data

(60) Provisional application No. 60/442,373, filed on Jan. 25, 2003.

(51) Int. Cl.
*G06F 17/30* (2006.01)
*G06F 7/00* (2006.01)

(52) U.S. Cl.
USPC ........... 707/749; 707/755; 707/756; 345/419; 345/420; 345/473; 382/118

(58) Field of Classification Search ........................ None
See application file for complete search history.

(56) References Cited

U.S. PATENT DOCUMENTS

| 5,760,778 | A | * | 6/1998 | Friedman ....................... 345/420 |
| 6,016,487 | A | * | 1/2000 | Rioux et al. ....................... 707/2 |
| 6,133,921 | A | * | 10/2000 | Turkiyyah et al. ............. 345/420 |
| 6,329,994 | B1 | * | 12/2001 | Gever et al. .................... 345/473 |
| 6,347,313 | B1 |  | 2/2002 | Ma et al. |

(Continued)

FOREIGN PATENT DOCUMENTS

| EP | 1158454 A2 | 11/2001 |
| EP | 1202187 A2 | 5/2002 |

(Continued)

OTHER PUBLICATIONS

Elad, Michael, et al., "Content Based Retrival of VRML Objects—An Iterative and Interactive Approach", *Proceeding of the Eurographics Worshop* in Manchester, United Kingdom, (Sep. 8-9, 2001), 107-118.

(Continued)

*Primary Examiner* — Usmaan Saeed
*Assistant Examiner* — Dung K Chau
(74) *Attorney, Agent, or Firm* — Schwegman Lundberg Woessner P.A.

(57) ABSTRACT

Techniques are provided for searching on three dimensional (3D) objects across large, distributed repositories of 3D models. 3D shapes are created for input to a search system; optionally user-defined similarity criterion is used, and search results are interactively navigated and feedback received for modifying the accuracy of the search results. Search input can also be given by picking 3D models from a cluster map or by providing the orthographic views for the 3D model. Feedback can be given by a searcher as to which models are similar and which are not. Various techniques adjust the search results according to the feedback given by the searcher and present the new search results to the searcher.

15 Claims, 38 Drawing Sheets

U.S. PATENT DOCUMENTS

| | | | | |
|---|---|---|---|---|
| 6,549,201 | B1* | 4/2003 | Igarashi et al. | 345/423 |
| 6,801,641 | B2* | 10/2004 | Eraslan | 382/118 |
| 6,825,838 | B2* | 11/2004 | Smith et al. | 345/419 |
| 2002/0012454 | A1* | 1/2002 | Liu et al. | 382/118 |
| 2002/0051576 | A1 | 5/2002 | Choi et al. | |
| 2003/0058242 | A1* | 3/2003 | Redlich | 345/427 |
| 2003/0071810 | A1* | 4/2003 | Shoov et al. | 345/420 |

FOREIGN PATENT DOCUMENTS

| | | | |
|---|---|---|---|
| EP | 1202187 | A2 | 5/2002 |
| GB | 2349493 | A | 11/2000 |
| GB | 2349493 | A | 11/2000 |
| JP | 04246772 | | 9/1992 |
| JP | 2001338294 | | 12/2001 |
| JP | 2003518294 | | 6/2003 |
| WO | WO-01/46857 | A2 | 6/2001 |
| WO | WO-0146857 | A2 | 6/2001 |

OTHER PUBLICATIONS

Tal, Ayellet, "Retrieval of Three-Dimensional Models with Relevance Feedback", http://www.cs.princeton.edu/gfx/shape01/abstracts.html, Workshop on Shape-Based Retrieval and Analysis of 3D Models, (2001).

"International Search Report for PCT Application No. PCT/US2004/001962", (Jul. 21, 2005), 9 pgs.

Abbasi, S., "Affine-Similar Shape Retrieval: Application to Multiview 3-D Object Recognition", *IEEE Transactions on Image Processing*, 10(1), (Jan. 2001),131-139.

Alber, I. E., "Retrieval of Multi- and Hyperspectral images using an interactive Relevance Feedback Form of Content—Based Image Retrieval", *Proceedings of SPIE—The International Society for Optical Engineering*, vol. 4384, (2001), 56-66.

Ambler, A. P., "A Versatile Computer-Controlled Assembly System", *Proceedings of Third International Joint Conference on Artificial Intelligence, Section II Robot Implementations*, (1973), 298-307.

Andrews, W. S., "An Application of Artificial Neural Network Technology to Satelite Imagery Data to Support Search and Rescue Operations", *Canadian Aeronautics and Space Journal*, 45(4), (1999), 335-341.

Ankerst, M., "3D Shape Histograms for Similarity Search and Classification in Spatial Databases", *Proceedings 6th International Symposium on Spatial Databases (SSD'99), Lecture Notes in Computer Science*., (1999), 207-226.

Arcelli, C. "Euclidean Skeleton Via Centre-of-Maximal-Disc Extraction", *Image and Vision Computing*, 11(3), (1993),163-173.

Ascher, M. et al., "A Methodology for automatic retrieval of similarly shaped machinable components", *IEEE International Conference on Systems, Man, and Cybernetics*, 5, (2001), 2840-2845.

Attali, D., et al., "Computing and Simplifying 2D and 3D Continuous Skeletons", *Computer Vision and Image Understanding*, 67(3)., Article IV970536, (1997), 261-273.

Balasubramaniam, M., "Generating 5-Axis NC Roughing Paths Directly From a Tessellated Representation", *Computer-Aided Design*, 32, (2000), 261-277.

Ballard, D. H., et al., "Chapter 11—Matching", *In: Computer Vision*, Prentice-Hall, Inc., Englewood Cliffs, NJ,(1982), 352-382.

Ballard, D. H., et al., "Chapter 8—Representation of Two-Dimensional Geometric Structures", *In: Computer Vision*, Prentice-Hall, Inc., Englewood Cliffs, NJ,(1982), 231-263.

Ballard,, D. H., et al., "Chapter 9—Representations of Three-Dimensional Structures", *In: Computer Vision*, Prentice-Hall, Inc., Englewood Cliffs, NJ,(1982), 264-311.

Bardinet, E., "Structural Object Matching", *Technical Report DECSAI-000303, Department of Computer Science and AI, University of Granada*, (2000), 9 pgs.

Barrow, H. G., "Subgraph Isomorphism, Matching Relational Structures and Maximal Cliques", *Information Processing Letters*, 4(4), (1976), 83-84.

Berchtold, S., et al., "S3: Similarity Search in CAD Database Systems", *ACM SIGMOD International Conference on Management of Data (SIGMOD '97)*, Tucson, AZ,(1997),564-567.

Berchtold, S., et al., "Section Coding: A Similarity Search Technique in the Car Manufacturing Industry", *Integrated Design and Process Technology, IDPT*-vol. 2,(1998),256-263.

Berchtold, S. , et al., "Section Coding: Ein Verfahren zur Ahnlichkeitssuche in CAD-Datenbanken [Section Coding: a Technique for Similarity Search in CAD Databases", *International Conference on Databases in Office, Engineering and Science*, (1997),152-171.

Berchtold, S., et al., "Using Extended Feature Object for Partial Similarity Retrieval", *The VLDB Journal*, vol. 6, (1997), 333-348.

Berg, E. V. D., "Web-Based Collaborative Modeling With SPIFF", *Delft University of Technology*, (2000),1-52.

Bidarra, R., "Collaborative Modeling With Features", *2001 ASME Design Engineering Technical Conferences*, (2001), 1-11.

Borgefors, G., "Distance Transformations in Arbitrary Dimensions", *Computer Vision, Graphics, and Image Processing*, 27, (1984), 321-345.

Bouet, M. , et al., "Visual Content Based Retrieval in an Image Database with Relevant Feedback", *IEEE Computer Society, Proceedings of the International Workshop on Milti-Media Database Management Systems*, Dayton, OH, USA, (Aug. 5, 1998), 98-105.

Bresenham, J. E., "Algorithm for Computer Control of a Digital Plotter", *IBM Systems Journal*, 4 (1) (1965), 25-30.

Bunke, H., "Inexact Graph Matching for Structural Pattern Recognition", *Pattern Recognition Letters*, 1(4), (1983), 245-253.

Canterakis, N.,"3D Zernike Moment and Zernike Affine Invariants for 3D Image Analysis and Recognition", *Proceedings of 11th International Conference on Image Analysis*, (1999), 8 pgs.

Chang, C.-H., "Enabling Concept-Based Relevance Feedback for Information Retrieval on the WWW", *IEEE Transactions on Knowledge and Data Engineering*, 11(4), 1999 , 595-609.

Chen, C., et al., "Content-Based Image Visualization", *Proceedings of the IEEE International Conference on Information Visualization*, Alamitos, CA, USA, (2000), 13-18.

Chen, L.-L., "Parting Directions for Mould and Die Design", *Computer Aided Design*, 25(12), (1993), 763-768.

Chou, H., et al., "A Flexible Interface Between Two-Dimensional Representation and Three-Dimensional Representation", *International Conference on Computer Integrated Manufacturing, IEEE Computer Society, Center for Interactive Computer Graphics*, (1988), 160-170.

Christmas, W. J., "Structural Matching in Computer Vision Using Probabilistic Relaxation", *IEEE Transations on Pattern Analysis and Machine Intelligence*, vol. 17, No. 8, (1995), 749-764.

Cohen-Or, D., "3D Line Voxelization and Connectivity Control", *IEEE Computer Graphics and Applications*, (Nov./Dec. 1997), 80-87.

Corney, J., "Coarse Filters for Shape matching", *IEEE Computer Graphics and Applications*, (2002), 65-74.

Cross, A., et al., "Genetic Search for Structural Matching", *Lecture Notes in Computer Science, 1064, Proceedings of the 4th European Conference on Computer Vision*, vol. 1, (1996), 514-525.

Cross, A. D., "Inexact Graph Matching Using Genetic Search", *Pattern Recognition*, 30(6), (1997),953-970.

Cybenko, G., "Pattern Recognition of 3D CAD Objects: Towards an Electronic Yellow pages of Mechanical Parts", *Smart Engineering Systems Design*, vol. 1, (1997), 1-13.

Cyr, C. M., "3D Object Recognition Using Shape Similiarity-Based Aspect Graph", *Proceedings of International Conference on Computer Vision*, (2001), 254-261.

Di Baja, G. S., et al., "(3,4)-Weighted Skeleton Decomposition for Pattern Representation and Description", *Pattern Recognition*, 27(8), (1994), 1039-1049.

Dimri, J., "Handling Sectional Views in Volume-based Approach to Automatically Construct 3D Soild from 2D Views", *Proceedings of the Geometric Modeling and Processing, IEEE Computer Society*, (2004), 1-12.

Dori, D., "Sparse Pixel Vectorization: An Algorithm and Its Performance Evaluation", *IEEE Trans. on Pattern Analysis and Machine Intelligence*, 21(3), (1999), 202-215.

Efthimiadis, E., "Interactive Query Expansion: A User-Based Evaluation in a Relevance Feedback Environment", *Journal of the American Society for Information Science*, 51(11), (2000), 989-1003.

Eggli, D. L., "Sketching with Constraints", *Master Thesis, University of Utah, Department of Computer Science*, (Jun. 1994), 1-61.

El-Mehalawi, M., "A Database System of Mechanical Components Based in Geometric and Topological Similarity. Part I: Representation", *Computer Aided Design 35*, (2003), 83-94.

El-Mehalawi, M., "A Database System of Mechanical Components Based on Geometric and Topological Similarity. Part II: Indexing, Retrieval, Matching, and Similarity Assessment", *Computer Aided Design 35*, (2003), 95-105.

Eriksson, F., "On the Measure of Solid Angles", *Mathematics Magazine*, 63(3) (1990), 184-187.

Flynn, P. J., "CAD-Based Computer Vision: From CAD Models to Relational Graphs", *IEEE Transactions on Pattern Analysis and Machine Intelligence*, 13(2), (1991), 114-132.

Fuijimoto, A., et al., "ARTS: Accelerated Ray-Tracing System", *IEEE Computer Graphics and Applications*, 6(4), 1986, 16-26.

Funkhouser, T., "A Search Engine for 3D Models", *ACM Transactions on Graphics*, (2003), 1-28.

Garza, G., et al., "Synthesis of Solid Models of Polyhedra from their Orthogonal Views Using Logical Representations", *Expert System with Applications*, 14, (1998), 91-108.

Günter, S., "Self-organizing map for clustering in the graph domain", *Pattern Recognition Letters 23*, (2002), 405-417.

Guttman, A., "R-Trees a Dynamic Index Structure for Spatial Searching", *Proceedings ACM SIGMOD International Conference on Management of Data*, (1984), 47-57.

Hilaga, M., "Topology matching for fully Automatic Similarity Estimation of 3D Shapes", *Proceedings of ACM SIGGRPAH 2001*, (Aug. 2001),203-212.

Horaud, R. et al., "Structural Matching for Stereo Vision", *Proceedings 9th International Conference Pattern Recognition*, (1988), 439-445.

Huang, Z., et al., "High-level Feature Recognition Using Feature Relationship Graphs", *Computer Aided Design 34*, (2002), 561-582.

Igarashi, T., et al., "Teddy: A Sketching Interface for 3D Freeform Design", *Proceedings ACM SIGGRAPH 99*, (1999), 409-416.

Ip, C. Y., et al., "Using Shape Distributions to Compare Solid Models", *Proceedings of Solid Modeling*, (2002),273-280.

Iyer, S. "Identification and Ranking of Similar Parts in Agile Manufacturing", *Master Thesis, Graduate School, State University of New York at Buffalo*, (1995), 130 pgs.

Kao, C.-Y., "Extraction of 3D Object Features from CAD Boundary Representation Using the Super Relation Graph Method", *IEEE Transactions on Pattern Analysis and Machine Intelligence*, 17(12), (1995), 1228-1233.

Kaufman, A., "3D Scan-Conversion Algorithms for Voxel-Based Graphics", *Interactive 3D Graphics*, (Oct. 23-24, 1986),45-75.

Kaufman, A., "An Algorithm for 3D Scan-Conversion of Polygons", *EUROGRAPHICS' 87*, (1987), 197-208.

Kazhdan, M., "Harmonic 3D Shape Matching", *SIGGRAPH 2002, Technical Sketches*, (2002), 191.

Keim, D. A., "Efficient Geometry-based Similarity of 3D Spatial Databases", *Proceedings of SIGMOD '99, Philadelphia, PA*,(1999),419-430.

Kim, D. H., et al., "Graph Representation by Medial Axis Transform for 3D Image Retrieval", *Proceedings of SPIE, vol. 4298—Three Dimensional Image Capture and Applications IV*, (2001), 223-230.

Kohonen, T., "Chapter 3. The Basic SOM", *In: Self-Organizing Maps, Springer Series in Information Sciences, Springer Verlag, Berlin*,(1995),86-103.

Kolak, O., et al., "On Ranking and Organizing Web Query Results", *Proceedings, IEEE Workshop on Knowledge and Data Engineering Exchange (KDEX '99)*, (1999), 26-33.

Koutamanis, A., et al., "Automated Recognition of Architectural Drawings", *Pattern Recognition*, 1992, vol. 1, *Conference Computer Vision and Applications proceedings, IEEE Comp. Soc.*, (1992), 660-663.

Kriegel, H.-P., et al., "3D Similarity Search by Shape Approximation", *Proceedings of the Fifth International Symposium on Large Spatial Databases (SSD '97), Lecture Notes in Computer Science*, (1997), 11-28.

Kriegel, H.-P., "Approximation-Based Similarity Search for 3-D Surface Segments", *GeoInformatica 2:2*, (1998), 113-147.

Kriegel, H.-P., "Spatial Data Management for Computer-Aided Design", *Proceedings ACM SIGMOD, International Conference on Management of Data (SIGMOD '01), Santa Barbara, CA*, (2001), 614.

Lai, C. P., et al., "Detection of Dimension Sets in Engineering Drawings", *Proceedings of the Second International Conf. on Tsukuba, IEEE Computer Society*, (1993), 606-613.

Lee, H. K., "Applying Neural Network to Combining the Heterogeneous Features in Content-Based Image Retrieval", *Proceedings SPIE Applications of Neural Networks in Image Processing VI*, vol. 4305-13, (2001), 81-89.

Lee, J. Y., et al., "Network-centric Feature-based Modeling", *IEEE Proceedings of the 7th Pacific Conference on Computer Graphics and Applications*, (1999), 280-289.

Liu, Shi-Xia, "A Matrix-Based Approach to Reconstruction of 3D Objects from Three Orthographic Views", *The Eighth Pacific Conference on Computer Graphics and Applications*, (2000), 254-261.

Lozano, S, et al., "Training Feedforward Neural Networks Using a Genetic Line Search", *Artificial Neural Networks for Intelligent Engineering (ANNIE '97)*, ( 1997), 119-124.

Markowsky, G., et al., "Fleshing Out Wire Frames", *IBM Journal of Research and Development*, 24 (5), (1980),582-597

McWherter, D. "An Approach to Indexing Databases of Graphs", *Proceedings of the 27th VLDB Conference*, (2001), 19 pgs.

McWherter, D., "Database Techniques for Archival of Solid Models", *Proceedings of the Sixth ACM Symposium on Solid Modeling and Applications*, (2001), 78-87.

McWherter, David, "Solid Model Databases: Techniques and Empirical Results", *ASME Journal of Computing and Information Science in Engineering*, 1(4), (2001), 300-310.

Meeran, S., "A generic approach to recognising isolated, nested and interacting features from 2D drawings", *Computer Aided Design 31*, (1999), 891-910.

Messmer, B. T., "Subgraph Isomorphism in Polynomial Time", *Technical Report IAM 95-003, University of Bern, Institute of Computer Science and Applied Mathematics, Bern, Switzerland*, (1995), 1-33.

Mestetskii, L M., "Skeletonization of Polygonal Figures Based on the Generalized Delaunay Triangulation", *Programming and Computer Software*, 25(3), (1999),131-142.

Min, Patrick, et al., "A 2D Sketch Interface for a 3D Model Search Engine", *SIGGRAPH 2002 Technical Sketches*, (Jul. 2002),138.

Montanari, U., "A Method for Obtaining Skeletons Using a Quasi-Euclidean Distance", *Journal of the Association for Computing Machinery*,15(4), (1968), 600-624.

Motzkin, T. S., "Maxima for Graphs and a New Proof of a Theorem of Turan", *Canadian Journal of Math*, 17, (1965), 533-540.

Muneesawang, P., "Multiresolution-Histogram Indexing and Relevance Feedback Learning for Image Retrieval", *IEEE International Conference on Processing*, vol. 2, (2000), 526-529.

Myers, R., "Bayesian Graph Edit Distance", *IEEE Transactions on Pattern Analysis and Machine Intelligence*,22( 6), (Jun. 2000), 628-635.

Nagasaka, Y., et al., "Extracting and Learning Geometric Features based on a Voxel Mapping Method for Manufacturing Design", *Proceedings of IPMM2001*, (2001),1-10.

Nakazato, M., et al., "3D MARS: Immersive Virtual Reality for Content-Based Image Retrieval", *IEEE International Conference on Multimedia and Expo, Piscataway, NJ, USA*,(Aug. 22, 2001),44-47.

Novotni, M., "A Geometric Approach to 3D Object Comparison", *SMI 2001 International Conference on Shape Modeling and Applications*, (2001),167-175.

Ohbuchi, R., "Shape-Similarity Search of Three-Dimensional Models Using Parameterized Statistics", *Proceedings of the Pacific Graphics*, (Oct. 9-11, 2002), 1-10.

Osada, R., et al., "Matching 3D Models with Shape Distributions", *Proceedings of the International Conference on Shape Modeling & Applications*, (2001),154.

Osada, R., "Shape Distributions", *ACM Transactions on Graphics*, 21(4), (2002), 807-832.

Pajdla, T., et al., "Recovering CAD Models from scanned Data", *Presented at Electronic Imaging and the Visual Arts (EVA 98)*, (Nov. 1998), 10 pgs.

Palagyi, K., "A 3D 6-subiteration thinning algorithm for extracting medial lines", *Pattern Recognition Letters 19*, (1998), 613-627.

Papadopoulos, A. N., et al., "Structure-Based Similarity Search with Graph Histograms", *Database and Expert Systems Applications, 10th International Workshop on Database and Expert Systems Applications, IEEE Computer Society*, (1999),174-178.

Peabody, M., "Clustering Solid Models for Database Storage", *Technical Report DU-MCS-01-04*, (Jun. 2001),1-18.

Peabody, M., "Clustering Techniques for Databases of CAD Models", *Thecnical Report DU-MCS-01-01*, (Jun. 2001),1-17.

Pelillo, M., et al., "Continuous-Based Heuristics for Graph and Tree Isomorphisms, with Application to Computer Vision", *Approximation and Complexity in Numerical Optimization: Continuous and Discrete Problems.*, Kluwer Academic Publishers, Boston, MA,(1999),1-24.

Pelillo, M., "Matching Hierarchical Structures Using Association Graphs", *IEEE Transactions on Pattern Analysis and Machine Intelligence*, 21(11), (1999),1105-1120.

Pineda, L., "A Model for Multimodal Reference Resolution", *Computational Linguistics*, 26(2), (2000), 139-193.

Ramesh, M., "Feature Based Shape Similarity Measurement for Retrieval of Mechanical Parts", *Journal of Computing and Information Science in Engineering*, 1 (2001), 245-256.

Rea, H. J., "Part-Sourcing in a Global Market", *Proceedings of ICeCE, International Conference on eCommerce Engineering: New Challenges for Global Manufacturing in the 21st Century*, (Sep. 2001), 1-8.

Reeves, A. P., "Three Dimensional Shape Analysis Using Moments and Fourier Descriptors", *IEEE Transactions on Pattern Analysis and Machine Intelligence*, 10(6), (1988), 937-943.

Reinders, F., "Skeleton Graph Generation for Feature Shape Description", *Data Visualization 2000, Euroraphics*, (2000),73-82.

Roussinov, D. G., et al., "Information Navigation by Clustering and Summarizing Query Results", *IEEE Proceedings of the 33rd Annual Hawaii International Conference on System Sciences*, Piscataway, NJ, USA,(2000), 797-806.

Roussopoulos, N., "Nearest Neighbor Queries", *Proceedings of ACM Sigmod*, (1995),71-79.

Sainz, M., "Carving 3D Models from Views", *5th IASTED International Conference Computer Graphics and Imaging (CGIM 2002)*, (2002),144-149.

Sanfeliu, A., et al., "A Distance Measure Between Attributed Relational Graphs for Pattern Recognition", *IEEE Transactions on Systems, Man, and Cybernetics*, vol. SMC-13, No. 3, (May/Jun. 1983),353-362.

Saupe, D., et al., "3D Model Retrieval With Spherical Harmonics and Moments", *Proceedings of the 23rd DAGM-Symposium on Pattern Recognition*, (2001), 392-397.

Schettini, R, et al., "Content-based Color Image Retrieval with Relevance Feedback", *1999 International Conference on Image Processing, 1999. ICIP 99. Proceedings.*, (1999),75-79.

Soni, S., et al., "Handling Solids of Revolution in Volume-Based Construction of Solid Models From Orthographic Views", *Journal of Computer and Information Science and Engineering*, 3(3), (2003),250-259.

Srinivas, G., et al., "Retrieval of Similarly Shaped Parts From a CAD Database", *IEEE International Conference on Systems, Man, and Cybernetics*, 3, (1998), 2809-2814.

Suh, T. J., "Two Phase 3D Object Reconstruction from Two-View Drawings", *IEICE Transactions Inf . & Syst.*, vol. E82-D, No. 7, (1999), 1093-1100.

Sun, T.-L., "Shape Similarity Assessment of Polyhedral Parts Based on Boundary Models", *International Journal of Product Research*, 38(18), (2000), 4655-4670.

Suzuki, Motofumi , "A Similarity Retrieval of 3D Polygonal Models Using Rotation Invariant Shape Descriptors", *IEEE International Conference on Systems, Man, and Cybernetics*, 4, (2000), 2946-2954.

Svensson, S., et al., "Curve Skeletonization of Surface-like Objects in 3D Images Guided by Voxel Classification", *Pattern Recognition Letters*, 23(12),(2002), 1419-1426.

Tangelder, J. W., et al., "Polyhedral Model Retrieval Using Weighted Point Sets", *Shape Modeling International*, 2003, (2003),119-129.

Tatemura, J., "Graphical Relevance Feedback: Visual Exploration in the Document Space", *Proceedings of the 2000 IEEE International Symposium on Visual Languages (VL '00)*, (2000),39-46.

Ullmann, J. R., "An Algorithm for Subgraph Isomorphism", *Journal of the Association for Computing Machinery*, 23(1) (1976), 31-42.

Vesanto, J., "Using SOM in Data Mining", *Licentiate's Thesis, Helsinki University of Technology, Department of Computer Science and Engineering*, (Apr. 2000), 50 pgs.

Vranic, D. V., "3D Model Retrieval", *Computer Graphics and Image Processing (CGIP)*, (2001), 2 pgs.

Vranic, D. V., et al., "3D Model Retrieval", *Proceedings of SCCG 2000*, (2000), 5 pgs.

Vranic, D. V., et al., "3D Shape Descriptor Based on 3D Fourier Transform", *Proceedings of the EURASIP Conference on Digital Signal Processing for Multimedia Communication and Service (ECMCS 2001)*, 2001 , 271-274.

Vranic, D. V., "Tools for 3D-Object Retrieval Karhunen-Loeve Transform and Spherical Harmonics", *Proc. of the IEEE 2001 Workshop on Multimedia Signal Processing*, (2001), 293-298.

Wenyin, L., "Impact of Sparse Pixel Vectorization Algorithm Parameters on Line Segmentation Preformance", *Proceedings 3rd IAPR Workshop on Graphics Recognition*, (1999), 323-330.

Woo, T. C., "Visibility Maps and Spherical Algorithms", *Computer-Aided Design*, 28(1), (1994), 6-16.

Xavier, P. G., "Content-Based Search on a Database of Geometric Models", *Sandia Report*, (1998),1-35.

Zhang, Nian , et al., "A Comparative Study of Neural Networks Based Learning Strategies for Collective Robotic Search Problem", *Proceedings of SPIE* vol. 4390, (2001),224-235.

Zhang, C., "An Active Learning Framework for Content Based Information Retrieval", *Electrical & Computer Engineering, Carnegie Mellon University*, 1-28.

Zhao, T., "Visual Keyword Image Retrieval Based on Synergetic Neural Network for Web-based Image Search", *Real-Time Systems, 21, Kluwer Academic Publisher*, (2001),127-142.

"Japanese Application No. 2006-502981, Notice of Allowance mailed Apr. 27, 2010", 3 Pgs.

"Japanese Application Serial No. 2006-502981, Office Action Mailed Jan. 29, 2010", 44 pgs.

"Japanese Application Serial No. 2006-502981,Office Action mailed Sep. 16, 2009", 15 pgs.

K., L, et al., Content Based Three-Dimensional Engineering Shape Search,Proc. of the 20th Int'l Conf. on data engineering, (Mar. 30, 2004), 754-765.

Kinbara, Fumikazo, et al., "Retreiving silhouette image based on user's point of view by the shape decomposition", The journal of information processing society of Japan,Japan Publiehed by Information processing society of japan vol. 36(12)., (Dec. 15, 1995), 2800-2810.

* cited by examiner

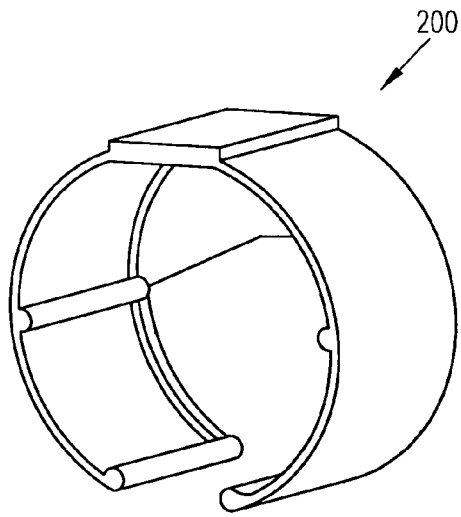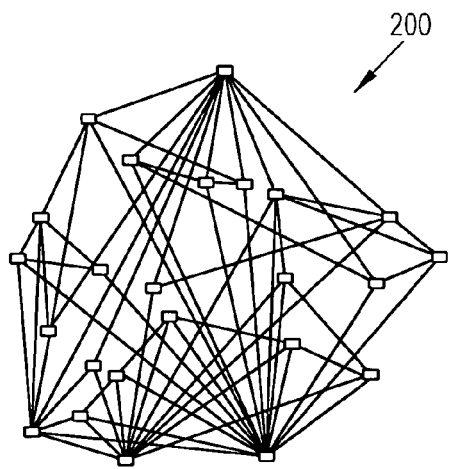
FIG. 2A  FIG. 2B
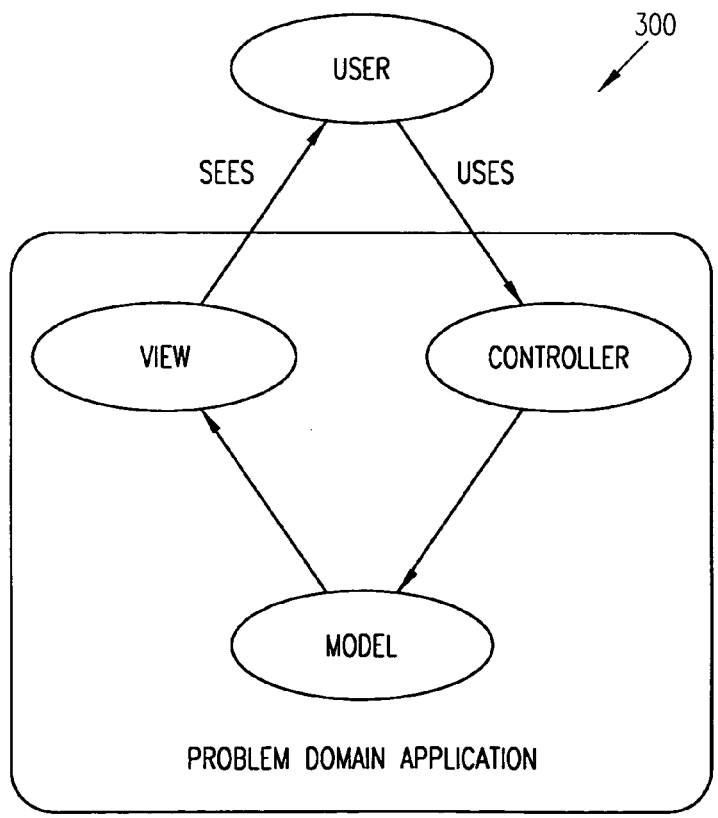
FIG. 3

1400

```
Read in B-Rep model M
Assign FaceIDs F to all faces in M
Assign EdgeIDs E to all faces in M
Set voxel size S
Find B-Rep model bounding box
Find discrete bounding box coordinates X, Y ,Z
Create voxel text file T for i in X in increment of S:
  for j in Y in increment of S:
    for k in Z in increment of S:
                construct voxel v of size S using ACIS
                test intersection of v with M using ACIS
                if v intersects with M:
                        store "1" in T
                        find faces intersecting with v using ACIS
                        find edges intersecting with v using ACIS
                        store F and E for all intersecting faces in v
                else:
                        store "0" in T
```

FIG. 14 x – Mark as 'Delete'
d – Diameter of swept cylinder

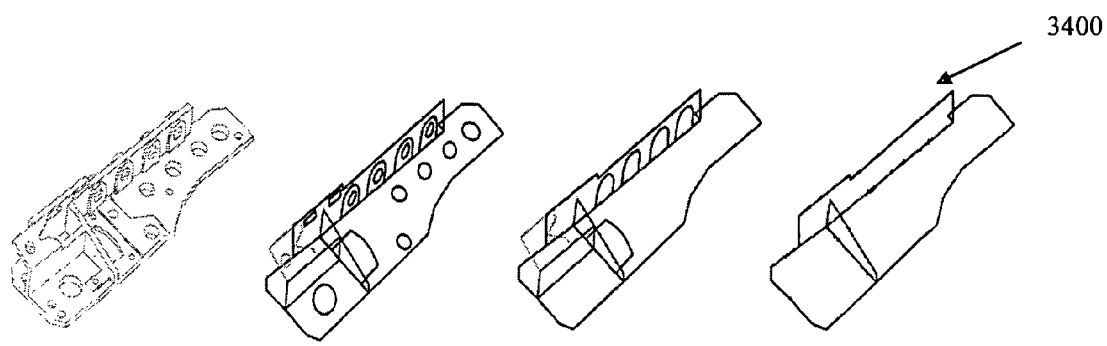
FIG. 34
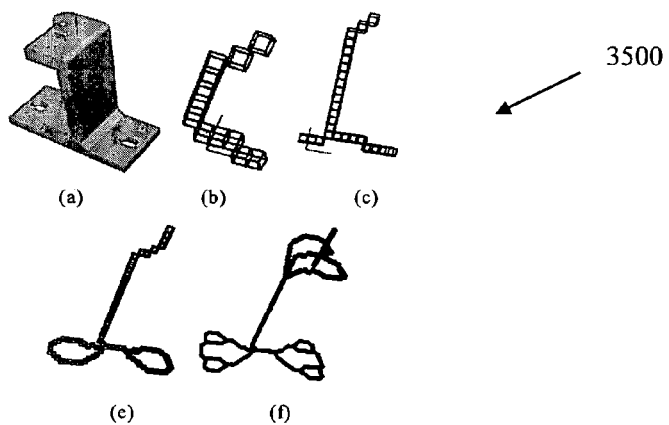
FIG. 35: (a) 3D model, (b) Levels of detail (LOD) for n = 2, (c) LOD for n = 3, (d) LOD for n = 4, (d) LOD for n = 5
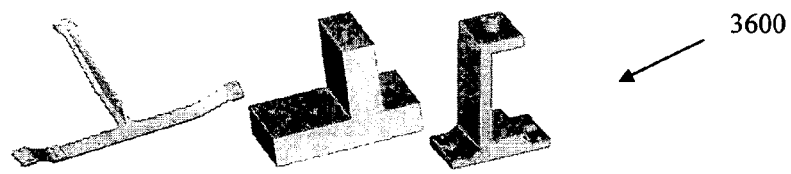
FIG. 36

4000

- start()                    // Find the Starting voxel
  {
    - Find a terminal node
    - Else choose top:left:back most voxel
  }
- march()
    - for each next voxel
    - {
        - findNeighbors()
        - If(nNeigh == Nil)    // nNeigh – Number of Neighbors
            - NODE; Terminate
        - If(nNeigh == NORMAL Neighbors)
            - Change voxel content to currentEntityID
            - Push voxel into current entity's stack
            - Iterate
        - If(nNeigh > NORMAL Neighbors) {
            - Check isNode() for all neighbors
            - Find the node and step into it
            - Push the current node to the Node stack
            - For all branch {
                        march along()
            - }
        - findLoopEntities(){          // Simple Loops
                    Trace back the previous nodes
                    Add the corresponding entities to the loop
            - }
        - Pop node from the current node stack
        - iterate
    }

FIG. 40

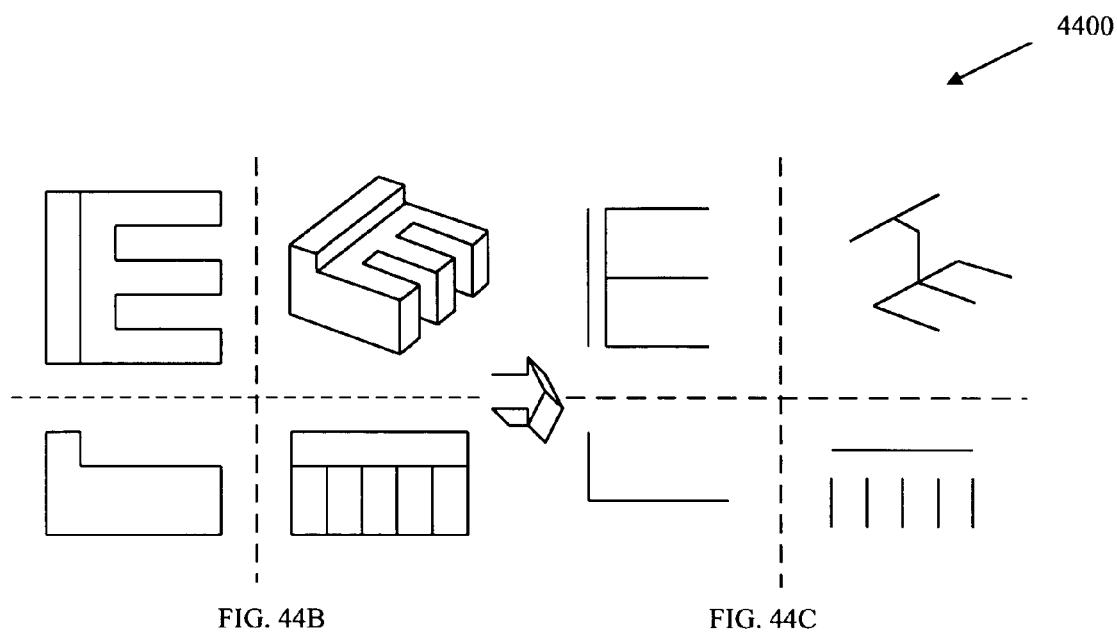
FIG. 44B          FIG. 44C
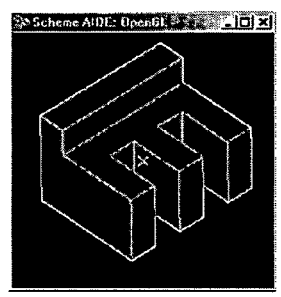
Fig. 44A
Actual 3D Model
FIG. 44

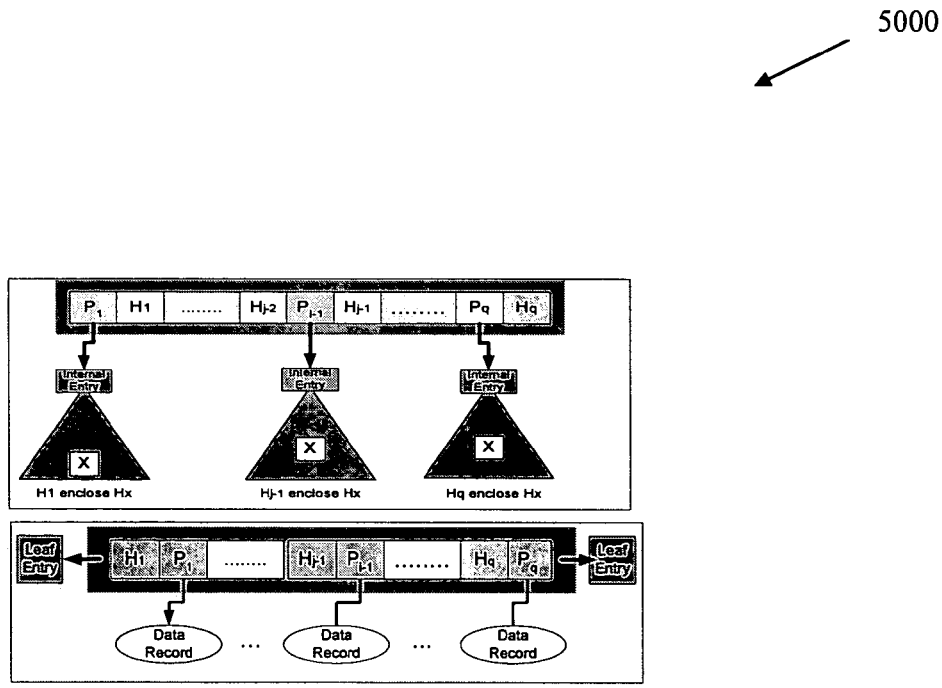
FIG. 50
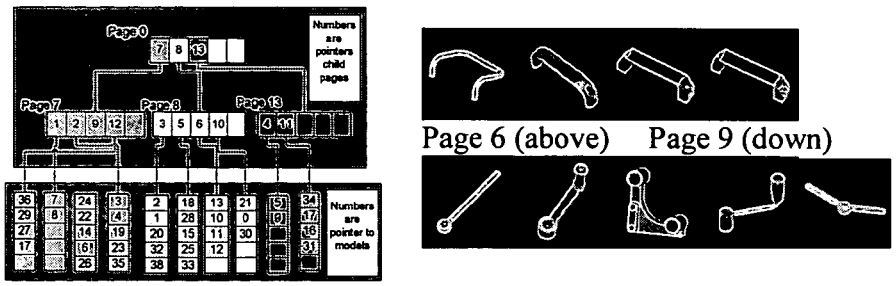
Figure 51A    Figure 51B
FIGS. 51A and 51B

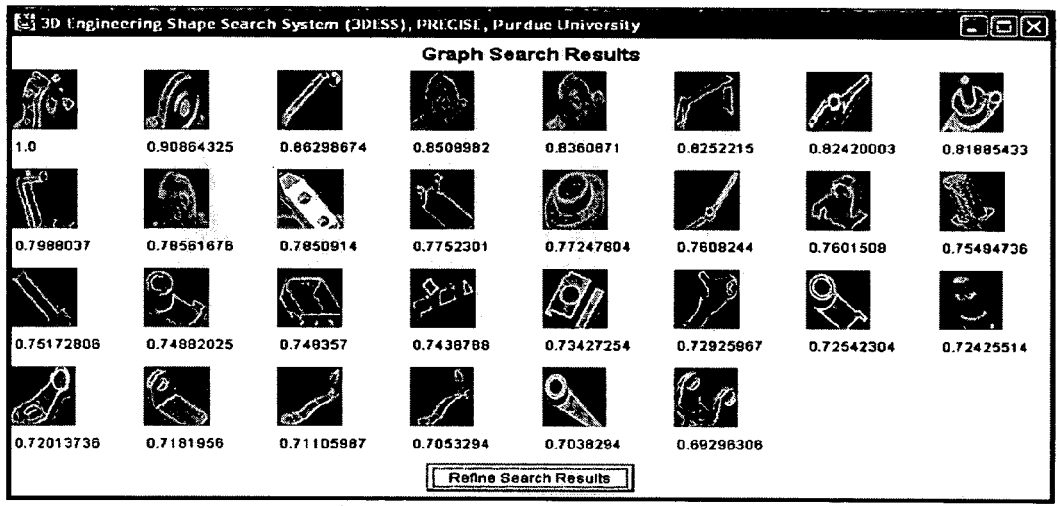
*(i) Results from skeletal graph based search (First Step)*
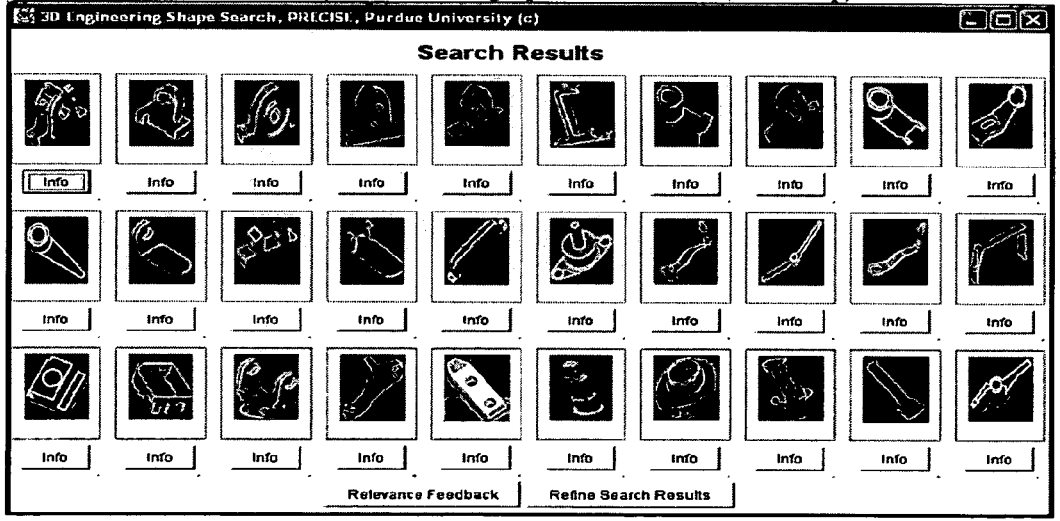
*(ii) Results after refining the query in (i) using moment invariants (Second Step)*
FIG. 63

METHODS, SYSTEMS, AND DATA STRUCTURES FOR PERFORMING SEARCHES ON THREE DIMENSIONAL OBJECTS

PRIORITY

The present application claims priority to U.S. Provisional Application No. 60/442,373 filed on Jan. 25, 2003, entitled: "Architecture and Description for a 3D Shape Search System," the disclosure of which is hereby incorporated by reference.

TECHNICAL FIELD

Embodiments of the present invention relate generally to search and retrieval, and more particularly to search and retrieval based on three dimensional objects.

BACKGROUND INFORMATION

Search engines for text and images have been well developed over the past decade. This invention deals with searching for three dimensional (3D) models from a repository of Computer Computer-Aided Design (CAD) models.

CAD and Computer-Aided Manufacturing (CAM) software has grown from stand-alone environments towards network based collaborative environments. Advances in 3D graphics hardware have contributed greatly to the increasing use of 3D CAD models. Increased use of 3D geometry will lead to internal design repositories which contain product related information such as CAD models and context-specific documents such as specifications, manufacturing plans, etc. Typically, design repositories are analogous to distributed databases, spread over various departments/people in a company.

Often designers are constrained by requirements of cost and time, making design reuse an attractive option. Design reuse necessitates searching for past designs of parts and assemblies. Furthermore, as designers change within companies a lot of "knowledge" is lost with past designers. Most of this "lost corporate knowledge" can be recovered back by searching for past designs. Clearly, reuse of past designs and knowledge from large design repositories is a key factor in compressing product development time and can deliver significant strategic advantage to a company.

Thus, there is a need to develop techniques that address the following problems:

Design Reuse: Designs which can be reused by searching for past designs in a company. The cluster map interface or 3D quick shape creation interface which can be used to select or sketch the part most similar to the one being designed.

Cost estimation: Design histories of the retrieved parts can be made available thereby enabling the cost estimation process. A designer can look for the most similar part thereby reducing errors and saving time in cost estimation Assist in quotation process: Often, when a request for quotation is received, time is spent in searching for past designs. Thus, there is a need to reduce the time needed in responding to a Request For Quote (RFQ).

Part Classification System: Most companies employ people to specifically classify parts in their database. This not only takes time but is also dependent on human accuracy. Thus, there is a need to streamline this process and classify parts based on desired metrics.

Reduce part duplication: There is a need, such that before designing a part, designers can search for parts available in the database to check if a similar part has already been designed.

Search engine for 3D shapes: Currently available 3D shape search engines do not produce good results. Thus, there is a need to improve conventional $3d$ shape search engines.

Currently available database search techniques use keywords or natural language based strategies. However in the case of 3D CAD databases since the context is disconnected from the CAD model, it is difficult to search for CAD models using keywords. Approaches such as a keyword search using the model filenames are also inefficient because most companies have a naming scheme that changes with time. Further, most designers tend to remember shapes better than the product contexts, making keyword based searches unattractive to users.

Moreover, there is a need to improve searching of 3D protein structures for applications such as drug discovery and docking.

SUMMARY OF THE INVENTION

Embodiments of the invention provide techniques for 3D search and retrieval. More specifically, and in some embodiments, 3D shapes (objects) are represented as graphical data structures and housed in one or more searchable data stores. Each 3D shape or parts of a particular 3D shape can be retrieved from the data store with feature vectors. The feature vectors include topology information and local geometric information associated with entities in the 3D shape or parts of the 3D shape.

In some embodiments, a 3D shape or a part of a 3D shape can be used as a search request to the one or more searchable data stores. The 3D shape or part embodied as a search request can be interactive constructed from scratch, selected by browsing a data store of 3D shapes or parts, or pasted or selected from an existing 3D shape or part.

In still more embodiments, an answer set returned from a 3D search request can be organized into one or more related clusters, each cluster includes one or more 3D shape or parts associated with a particular portion of the answer set. The returned results and clusters can be interactively rated for relevance or non relevance and resubmitted as a modified search request. The interactions and number of resubmitted and modified search requests can continue until a searcher is satisfied with the results. Moreover, the relevancy information can be associated with the searcher and used to intelligently alter any subsequent search requests issued from the searcher.

BRIEF DESCRIPTION OF THE FIGURES

FIG. 2 is a diagram depicting CAD and B-Rep Graph.

FIG. 3 is a diagram depicting interactions of a Module in View Architecture (MVA).

FIG. 14 is a diagram depicting example pseudo code for a voxelization algorithm.

FIG. 34 is a diagram depicting various Levels Of Detail (LOD) for a simplified wireframe model.

FIG. 35 is a diagram depicting more views of various LOD for a simplified wireframe model.

FIG. 36 is a diagram depicting models that are visually similar but still distinct.

FIG. 40 is a diagram of example pseudo code for a marching algorithm.

FIG. 44A is a diagram graphically depicting a view of the processing results associated with a marching algorithm.

FIG. 44B is a diagram graphically depicting another view of the processing results associated with a marching algorithm.

FIG. 44C is a diagram graphically depicting another view of the processing results associated with a marching algorithm.

FIG. 50 is a diagram depicting nodes in a tree-based multidimensional index.

FIG. 51A is an example diagram of a tree-based multidimensional index data structure.

FIG. 51B is another example diagram of a tree-based multidimensional index data structure.

FIG. 63 is a diagram of example search results produced from a multi-step search process.

DETAILED DESCRIPTION

In various embodiments of the invention the term "user" is presented. A user is a searcher and a searcher can be any entity that is represented in a computer accessible medium, such as an agent, a service, an application, a physical user, and others. Moreover, although various embodiments describe the use of a database, it is to be understood that the data base can be any data store or collections of data stores, such as electronic filed, directories, relational databases, object oriented databases, data warehouses, and the like. Finally, a 3D object is an electronic representation of a 3D shape or portions of a 3D shape, in some cases some 3D objects can be viewed as 3D models.

Figure 1:
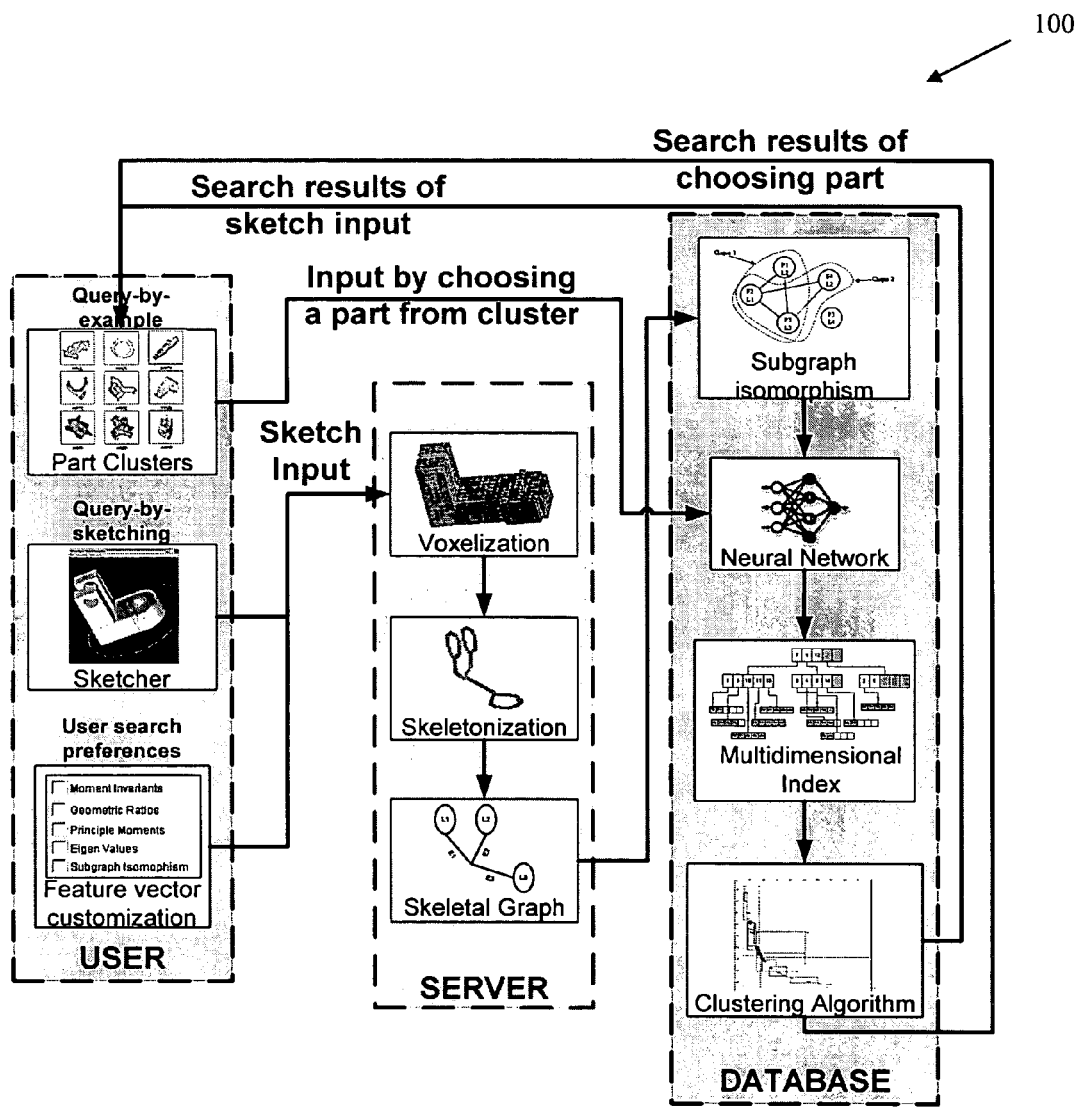
FIG. 1 is a diagram depicting a 3D shape search system.

FIG. 1 is a diagram of a 3D shape search system 100. The system 100 provides a platform for users to search for similar models from large repositories of 3D models. Complicated 3D models are reduced to a simpler representation called a skeleton. Important distinguishing features from the 3D model and the skeleton are extracted and stored as a feature vector in a database. Finally the database is searched and the results are shown as a clustered output. During the process of converting a complicated 3D model to a simpler skeletal form ("skeletonization" from hereon), searching the skeletal representation and clustering the output, a lot of intermediate steps occur as shown in FIG. 1.

The search system 100 is adapted to include:
Insensitivity to minor changes in shapes
Combination of geometry and topology
Multi-level and multi category representation of shapes
Accuracy and computational efficiency
Quick, user-customized query construction
Dynamic Query Creation and Modification The 3D search system 100 provides users with an intelligent interface. A 3D skeleton modeling interface is implemented such that it is capable of not only letting the user sketch the skeleton of the model and submit it as a query, but also enabling the user to dynamically modify the skeleton of the retrieved models to further improve his chances of finding the intended part. The system 100 is the first of its kind to allow creation and 3D manipulation of a 3D skeleton. The changes made on the topology of the skeleton of the model will make the system 100 redo the search while changes only to the geometry of the skeleton will only make it reorder the retrieval. Through this interaction, the query is expected to be more close to the user's intention and the system 100 can improve its performance more efficiently.

Local Query

Conventionally, the only type of query that a user could make was to ask for similar CAD models, by specifying an input CAD model, but this will not best satisfy the user's requirements. For example, the user may want to assign more importance (or emphasis) to a specific feature or his/her main focus for search might be a local feature in the CAD model rather than the whole model itself. Such flexibility is not possible with the past works and their interfaces. Each search is different and the user interface should be flexible enough to handle the different requirements. Further, better query processing is needed to accommodate the various requests. The system 100 is designed to better meet user requirements and to improve query processing needed to achieve the same.

Flexibility/Generality of the Search Criteria

Past techniques have focused generally on comparing two shapes. But there are a host of issues specific to an application domain. One main issue is the interpretation of the similarity of CAD models. For example, with respect to the manufacturing domain, the various machining features in a CAD model assume greater importance. Computing any shape descriptor number, as in the probabilistic shape distribution methods may not be customizable to the specific domains and hence cannot take serve the user's needs properly.

Similarity Measure

Finally the user may want to quantify the shape similarity between the input and the results. This is possible to an extent in the shape function methods. But the definition for similarity itself is user dependent. Hence the interface should attempt to learn the user's perception of similarity of shapes. This is not possible with the existing research techniques.

Shape: A Combination of Geometry and Topology

The shape of any 3D model is a combination of topology and the geometry of its constituent entities. While geometry is the quantitative measure of an entity's shape, size and location, topology is relational information between geometric entities of the model. Hence, any realistic shape representation should reflect these two ideas sufficiently. Separate representations of these characteristics will allow us to have a hierarchical search strategy for similar shapes.

The approaches in prior art represents shape as either one of these quantities or as a 'composite measure' which has no distinction between the geometry and topology. For example, shape descriptors such as moment invariants and shape distributions are 'composite measures' of the shape without any distinction between model geometry and topology. No particular approach can be described as generic unless it allows search based on the intent of the user. Representing 3D models by relational structures such as graphs/trees achieves a lot in maintaining the distinction between geometry and topology. However, graph representation alone may not be able to solve the problem of capturing the intent of the user. Further research is therefore needed to make use of the geometric information efficiently during the search/indexing process.

Graph Data Structure Instead of Tree Data Structure

Herein novel methods, systems, and data structures are described that explain why conventional techniques are not applicable for certain environments, such as mechanical engineering and hence distinguish this invention from past approaches.

Conventional skeleton/shock graph based 3D shape matching systems were developed for multimedia retrieval where the models are general 3D objects such as Aircraft (full, approximate 3D model), Cars, Fruits, etc., but are not domain-specific. Some conventional approaches have been tested on models without holes in their topology, because solid shapes having a set of surfaces forming a closed hole cannot be captured by conventional tree structures. However, such closed loop entities are encountered often and are significant in the mechanical engineering domain, which call for Graph structures for their representation. Furthermore, other conventional approaches are not amenable for comparing local geometry or for partial matching. The system 100 and other novell techniques presented herein convert skeletons into a Graph data structure and captures the loops in solid shape.

Multi-Step Search Strategy

Prior techniques only allows a single query and allows no refinement of that single query. In addition, that search is based on a predefined fixed set of feature vectors which may not guarantee the retrieval of relevant shapes. System 100 allows a user to filter search results successively using a mutli-step search interface. Although this approach may not guarantee the retrieval of relevant shapes, it increases the chances of retrieving relevant shapes and thus offers substantial improvement over conventional approaches. A large number of features including moment invariants, volume, aspect ratio, and eigenvalues are provided to the user to assist in posing multi-step queries.

Computational Efficiency

Computational Efficiency controls the ability of the system to handle huge volumes. Some of conventional methods concerning B-Rep graphs are inefficient as B-Rep graphs are huge in size for simple 3D models. Exact graph matching algorithms are NP-hard. So comparing a given CAD model to the millions of parts in the database using the B-Rep graph methods seems impossible even with supercomputers.

FIG. 2 is a diagram 200 of a CAD and B-Rep Graph. Diagram 200 shows a simple part and its corresponding B-Rep graph. Most conventional approaches developed for 3D model comparison fail to use domain knowledge. Although shock/skeletal graph based approaches are a step forward in this direction, the information present in the models is not properly explored to reduce the complexity of the graph/tree matching problems. This invention uses domain-specific knowledge including the type of entity (loops/edges) and local geometry and volume information for reducing the complexity of search, and in developing a domain-specific search system.

Disk I/O Efficiency

Conventional efficiency in terms of disk I/O is far from satisfactory. When the number of CAD models becomes very large, the disk I/O time will be a large part in the query time.

For example, supposing that a database has one million models, and 15 milliseconds for a disk I/O time, and each CAD model occupies one disk page (in some research, the disk files resulting from the matches take, on an average, 1 MB of disk space), it takes 4 hours for a supply scan over the recodes in the database. Therefore, it is important to index the data to speed up the search. However, the index structure of current database systems, such as B+ tree which has made great success, is not eligible for these multi-dimensional data. Therefore, new indexing techniques to filter unnecessary disk I/O is of great importance. This problem, however, has not gained enough emphasis. One of the reasons for this is that most of the current 3D shape searches are still focusing on searching among very small number of CAD models, because of the inefficiency of their approaches.

System Processing

The process of searching for a 3D model can be described by the following sequence of operations:

1. USER INTERFACE SIDE:
1.1. Query Sketch Interface
Sketch the required shape in 3D OR
Sketch the skeleton (stick figure) of the required 3D shape OR
Choose a model from the model cluster OR
Choose a 3D solid model from the local hard drive OR
Submit or sketch orthographic views for a 3D model
1.2. Feature vector Interface
Choose required combination of Feature vectors for search and clustering
2. SERVER OR SERVICE PROCESSING:
2.1. Voxelization
Convert the 3D model into a neutral discrete voxel representation
Extract and store 3D model and voxel feature vectors
2.2. Skeletonization
Depending on the detected topology of the voxel model, perform one of the three skeletonization operations (details are presented later):
2.2.1. Prismatic Skeletonization
2.2.2. Tubular Skeletonization
Simplified Wireframe
Extract and store skeleton feature vectors
2.3. Graph creation
Detect entities from the skeleton depending on skeleton type (loops, edges or surfaces)
Extract and store graph feature vectors
2.4. Conversion of 2D drawings into 3D models
Noise removal
Dimension and title block extraction and removal
2D Thinning or 2D Skeletonization
Edge and entity recognition
Obtain continuous closed segment loops in orthographic views
Identify interior disjoint loops
Skeletonization of non-disjoint loops using MAT
Conversion of skeleton into 3D skeleton
Convert 3D model into skeleton using any of the above skeletonization methods
3. DATABASE, SEARCH AND CLUSTERING:
3.1. Graphs Comparison
Either by graph/sub-graph isomorphism, association graph techniques or probabilistic graph matching techniques.
3.2. Create multidimensional index structure
Use R-tree, R+ tree, KD-tree, X-tree or any other space partitioning techniques to index the database.
3.3. Feature vector comparison
Based on user preferences as in 1.2 above. If not use a default combination of feature vectors
3.4. Cluster models in database
Use self organizing map (SOM) or any other hierarchical clustering techniques
3.5. Present results to user through cluster map display
Pick a representative model from each cluster and display the part image through a user-friendly interface
Allow picking of models for browsing
3.6. Relevance Feedback
The user picks parts that are relevant and non-relevant
The results are sent back to the database through the server
Cluster map is updated with user relevance feedback results
Results are displayed back to the user
3.7. Learning Agents
Learning algorithms, such as neural networks, "learn" user relevance feedback preferences and stores them in a user profile
3.8. Multi Step search
Allow user to use different feature vectors and skeletal graphs for refining search results in a sequential or step-by-step manner. Similarity comparison is same as those described in 3.1 and 3.3 above.

The architecture of the system 100 can be best described by at a high level in FIG. 1. The sections below, describe embodiments of the invention in greater detail.

1. User Interface Side

Referring again to FIG. 1, the user interface essentially consists of three interfaces, namely, Query-by-Sketch (QBS), Query-by-Example (QBE), and Feature vector interface. The QBS interface implements two different versions (i) 3D solid model sketching interface and (ii) 3D skeleton sketching interface. The QBE interface consists of a (i) Cluster Map Interface, (ii) Local Hard Drive and a (iii) 2D Drawing Interface.

1.1. Query Interface

The following subsections describe the various methods and modules that are used to construct a query in our system (QBS and QBE) either directly as a 3D solid model, as a 3D skeleton model or from the 2D views of a 3D model.

1.1.1. 3D Solid Model Sketching

Description of the Module:

This module provides a web-based and platform independent system to create approximate geometric shapes as quickly as possible. It uses a hybrid approach to shape creation, for instance, the use of feature based and sketch based solid modeling. The sketch interface interprets mouse strokes and converts these discrete strokes into primitive entities like, line, point, arc using a vectorization algorithm. The converted sketch can be then used to form solid geometry. User can also use the predefined shape features such as block, cylinder, hole, as primitive building blocks. The faces of these features can then be used as a canvass for further sketching.

The system 100 operates as follows:
User starts new session after logging into the shape search website.
He uploads or opens already existing CAD file.
Alternate ways to start modeling is by dragging and dropping pre-created solid shape features like block, cylinder or by sketching approximate sketch profile by dragging the mouse or pen.
If a sketch is created, it is sent to server for extrusion. This can be achieved either by using separate buttons or through mouse or pen stroke indicating extrusion.

Server receives the command and accordingly converts the sketch into an extruded solid and sends back the faceted object to the client.

Newly created solid is viewed in the client window.

User selects a face of the solid and starts sketching on it.

The dragged predefined shape features can be edited to obtain the approximate shapes. This editing involves changing the dimensions or positions of the features, copying and pasting the features, deleting or suppressing the features etc.

Due to approximate geometric shapes there might be over hanging or protruded portions of the solids which are not needed. The user will then use a 3D eraser to remove unwanted part.

Most of the computationally intensive functionalities, e.g. solid modeling, feature creation and modification, are transferred to the server in order to reduce the size of the clients.

Module Architecture:

FIG. 3 is a diagram 300 of interactions occurring with a Module-in-View Architecture (MVA). The proposed interface is based on ToolCAD architecture. It consists of Model-View-Controller (MVC) architecture. This forms the core of the module.

Model—Application object. The Geometry object in this case. It contains the details of the geometry being created. Geometry in this case consists of created solid shapes.

View—The screen representation of the Model. Magician library used to display the faceted geometry objects with their corresponding relative transformations.

Controller—The way the user interface reacts to the user input. The Magician library used to capture the user input like picking, dragging, etc.

Figure 4:
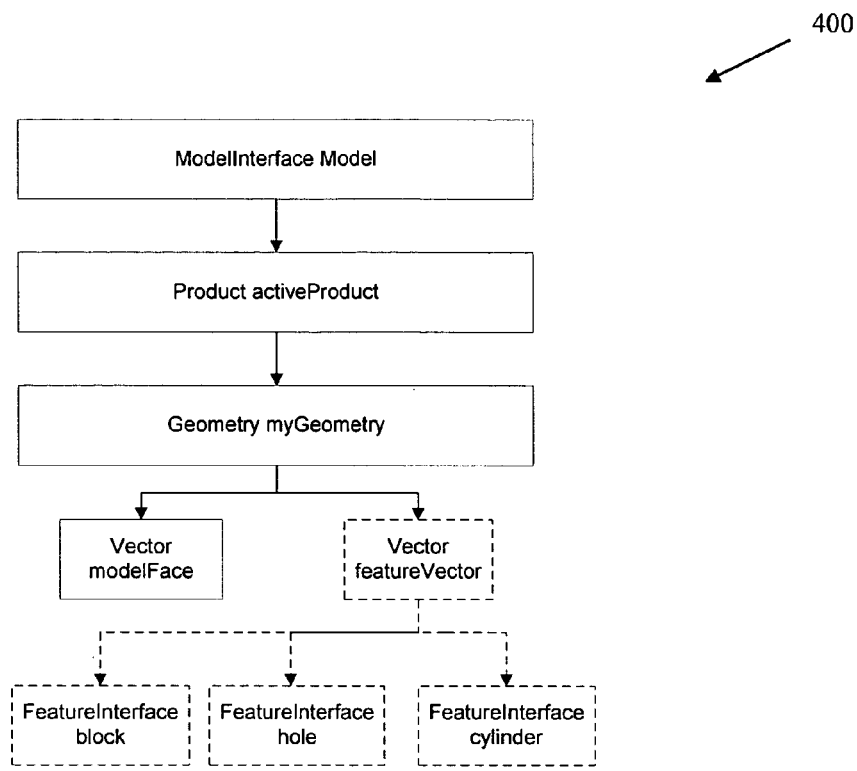
FIG. 4 is a diagram depicting features of a MVA.

FIG. 4 is a diagram 400 of features in MVA 300. In this case diagram 400 holds a list of features and sketches created. Features are predefined objects which hold the data like, list of faces, edges with it. Sketches when extruded convert to features. These are same as predefined features only in this case these hold pointer to the underlying sketch. Diagram 400 consists of the faceted data that is shown to the user. A user can interact with this data and change it.

Figure 5:
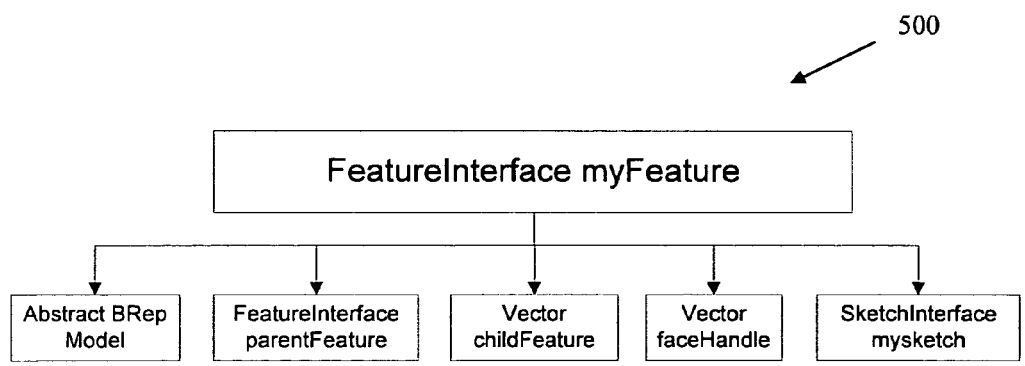
FIG. 5 is a diagram depicting a feature interface data structure.

FIG. 5 is a diagram of a feature interface object 500. This may represent one more steps into a hierarchy where model can withheld multiple products. Each product will have separate Geometry object which in turn will hold the features created or predefined. Geometry will as well hold the faceted representation of the solid model formed after Boolean operations are performed on the features. This faceted structure 500 is used by a View object in order to display it to the user.

Feature Module: Features are predefined 3D shapes which can be directly used for creating solid model. Many times users want to have same shapes again and again in the model. The most common examples can be rectangular solid blocks, cylinders, holes, slots etc. To improve the speed of geometry creation such shapes are kept ready to deploy into the workspace. These shapes have default size when first put in the workspace. However each face of the feature will have handles for manipulating the size and position of the feature. When a feature is selected, these handles are displayed and user can drag these handles and change the size of the feature interactively. The features are created using ACIS solid modeler which recites on the server and then faceted to form a list of faces. Edges of these faces are extracted and are stored with each feature. All features are represented by just list of edges. So when a user selects a feature, it is shown in wire-frame mode. However actual 3D model of the feature is stored on server side which is then used to perform Boolean operations with all previously created shapes to get the final shape model. Each sketched and extruded shape is also a user created feature and can be saved separately for later use. Thus the interface is quite much customizable. These user created features will hold a pointer to basic underlying sketch from which these are created.

Sketch Module: After the user defines a sketching plane, the sketching begins by automatically rotating the sketch plane to make it parallel to the screen. The user then sketches an outline or a profile. The profile is then interpreted into vectors by a vectorization algorithm, such as, and by way of example only, the vectorization algorithm described by Dov Dori and Liu Wenyin. These vectors form the profile of the wire that can be extruded to form a solid.

Figure 6:
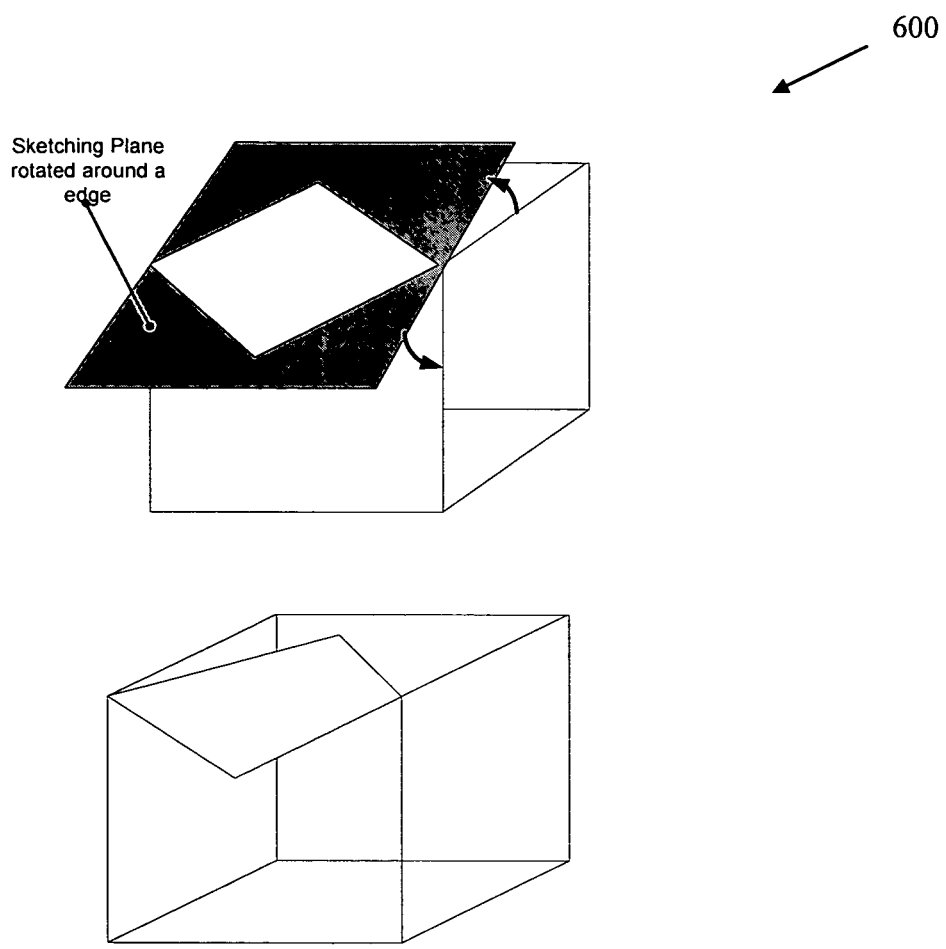
FIG. 6 is a diagram depicting an example sketched plane tool.

Tools for shape creation: For simplifying the process, some tools are optionally provided. These tools can be:

Sketch Plane: User chooses any face of the solid shape to create sketch plane in either of the following ways. An example sketch plane tool 600 is shown in FIG. 6. This tool can perform the following processing:
1. Offset to the face of solid already created.
2. Choosing three points to pass a plane through it
3. Choosing any edge of existing solid to create plane through it.
4. Rotating a sketch plane around any edge of solid.

Figure 7:
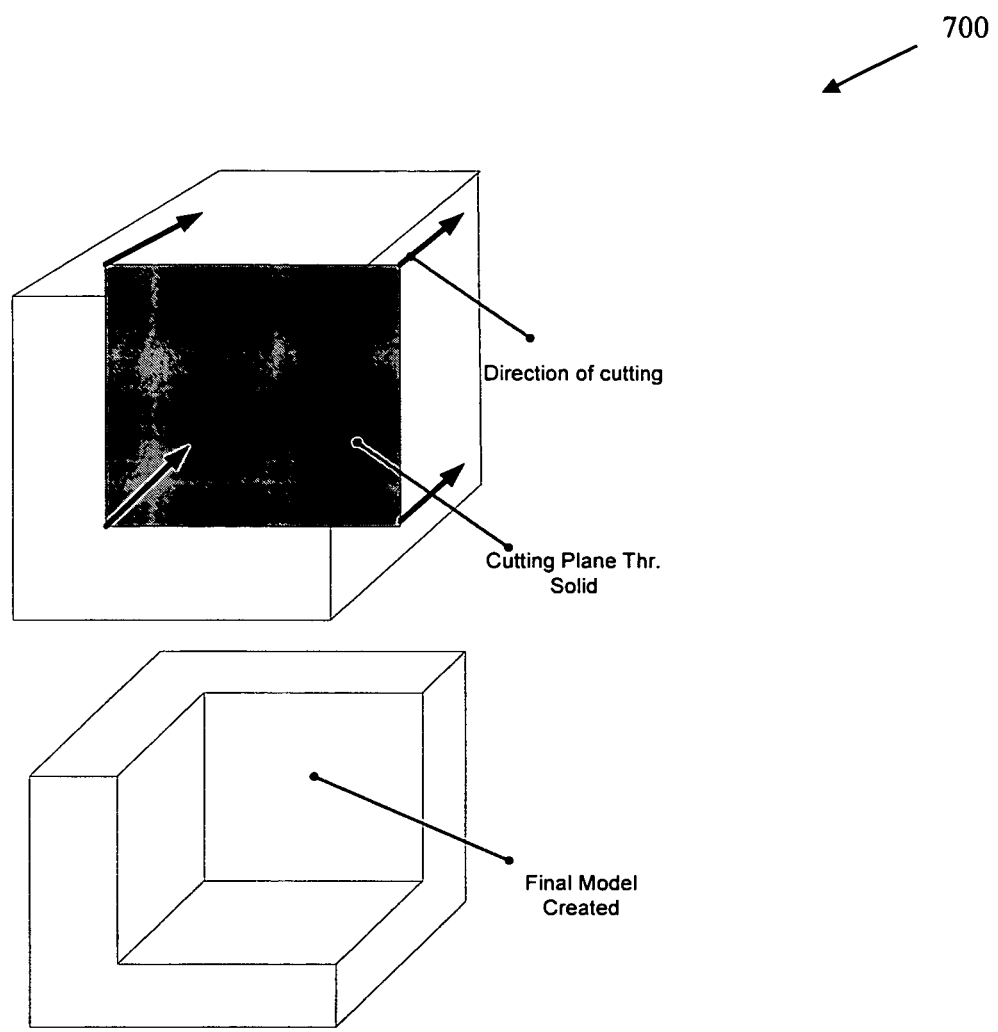
FIG. 7 is a diagram depicting an example cutting plane tool.

Cutting Plane: Cutting plane is similar to sketching plane; however it is used interactively by the user for creating a cut into the solid. The plane can be any sketched profile. An example cutting plane tool 700 is shown in FIG. 7. FIG. 7 shows the working of the cutting plane tool 700. This tool 700 uses functionality of face dragging and then uses ACIS to finally create a cut into a solid.

Figure 8:
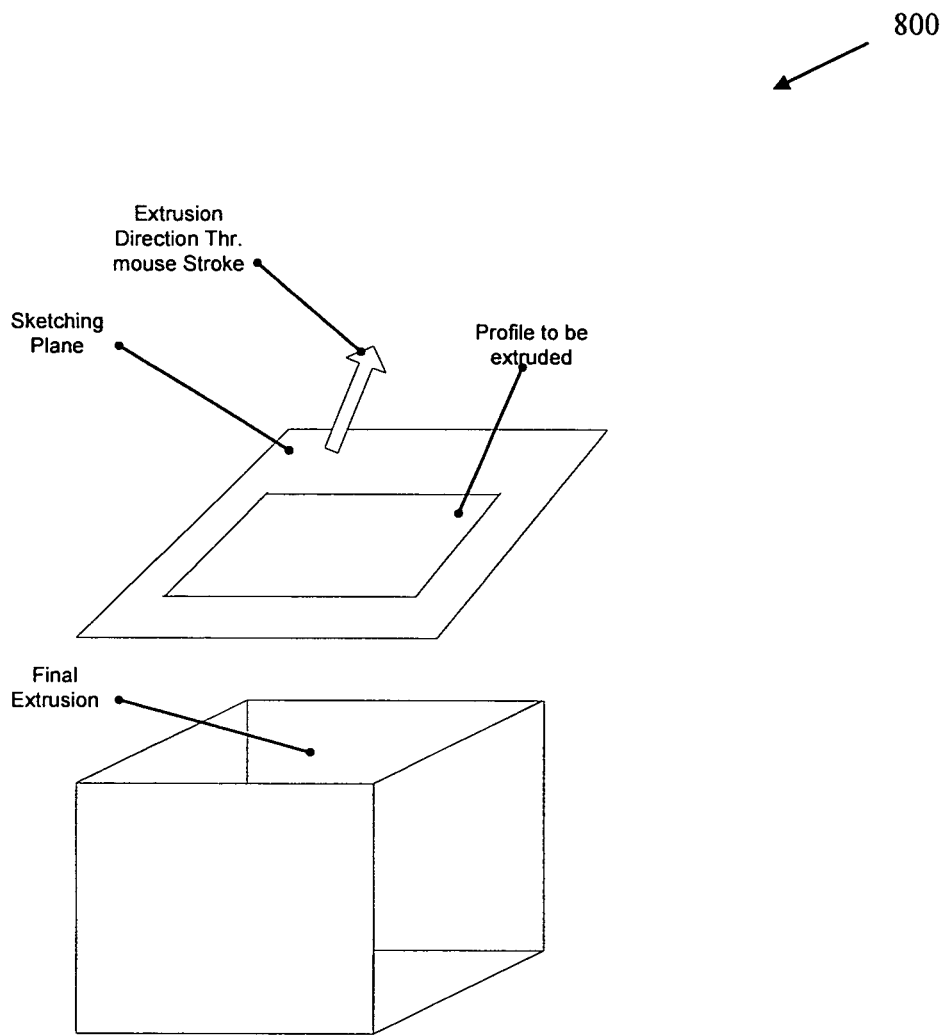
FIG. 8 is a diagram depicting an example extrusion tool.

Extrusion through Digital Pen or Mouse strokes: This function is important for creating extrusion from 2D shape profile. It is more than intuitive that once the sketch loop is finished, a user will use same device that is the mouse or digital pen to extrude the profile. So after user finishes the loop, user prompts for extrusion through next mouse stroke or drag and interactively specifies the depth till which he/she wants to extrude the profile. This is more similar to using cutting plane. Example of an extrusion tool 800 is shown in FIG. 8.

Figure 9:
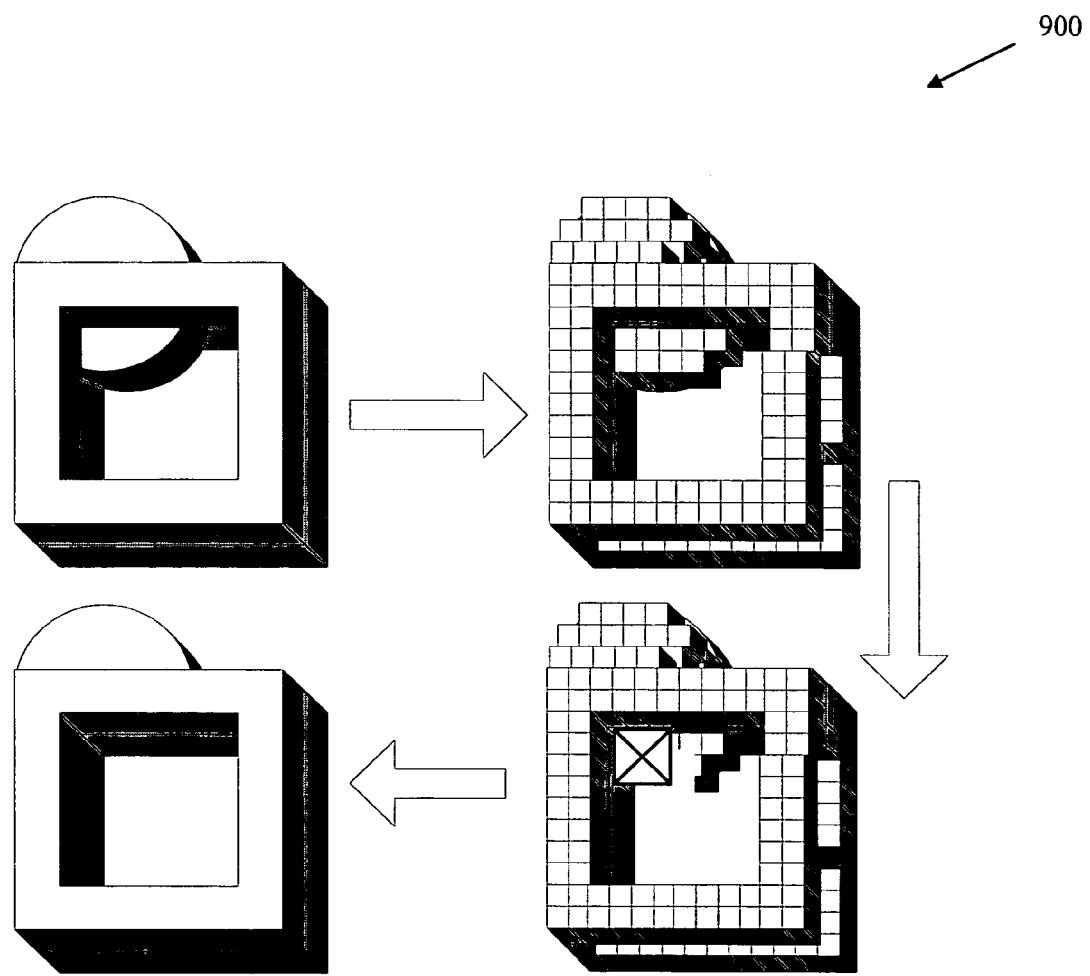
FIG. 9 is a diagram depicting portions of a data structure that is erased.

3D Eraser: This function is used to remove hanging parts of the solid features. For this, a voxelized model of the solid shape is used. As shown in the example 3D eraser tool 900 of FIG. 9, a user will choose the voxels to be removed by selecting them and then when he is finished, Boolean subtraction of selected voxels with the solid model is performed and the result is displayed to the user. User may or may not see the underlying voxel model. This tool 900 is used to remove any inconsistencies in the model.

1.1.2. 3D Skeleton Creation and Modification Interface

A 3D skeleton modeling interface is implemented such that it is capable of not only letting the user sketch the skeleton of the model and submit it as a query, but also enabling the user to dynamically modify the skeleton of the retrieved models. The changes made on the topology of the model will make the system redo the search while changes only on the geometry will make it reorder the retrieval results. Through this interaction, the query is expected to be more close to the user's intention and the system can improve its performance more efficiently.

Figure 10:
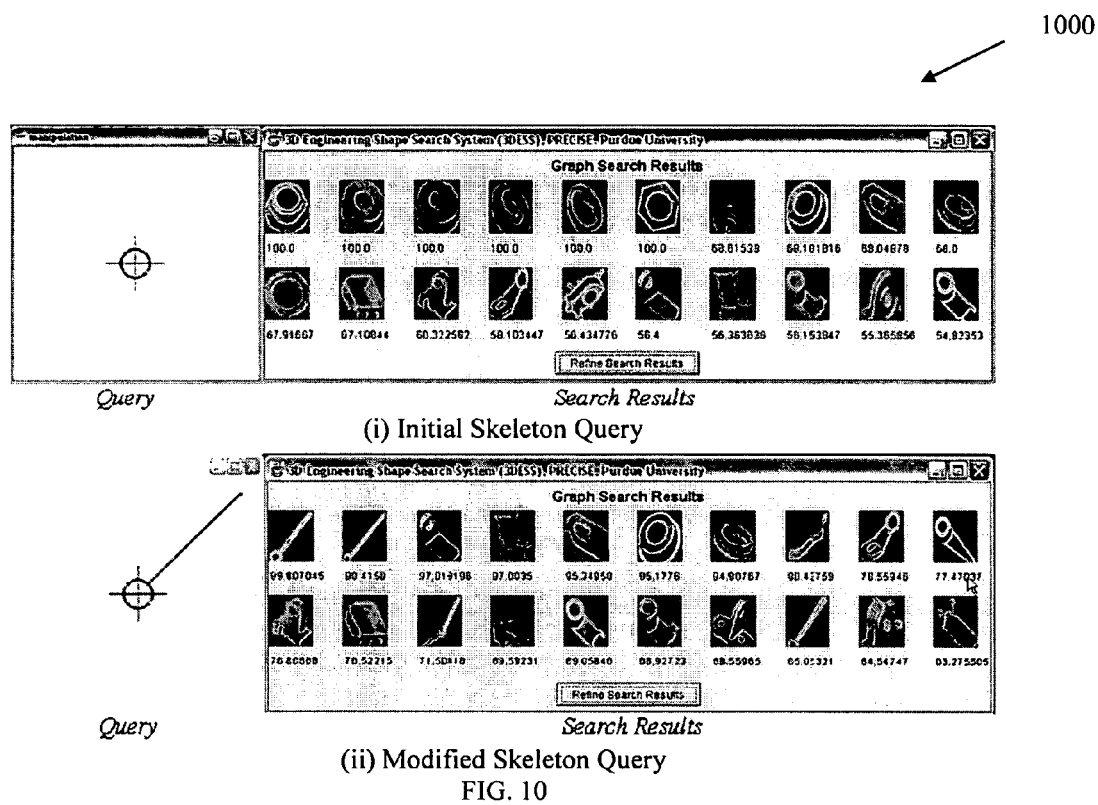
FIG. 10 is a diagram depicting example views of skeleton creation and modification.

This interface is initiated by the fact that the user may lack suitable examples for the query. The system enables the user to construct the 3D skeleton by assemble the primitive shapes first and then manipulate the shapes in 3D space (see FIG. 10 a diagram 1000 of a view of 3D shape manipulation). The resulted "skeleton" includes the essential topology and geometry information just like the skeleton file obtained from the skeletonization. Currently the primitive shapes include edge such as straight line and curve, and loop such as circle and rectangle. The 3D manipulation annotations include rotation, panning, scale and zooming which are designed for both the individual shape primitive and the global assembly. The interface also allows the user to delete a selected shape, clear current configuration, import a skeleton graph file to visualize it, and submit the constructed skeleton as a query for searching similar shapes.

1.1.3. Cluster Map Interface

See section 3.5 described herein and below.

1.1.4. Local Hard Drive Interface

An option is given to the user to select a CAD file that has already been generated. The file can be anywhere where the user has permissions to access the file. The file can be in any CAD format supported by our invention. A standard pop up window is provided to the user to select the CAD file.

1.1.5. 2D Drawing Interface

Users are provided options to send in their scanned drawings to the server.

1.2. Feature Vector Interface

Figure 11:
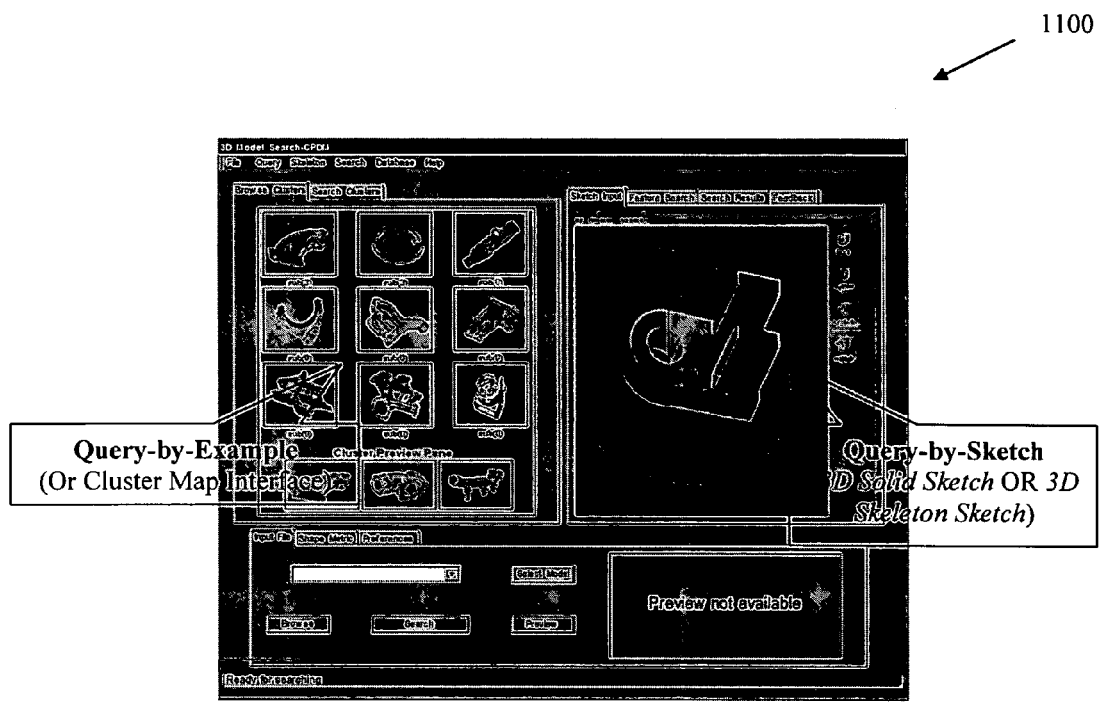
FIG. 11 is a diagram depicting graphical views of example query and search interfaces.

The current invention includes techniques for customization of the feature vectors in partial or full by the user to describe his search intention accurately as shown in diagram 1100 of FIG. 11. The search query is executed in multiple levels/stages to get better results. This interface allows the user to assign the different feature vector(s) to these various tiers in the search process. This helps the user to describe his search intent more accurately. The user can further reassign the weights for these feature vector(s) as applicable to improve his search. By engaging the various options in the interface can instruct the system to do an exact or partial search. A partial search query involves sub graph isomorphism and this is dealt in the skeletal graph level. The user can also put into use the neural network to get efficient query results. The user can set his search preferences and can also store it with his profiles. A user can have multiple profiles defined for various search situations as per his frequent requirements. This interface also allows the user to manage these profiles and also to provide relevance feedback to the system.

2. Server or Service Side 2.1. Voxelization

Figure 12:
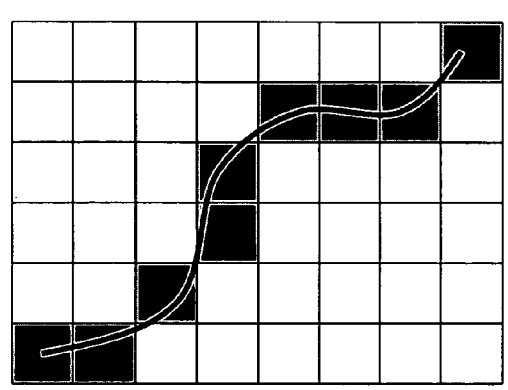
FIG. 12 is a diagram depicting an example of discretization in 2D discrete space.

Voxelization is the process of converting 3D geometric objects from their continuous geometric representation into a set of voxels that best approximates the continuous object in a 3D discrete space. The 3D discrete space is a set of integral grid points in 3D Euclidean space defined by their Cartesian coordinates (x,y,z). A voxel is the unit cubic volume centered at the integral grid point. The voxel value is mapped into {0,1}: the voxels assigned "1" are called the "black" voxels representing opaque objects, and those assigned "0" are the "white" voxels representing the transparent background. FIG. 12 shows a diagram 1200 of an example for discretization in 2D space.

Two voxels are "26-adjacent" if they share a vertex, an edge, or a face (see FIG. 12). Every voxel has 26 such adjacent voxels—eight share a vertex (corner) with the center voxel, twelve share an edge, and six share a face. Face-sharing voxels are defined as "6-adjacent", and edge-sharing and face-sharing voxels are defined as "18-adjacent". Conventional approaches for voxelization use a polygonal model, a parametric curve or an implicit surface as input. Scan filling or recursive subdivision algorithms are used for voxelization.

Prior to voxelization, the model is normalized with respect to translation and scaling. The scale factor is stored in the database for future computations.

Figure 13:
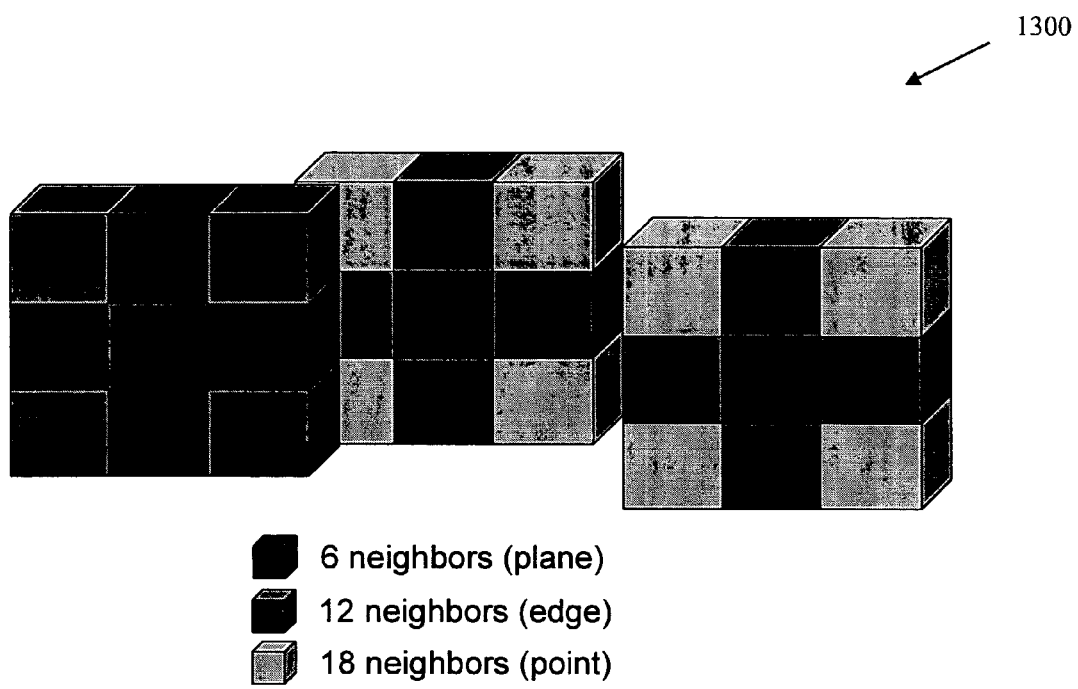
FIG. 13 is a diagram depicting types of voxel adjacencies in 3D discrete space.

In one embodiment, an ACIS solid modeling kernel for voxelization of a 3D model is used. The input to the ACIS kernel is a B-Rep model. FIG. 13 is a diagram 1300 depicting example pseudo code for a voxelization algorithm. In one embodiment, a bounding box for the 3D model is constructed and a voxel size chosen depending on the minimum bounding box dimension or use a user specified voxel size. The discrete bounding box dimensions are then calculated. All faces and edges in the 3D model are assigned faceIDs and edgeIDs respectively and stacks are created for each face and each edge. The face and edge stacks can be independent or dependent of each other depending on various program conditions, memory etc. The 3D model is looped through in increments of the voxel size and the intersection of every voxel with the model is checked. A '1' is appended to the text file at the position containing a voxel and a '0' are every position not containing a voxel. For all positions containing a voxel, get all the faces and edges intersecting with the model and store the faceIDs and edgeIDs of the corresponding faces and edges in the voxel under consideration. For the faces and edges intersecting with the voxel, store the voxel under consideration in the face and edge stacks. Thus we now have references for a voxel from a face/edge and vice-versa. This can be used as input to the simplified wireframe algorithms described elsewhere in this document. It is important to note that voxelization for a polygonal model can also be performed. The process for voxelization of a polygonal model is presented in the next section.

Figure 15:
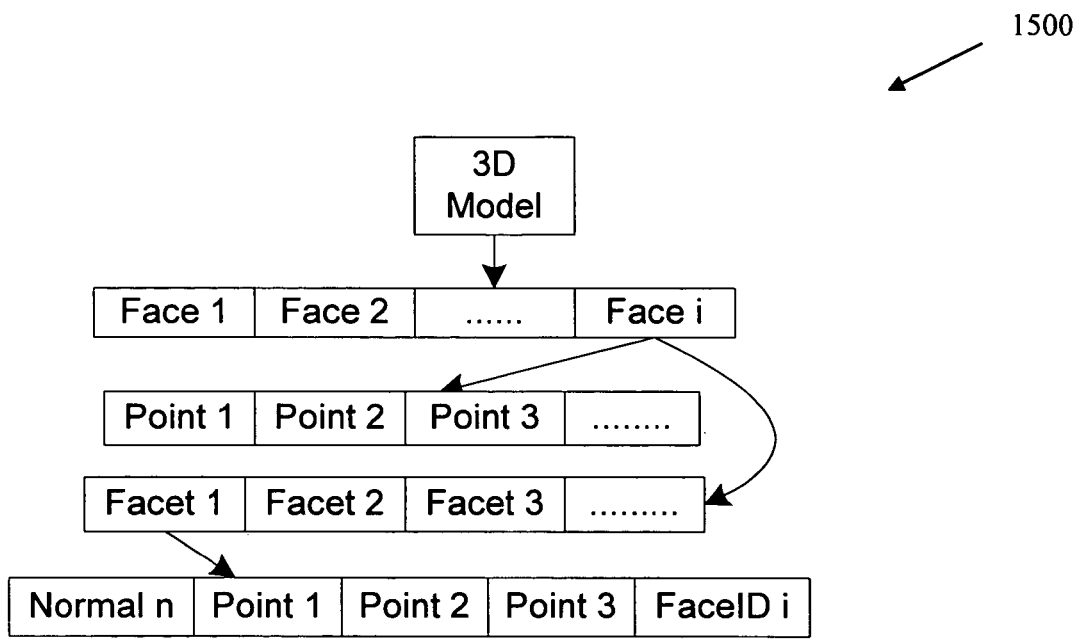
FIG. 15 is a diagram depicting a 3D model showing face objects.

A 3D model consists of a list of Face objects. A Face object represents a face of the resulting three-dimensional solid. A Face consists of an ordered list of the vertices of the face and a list of Facet objects as shown in the example 3D model 1400 presented in FIG. 14. The Facet list contains the list of triangles generated by triangulating the face of the solid. This structure is better than storing only a list of facet triangles as it can show the correct wire frame view of the solid model. This structure also maintains the information of all the triangles belonging to a face that makes it possible to pick a face at the client-side. FIG. 15 shows an example of this data structure for a cube 1500. The cube 1500 consists of 6 Face object. Face objects consist of points and Facet objects, e.g., Face 2 consists of 4 points (A, B, C, and D) and 2 Facet objects. One of the Facet objects, as shown in FIG. 15, stores the three points: A, B, and C, normal to the Facet, and the Face number to which the Facet belongs. Since one knows the mapping between Facet and Face, one can perform voxelization of a polygonal model and store Face IDs into each voxel as described in the sample pseudo code 1300 of FIG. 13 above.

Significant differences between the presented example voxelization algorithm and previous approaches are listed below:

Parallelization: Since voxelization is a simple domain decomposition problem, it is amenable to parallel computing. Each slave processor can be assigned a domain range and the master processor can assemble the results together.

Voxel size: A size range for voxelization of 3D engineering models is developed. It is seen that ideal voxel sizes for most engineering shapes falls in the range of $\frac{1}{32}$-$\frac{1}{64}$ times the minimum bounding box dimension. The condition for a voxel size being "ideal" is that the major features in a part are captured in the voxel model; i.e. very small features may be lost during voxelization because the feature size is smaller than the voxel size.

Adaptive voxelization: Adaptive voxelization for a 3D model is performed. Adaptive voxelization is the iterative process of voxelizing a 3D model, evaluating the voxel model for exactness with the 3D model and finally re-voxelizing with a voxel size lesser than the earlier voxel size until an acceptable voxel model has been attained.

Figure 16:
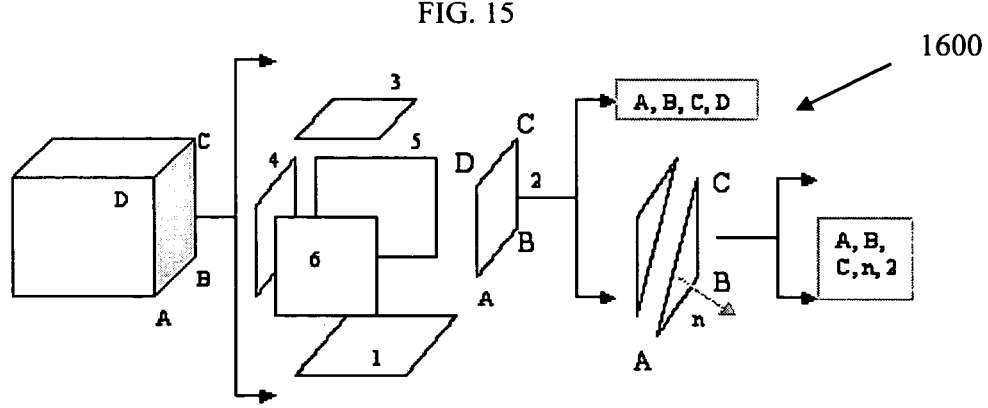
FIG. 16 is a diagram depicting face and facet data structures for a cube.

Storing face/edge information in voxel: The 3D model stores Face/Edge information in every surface voxel. An example of Face IDs being stored in voxels is shown in diagram 1600 of FIG. 16. Prior to voxelization, Face and Edge IDs are assigned to every face and edge in the 3D model. As voxelization is performed face/edge intersections for every voxel are checked and face/edge IDs are stored in intersecting voxels. The process of edge ID storage is similar to the process of storing face IDs shown in FIG. 16. The Face/Edge ID information is used in the simplified wireframe as described in greater detail later in this invention.

Voxelization using a solid modeling kernel: With various embodiments of this invention, voxelization is preformed using the ACIS solid modeling kernel as opposed to performing voxelization using any of the available algorithms available. This is important because none of the conventionally available algorithms are capable of storing face and edge IDs in voxel models.

There are a variety of other uses of the present voxelization algorithm, such as:

Distance Volume Generation: A distance volume is represented within a volume dataset. A particular value stored in a particular voxel represents the shortest distance to a surface of the 3D model that it represents. A distance volume representation is an important dataset for many graphics applications, most notably in the manufacturing visualization domain. A distance volume is a natural consequence of using ACIS for voxelization, since one can calculate distances from the surface of the model and store it in the voxel data structure. Some applications of using distance volumes are CSG surface evaluations, offset surface generations, determination of regions of maximum or minimum thickness in net-shape manufacturing, and 3-D model morphing.

2.2. Skeletonization 2.2.1. Definition of Skeletonization

In various embodiments of the invention, a skeletal representation (hereinafter "skeleton") is defined as: "the minimum representation of the major shape of a part in 3D". In other words, a skeleton is a simplified representation that neglects the "minor" features in a shape such as small radii and holes while still retaining the "major" features and preserving "major" topology relationships in the part. Skeletonization is any process that generates such a skeleton.

A skeleton is:
a. Centered from the boundary
b. Preserves connectivity
c. Free from boundary noise
d. Rotationally invariant
e. Computationally simple 2.2.2. Mathematical Model of a Skeleton and Skeletonization Formal Definition of a Skeleton A skeleton is a tuple $S=\langle G,T \rangle$ where:
$G=\{g_1, g_2, \ldots, g_n\}$ is the finite set of geometric entities composing a skeleton, and
T is a n×n adjacency matrix that defines the topological connectivity between elements of G.

For a skeleton to exist, G is defined as the set:

$G = E \cup L \cup S \cup H$ where:

$E=\{e_1, e_2, \ldots, e_p\}$ is the set of edges,
$L=\{l_1, l_2, \ldots, l_q\}$ is the set of loops,
$S=\{s_1, s_2, \ldots, s_r\}$ is the set of surfaces, and
$H=\{h_1, h_2, \ldots, h_s\}$ is the set of holes However, the sets E, L, S and H need not all be non-zero for an instance of S.

Matrix T is defined as:

$T=[t_{ij}]_{n \times n}$ where:

$$t_{ij} = \begin{cases} N & \text{if } g_i \text{ is adjacent to } g_j \\ 0 & \text{if not} \end{cases}$$

and N is a nonzero number describing the connectivity between entities $g_i$ and $g_j$.

For a skeleton to exist, both G and T must be non-zero.

Formal Definition of a Geometric Feature

A geometric feature γ in a shape Ψ is defined as a set of geometric entities $e_i$(i=1 . . . n) that reduce to just one geometric entity in a skeleton S. In some cases, it may be possible that the entire shape is a single geometric feature.

Figure 17:
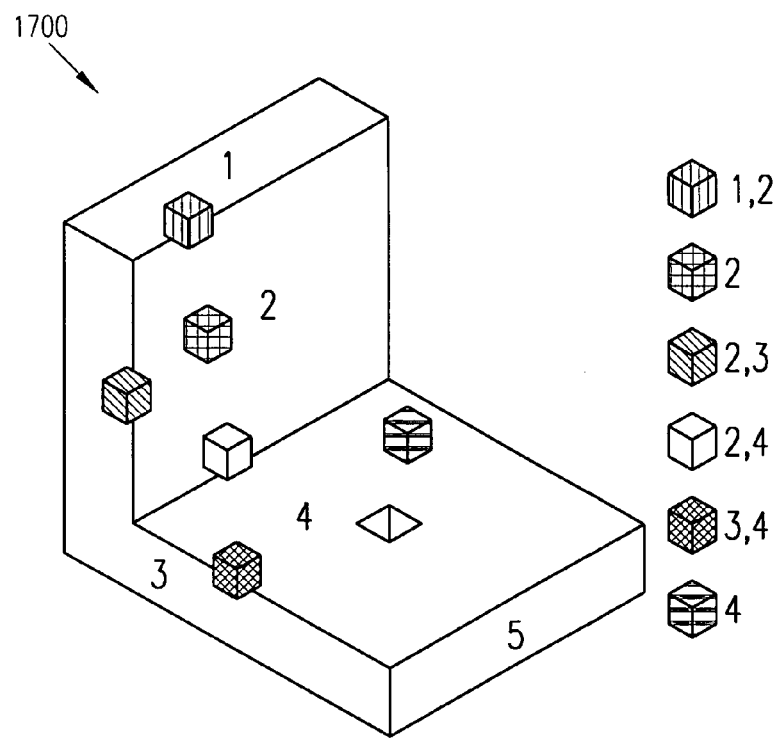
FIG. 17 is a diagram depicting face identifications stored in a voxel for a 3D model.

In example shape 1700 shown in FIG. 17, there are two geometric features present in shape Ψ even though the number of geometric entities in Ψ is more than two. The skeleton S has two geometric entities—a loop and an edge.

Formal Definition of a Shape

A shape is a tuple $\Psi=\langle \gamma, \tau \rangle$ where: $\gamma=\{\gamma_1, \gamma_2, \ldots, \gamma_m\}$ is the set of geometric features composing a shape, and τ is a m×m adjacency matrix that defines the topological connectivity between elements of γ.

Matrix $\tau=[\tau_{uv}]_{m \times m}$ where:

$$\tau_{ij} = \begin{cases} 1 & \text{if } y_u \text{ is adjacent to } y_v \\ 0 & \text{if not} \end{cases}$$

For a shape to exist, both γ and τ must be non-zero.

Formal Definition of Skeletonization

Skeletonization is defined as a mapping O: $\Psi_k \rightarrow S_k - \square$ where:

$S_k$ is the skeleton produced by subjecting a shape $\Psi_k$ to the skeletonization operator O and, □ is a noise factor removed during skeletonization.

Figure 18:
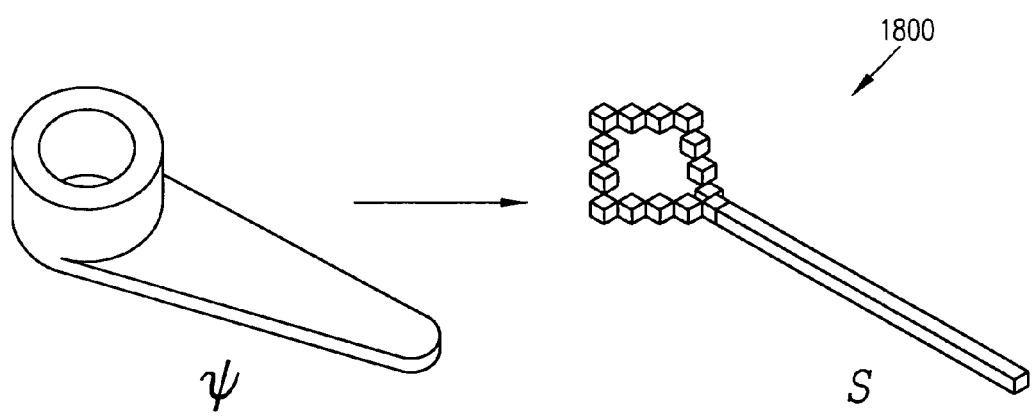
FIG. 18 is a diagram depicting an example shape and its skeleton.

It is easy to see that in the present context skeletonization is a many-to-one mapping as shown in FIG. 18, an example skeletonization mapping.

2.2.3. Categorization of Shapes

Engineering shapes can be categorized into the following categories:

i. Solid: Solid-like shapes usually have high material usage compared to their size. They usually have non-constant wall thickness and have few features. Solid shapes are typically manufactured by machining or forging. Very few solid parts are manufactured by net-shape processes such as molding or casting.

ii. Shell: Shell-like shapes usually have minimal material usage compared to their size. They usually have constant wall thickness and are simple shapes. Solid shapes are usually manufactured by sheet metal or net shape processes such as molding or casting. Tubular shapes also come under the category of shell-like shapes.

iii. Hybrid: Hybrid shapes, as the name suggests are a combination of the above two shapes. Some parts of the shape have solid-like features and some parts have shell-like features. They are usually manufactured by molding or casting.

Figure 19:
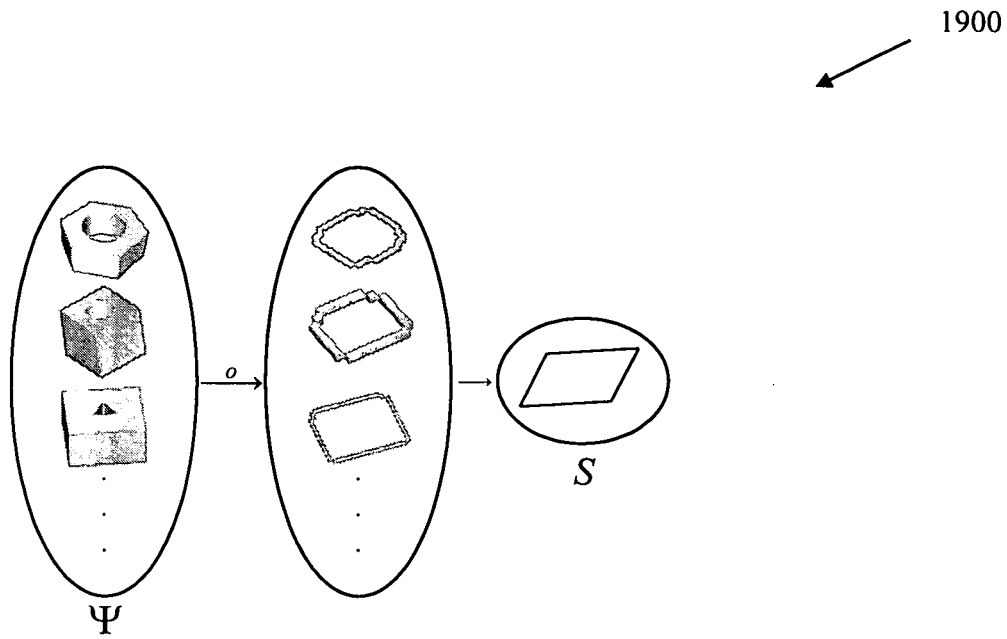
FIG. 19 is a diagram depicting skeletonization.

Examples of each type of shape are shown in FIG. 19.

2.2.4. Skeletonization Methods

It is observed that skeletonization methods for the above three categories of shapes are different from each other. FIG. 19 also shows the skeletonization methods for different categories of shapes. For example, a prismatic skeletonization method for solid shapes, a tubular skeletonization method for the special category of tubular shapes (which are shell-like) and a simplified wireframe method for the remaining shapes (which may be shell-like or hybrid). Any combination of prismatic, tubular and simplified wireframe skeletons could also be formed as a skeleton with appropriate user interactions.

2.2.4.1. Prismatic Skeletonization

Figure 20:
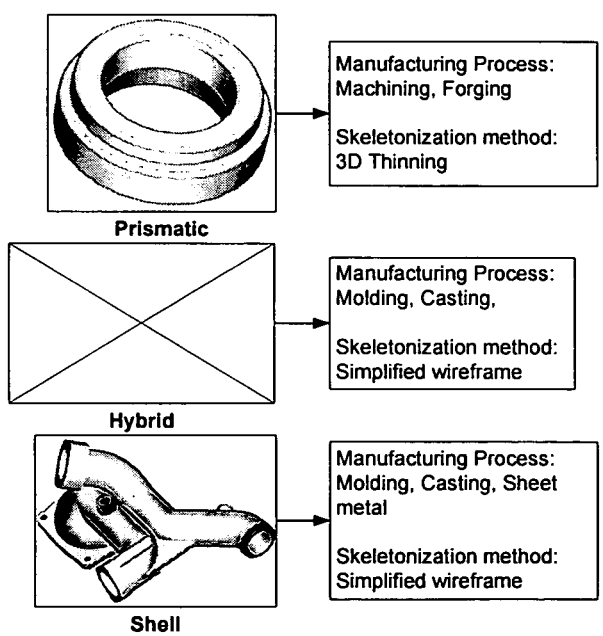
FIG. 20 is a diagram depicting categorization of sample shapes.

The concept of a skeleton is as a unique descriptor of shape. Thus, for some embodiments of this invention, a skeleton thereby describes a class of shapes that may have similar engineering characteristics. Various present embodiments search for similar skeletons, which will lead to similar shapes. A related area in image processing employs a skeletonization process for simplification of complex pixel (2D) or voxel (3D) discrete geometry into a wire (1D) representation. Three approaches for generating skeletons from 3D geometry are:

i. Distance transformation: Distance transforms which have been widely used for skeletonization. They are fast and easy to compute. However, skeletons from distance transforms require significant noise filtering and sometimes have topological instability. i.e. they do not preserve topology.

ii. Euclidean skeletons: Euclidean skeletons are also called medial axis transforms. They are computationally complicated and generate unwanted appendages during skeletonization. Because of these reasons, Euclidean skeletons will not be preferably used with various embodiments this invention. However, an additional pruning process can be developed for them to be used with the teachings of this invention. An example of a Euclidean skeleton is shown in FIG. 20.

iii. Thinning algorithms: Thinning algorithms are widely used in the medical imaging domain. Thinning is a process that reduces a voxel model to a skeletal representation that is a voxel thick. Voxels are removed after checking conditions for preserving topology. Six directions are typically defined for checking topological connectivity: UP, DOWN, EAST, WEST, NORTH and SOUTH. Two types of thinning algorithms conventionally exist—Serial and Parallel.

Figure 21:
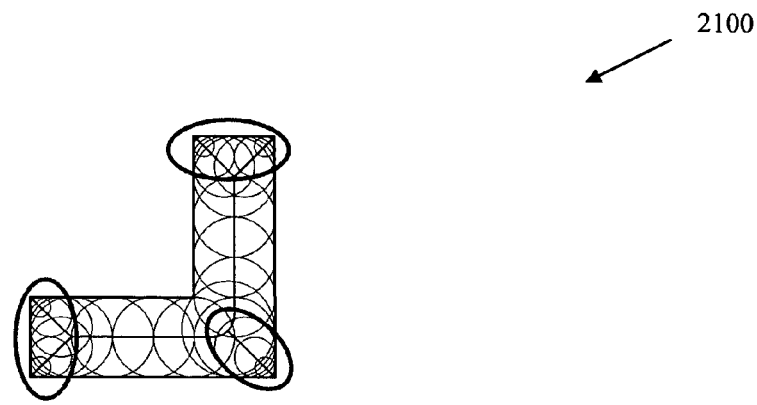
FIG. 21 is a diagram depicting an example Euclidean structure with unwanted appendages marked.

Serial algorithms, as the name suggests, perform thinning by removing voxels from any one of the six directions independently. Parallel algorithms remove voxels from all six directions concurrently. In practice any of these algorithms can be used for thinning. In this invention, any parallel thinning algorithm that reduces a 3D voxel model to a medial axis rather than a medial surface can be used. Examples of a 3D voxel model, its medial surface and its medial axis are shown in FIG. 21. Thinning is the one used method of skeletonization in this invention, since it best balances the requirements of topological connectivity, stability under small changes, and computational efficiency. Furthermore, a combination of distance transforms and thinning can be used for obtaining a prismatic skeleton.

2.2.4.2. Tubular Skeletonization

Figure 22:
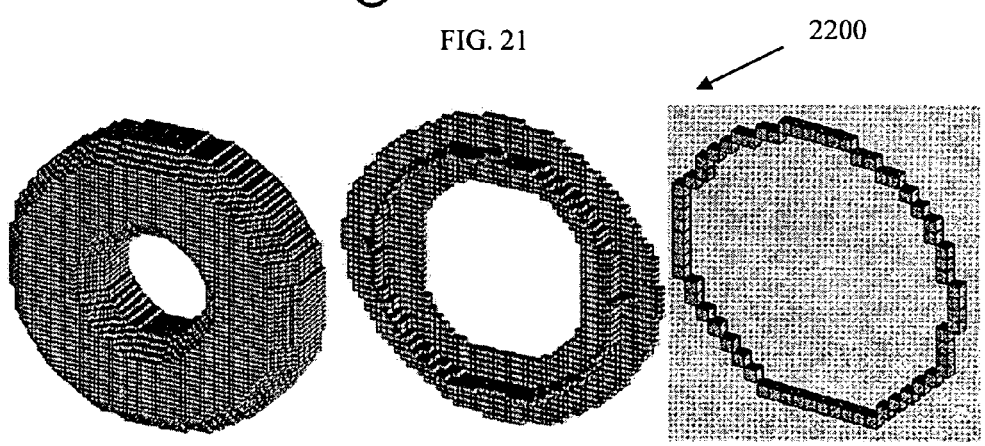
FIG. 22 is a diagram depicting an example 3D voxel model

Tubular model is defined as a 3D geometry model which includes one or more tube structure. Because a thinning algorithm is based on prismatic parts, thinning a 3D tubular part can sometimes cause an unexpected result. Thinning algorithms do not work well when a part is composed of multiple tubes as in the examples of tubular parts of FIG. 22. In this case, a pre-processing step called Filling Internal Cavity Volume (FICV) is applied to the part voxels to convert tubular part voxels to prismatic part voxels.

Figure 23:
FIG. 23 is a diagram depicting example tubular parts.
Figure 24:
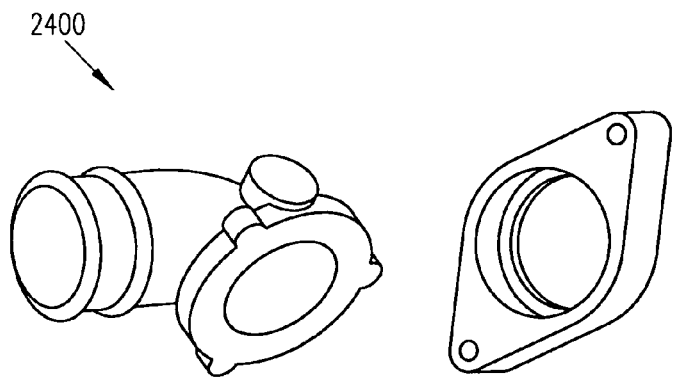
FIG. 24 is a diagram depicting example internal cavities.

FIG. 23 shows the volume that should be filled to convert tubular part voxels to prismatic part voxels. The shaded volume in FIG. 23 is called tubular cavity volume. The basic concept of FICV is filling the tubular cavity volume. To fill the tubular cavity volume, it is required to identify which portion of the cavity volume is to be filled among all cavity volumes in the boundary volume of the model. The cavity volume can be obtained through the voxel model. After voxelization, each voxel has a "1" value if the voxel is located in the model and has a "0" value if the voxel is located outside of the model. Image2 in FIG. 24 shows the voxelization result and image4 in FIG. 24 shows the inverse voxelization result which represents cavity volume. However, the cavity volume does not always mean tubular cavity volume because the cavity volume also includes some redundant volume in the boundary volume. On the basis of the voxel location, the cavity volume can be classified as internal cavity volume and external cavity volume. Internal cavity volume is a portion of cavity volume which is surrounded by a part. In a tubular structure, this internal cavity volume can represent the tube cavity volume. In contrast with internal cavity volume, external cavity volume is a portion of cavity volume which is located outside of the model boundary. The core contribution of the FICV process is how to identify tube volume, which is called internal cavity volume among cavity volume.

Figure 25:
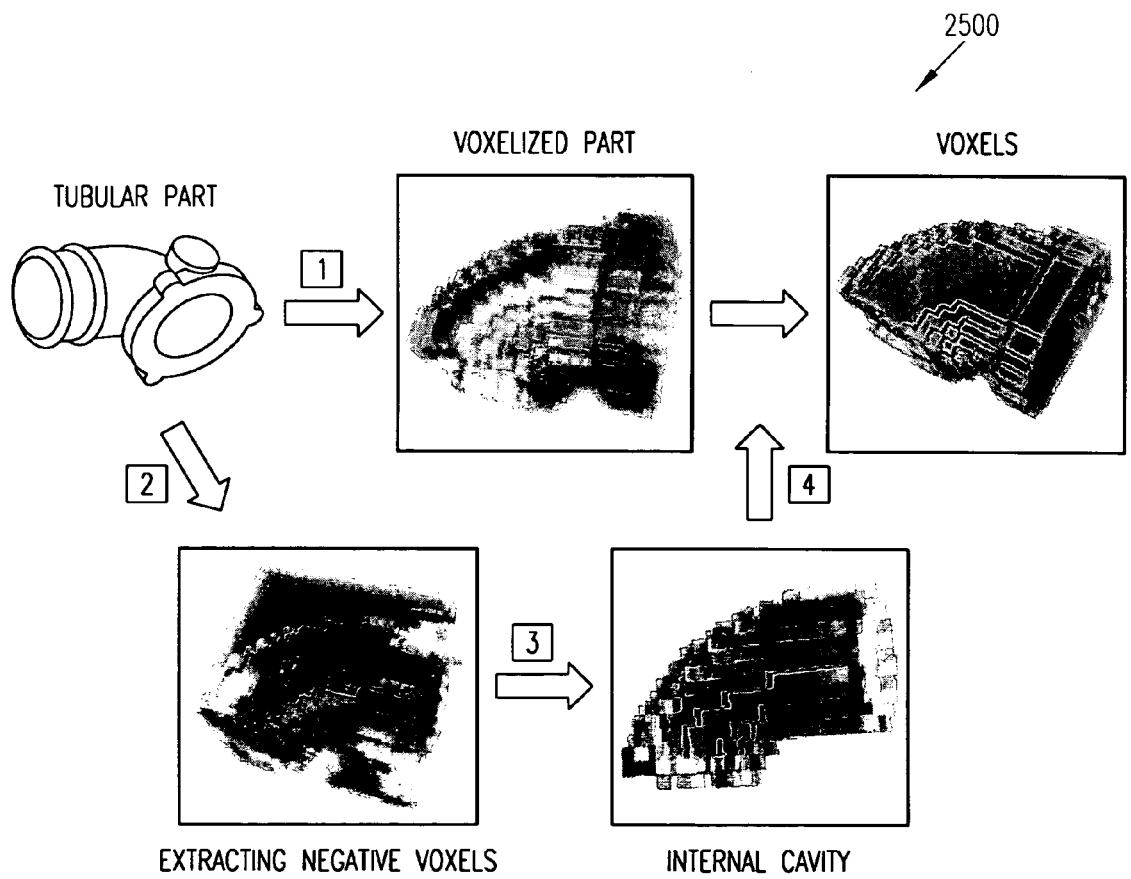
FIG. 25 is a diagram graphically depicting a technique for filing internal cavities and example pseudo code for the same.

One of the main properties of an internal cavity is its visibility. In most cases, the internal cavity volume is hidden or blocked by the model so it is less visible than the external volume. To measure how much visible a volume is, the degree of visibility is defined. The degree of visibility identifies how much a volume is visible. If the volume is completely visible in all directions, its degree of visibility is 1. If the volume is completely blocked by other object so that it is not visible in any direction, its degree of visibility is 0. In a case of the "A" cavity voxel (shown in FIG. 25), which is located on the entrance of tube volume, the voxel is half visible and half invisible and its visibility is 0.5. The basic strategy of FICV process is identifying the internal cavity volume using its visibility. First, FICV voxelizes cavity volume and measures a degree of visibility of each cavity voxel and determines a cavity voxel as internal cavity if its degree of visibility is low.

Figure 26:
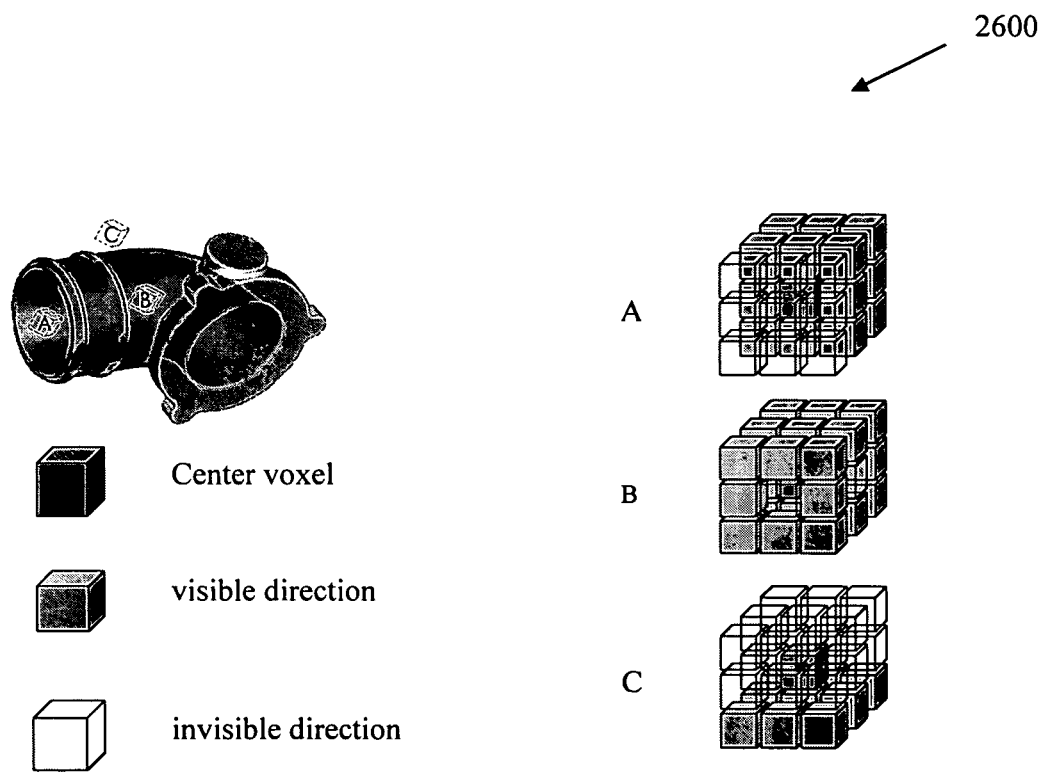
FIG. 26 is a diagram depicting classification of voxels based on visibility.

To represent a degree of visibility in mathematical form, the concept of solid angle is used with embodiments of this invention. A solid angle is defined as the angle subtended at the center of a sphere by an area on its surface numerically equal to the square of the radius. FIG. 26 shows the concept of solid angle. Other than FIG. 26, the diagram might suggest, the shape of the area does not matter at all. Any shape on the surface of the sphere that holds the same area will define a solid angle of the same size. Also, the diagram 2600 only shows the elements that define a solid angle, not the solid angle itself. The solid angle is the quantitative aspect of the conical slice of space, which has the center of the sphere as its peak, the area on the surface of the sphere as one of its spherical cross sections, and extends to infinity. The maximum solid angle is about 12.57, corresponding to the full area of the unit sphere, which is $4\pi$. Standard unit of a solid angle is the Steradian (sr). (Mathematically, the solid angle is unitless, but for practical reasons, the Steradian is assigned.) If all the visible directions are projected into the unit sphere, a degree of visibility can be defined as below:

$$\text{Degree of visibility} = \frac{\text{visible area in the unit sphere}}{\text{surface area of unit sphere}}$$

Figure 27:
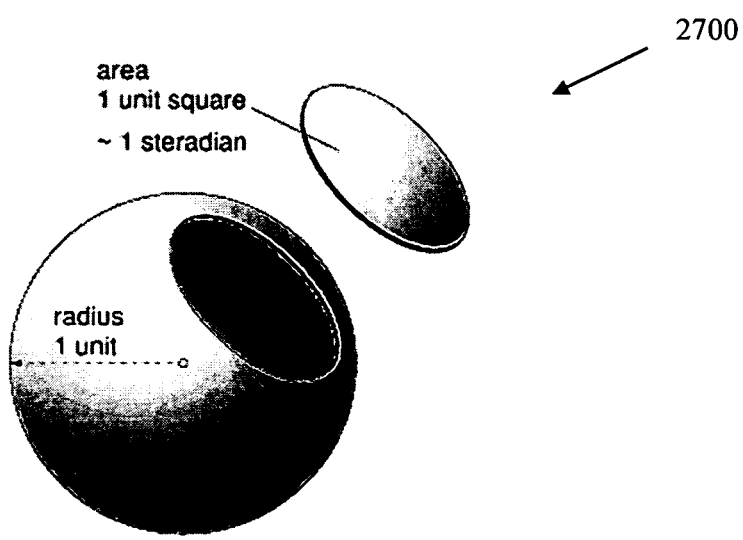
FIG. 27 is a diagram depicting an example solid angle.

Directional visibility is defined as whether a voxel is visible or not in certain direction. If it is possible to know all directional visibilities of a voxel, then the degree of visibility can be calculated. Since the number of directions from a voxel is infinite, the calculation cost to compute all directional visibilities of a voxel is very high. To save the cost of computation a discrete directional visibility is calculated. The idea of discrete directional visibility is defining equally distributed finite number of visible directions in a voxel and mapping the total number of visible direction to a visible area. If N equally distributed directions are defined and M visible directions exist, the degree of visibility can be shown to be M/N. To gather equally distributed directions, this invention uses a N×N×N size cube called a mask. FIG. 27 shows a 3×3×3 mask. In FIG. 27, each boundary voxel represents the possible visible directions from a voxel. For example, a directional mask voxel "A" represents the direction (−1,−1, 1) in Cartesian coordinate. If the voxel can be seen in the direction "A", then a mask voxel "A: is marked as visible. Otherwise, it is marked as invisible. In this case, each mask voxel is assumed to occupy $4\pi/26$ (total unit sphere surface area/a number of all possible directions) Steradian in the unit sphere. After acquiring all 26 directional visibilities, a degree of visibility can be calculated from below equation defines as:

Degree of visibility =

$$\frac{\text{visible area in the unit sphere}}{\text{surface area of unit sphere}} = \frac{\text{a number of visible mask voxels}}{\text{a total number of mask voxels}}$$

The idea can be extended to the N×N×N mask. For example, a 5×5×5 mask has $5^3-3^3=98$ directional mask voxels on the boundary of the mask and a N×N×N mask has $N^3-(N-2)^3=6N^2-12N+8$ directional mask voxels.

A directional visibility of direction (a,b,c) can be calculated using ray tracing method. A ray (a,b,c) is shot from the center voxel. If it go through any model voxel, then a voxel is not visible in (a,b,c) direction. In the other words, if a ray goes through all cavity voxels and finally hits a boundary, then a voxel is visible in the direction (a,b,c). To determine a directional visibility of (a,b,c) direction on the N×N×N mask, it is required to know the all position of voxels which are passed through by the ray (a,b,c) from the center of the mask. A 3D Bresenham algorithm is one of most popular algorithm to solve this problem.

Figure 28:
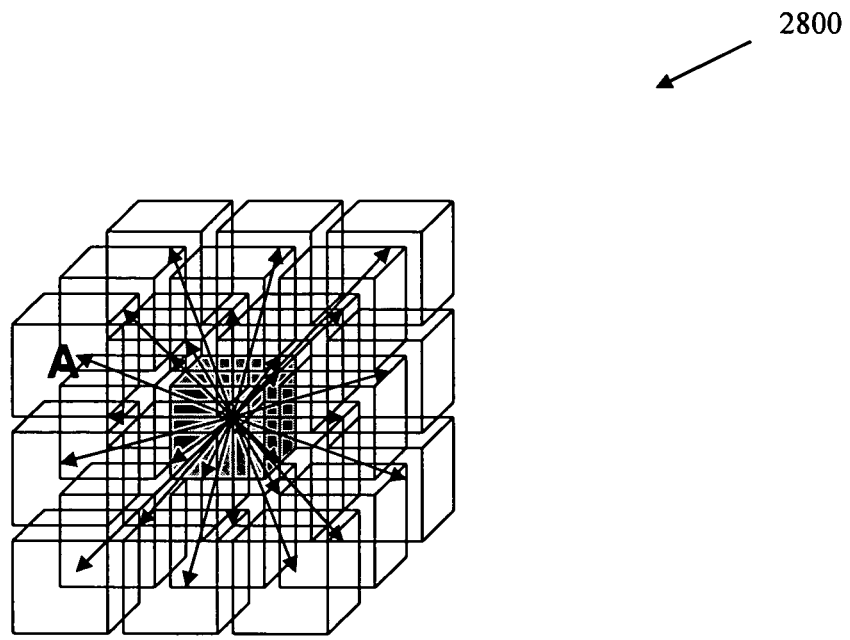
FIG. 28 is a diagram depicting an example 3×3×3 mask and its associated directions for an example shape.

With embodiments of this invention, it is demonstrated how to apply a 2D Bresenham algorithm for passing through voxels and extending it to 3D space. FIG. 28 shows how the Bresenham algorithm works in the two dimensional space. Assume that $u_y=v_x$ line in 2D plane in and the pen has been stepped from the origin to the position labeled "P". There can be two possible next steps: A diagonal step to point A and a horizontal step to point B. If $\overline{AE}<=\overline{BE}$, then the point A is closer to the exact line than the point B and otherwise, the point B is closer than the point A. Then, the algorithm selects the next step as the closer point and repeat to find next step. The algorithm can be extended to 3D domain. Assume that a line $$\frac{x}{u} = \frac{y}{v} = \frac{z}{w}$$

in 3D plane and |u|>max(|v|,|w|). Then, it is possible to apply Bresenham algorithm to P:(x,y) and Q:(x,z) domain and the result is a set of points as $(x_1,y_1)$, $(x_2,y_2)$, $(x_3,y_3)$ . . . and $(x_1,z_1)$, $(x_2,z_2)$, $(x_3,z_3)$ . . . . Then merge P domain and Q domain together by x. As a result a set of points $(x_1, y_1, z_1)$, $(x_2, y_2, z_2)$, $(x_3, y_3, z_3)$ . . . can be obtained.

Figure 29:
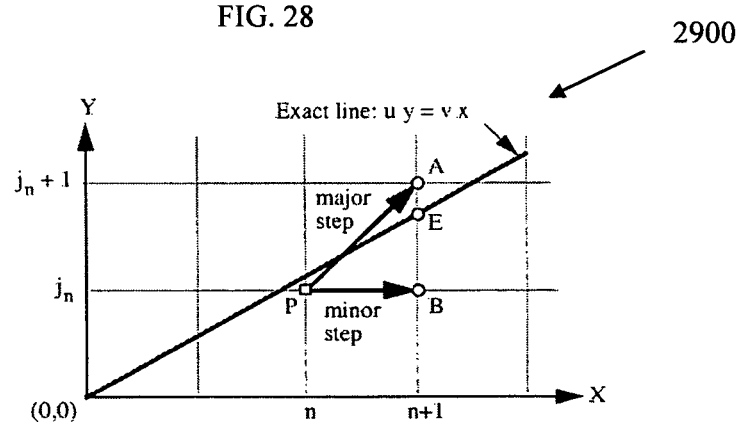
FIG. 29 is a diagram graphically depicting an example Bresenham algorithm in 2D spaces.

FIG. 29 shows how the directional visibility can be gained using Bresenham algorithm in the 7×5 mask in 2D. There is a voxel A(0,0) and direction mask voxel B(3,−2). To check Voxel "A'"s visibility of direction (3,−2), a process "FICV" checks all the voxels in the ray A-B whether the ray A-B is blocked by filled or model voxel or not. After applying the Bresenham algorithm, all the voxel "c" and "d" {c(1,−1), d(2,−1), B(3,−2)} which are located between voxel "A" and directional mask voxel "B" can be calculated. Each voxel is checked whether the voxel is filled or not and the direction AB(3,−2) is considered as invisible direction if voxel "c", "d" or "B" is a model voxel. If not, the test is extended to next pattern by adding stepping vector (3, −2) to the all voxels. c(1,−1)→c'(4,−3), d(2,−1)→d'(5,−3), B(3,−2)→B'(6,−4). Then, check again whether c', d' and B' voxels are a model voxel or not. The test is extended until the range of the voxel is out of boundary. For saving a cost of calculation, 3D Bresenham algorithm variables are stored in each direction mask so that it can avoid a redundancy of calculation for every cavity voxels.

Once all the directional visibility information is calculated, it is possible to determine the voxel is internal cavity or external cavity by a degree of visibility which is a number of all visible directions in N×N×N mask divided by a total number of all possible directions in N×N×N mask. According to statistical analysis, it is feasible to determine the voxel as internal cavity if a degree of visibility is less than 0.30.

The result of identifying internal cavity volume can have many applications. One of the applications is detecting core and split core candidates in casting area. In this invention, each internal cavity volume represents a core candidate depending on a parting direction. After parting direction is configured, this invention can also be applied to finding a number of cores and figure out a shape complexity of cores.

2.2.4.3. Simplified Wireframe

Figure 31:
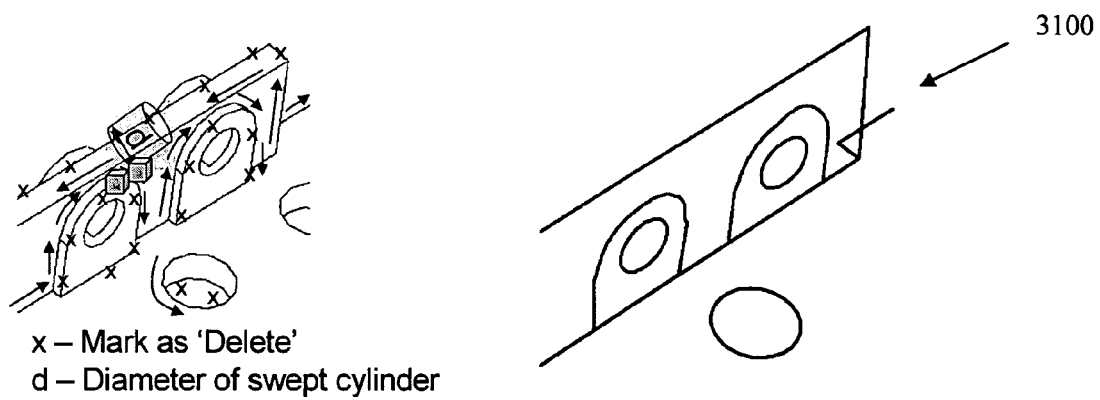
FIG. 31 is a diagram depicting an example wireframe technique.

The simplified wireframe skeleton starts with a voxelized model that has references to faces and edges of the 3D model. The objective of the simplified wireframe is to retain all 'major' features/portions of a 3D model, while preserving the 'major' topology of the 3D model. Furthermore, a level-of-detail simplification can be performed. A voxel wireframe model is constructed by retaining all voxels that have two or more faceIDs stored in the voxel as shown in FIG. 31.

The first step in obtaining a simplified wireframe is to preprocess the data and identify face loops. All face stacks are considered and they are sorted in order of descending number of voxels in them. Pick the stacks in order of descending number of voxels. For each stack, start at a voxel and check adjacencies with the neighboring voxels and form a linked list type of data structure with 'previous' and 'next' pointers. The loop ends when the first voxel is arrived to again. If all the voxels in a stack have not been traversed then the face has internal loops. Start with all the voxels that have not been traversed and repeat the previous step of forming a linked list type data structure. In this way one is able to identify all loops (connected or disconnected) in a face. The remaining task is to identify which loops are internal or external. Different methods can be used, but using an approach to check the number of voxels for each loop in a face is beneficial and optimal. The one with higher number of voxels is the 'External' loop and all others are contained inside it, i.e. 'Internal' loop. Thus all loops in a face stack are acquired with the distinction of each loop being internal or external. It is now easy to see that the loops identified fall along the edges of the 3D model.

Figure 30:
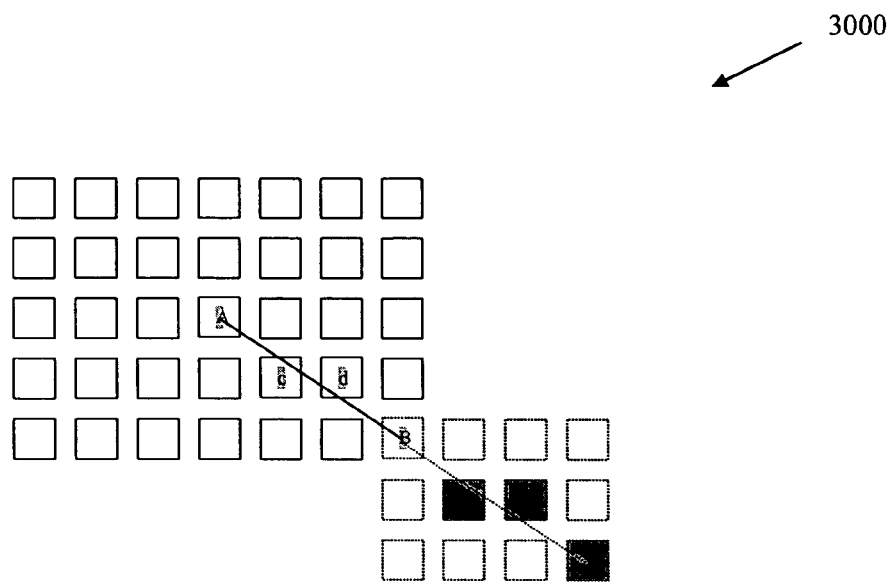
FIG. 30 is a diagram depicting another view of the example Bresenham algorithm of FIG. 29.
Figure 32:
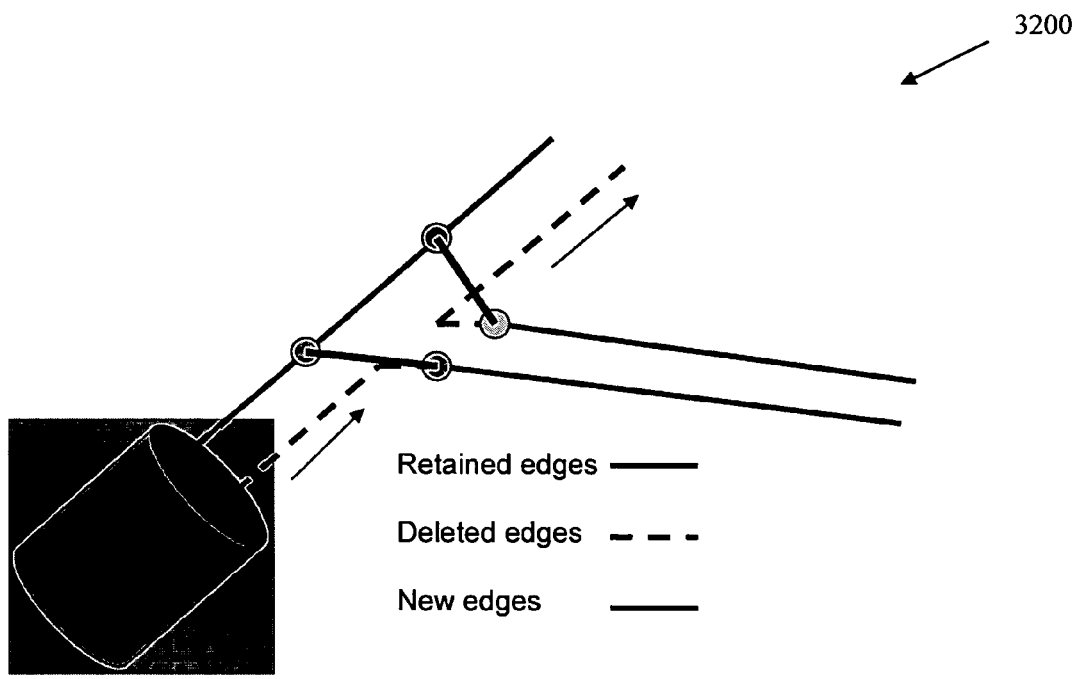
FIG. 32 is a diagram depicting the preservation of topology in an example wireframe model.
Figure 33:
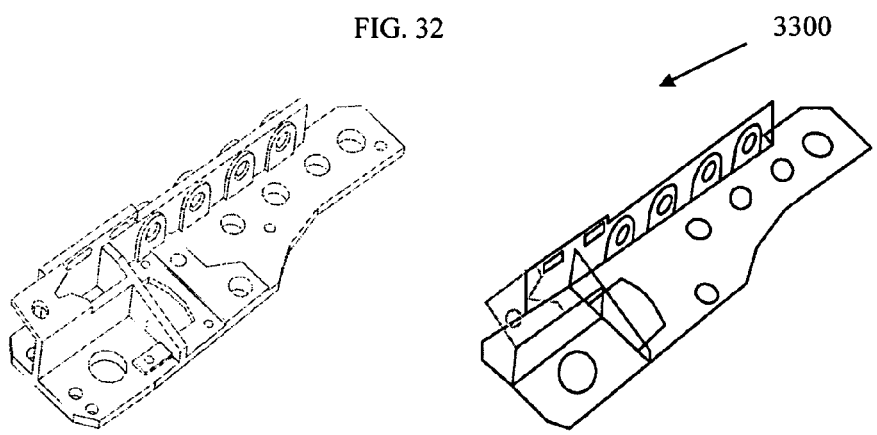
FIG. 33 is a diagram depicting a simplified wireframe model.

The next step is to traverse the loops in the voxel wireframe as shown in FIG. 30. Since we have all voxels and loops belonging to all edges in the 3D model, we can traverse the model along edges. Pick the longest edge in the model i.e. the one having most number of voxels. Construct an N×N×N mask, N=2n+1 (i=0, 1, 2 . . . , n) depending on the 3D model dimensions and other heuristics. Any voxel that falls within the mask while traversing the edges of the 3D model is marked as 'D' (for Deleted). After having completed traversing a loop, check if deletion of voxels will change topology drastically. Topology changes are identified by direction vectors changing direction rapidly, as illustrated in FIG. 32. Connect the voxels that when deleted will change topology drastically to the voxels that deleted them while traversing. While deleting voxels, the faceIDs and edgeIDs of deleted voxels are passed on to the voxels that deleted them. This process is repeated until all loops are exhausted. This gives the first level-of-detail (LOD) simplification as shown in FIG. 33.

For future LOD simplifications, the number of voxels in each retained loop is counted and the relation between loops is identified. i.e. are the loops intersecting, or do they share a common edge. This can be identified from the edgeIDs and faceIDs stored in the voxels. An example of LOD simplifications possible for a model is shown in FIG. 34.

If CAD system manufacturers store the model feature history in the CAD model and are able to roll back the CAD model, they are able to have a LOD reduction like ours. One can use such an LOD reduction as a skeleton.

2.2.5. Levels of Detail

Different details in engineering parts can be captured by the skeletal graphs at different levels for resolution for the same part. In various embodiments, a 3D model is represented at different levels of resolution by a hierarchical set of skeletal graphs. The various hierarchical skeletal graphs are generated by varying the voxel resolution for the 3D model as described in. The number of voxels for a 3D model is determined based on the smallest dimension of its bounding box. The voxel size is calculated as $s/2^n$ where s is the smallest bounding box dimension and n is the level of resolution desired. FIG. 35 shows example pseudo code used for producing some skeletons generated by varying the value of n.

Hierarchical structures are well supported by studies in human cognition. One such study suggests that that the perceptual approach to shape organization is dynamic. A partial order is apparent that relies on a hypothetical evolution or morphogenesis that is an integral part of the shape description. In the conventional approach, shapes that are visually not all that different ultimately end up in entirely different ball parks. In general, human comprehension of an object's shape follows the principle of "from remote to closer", "from outer to inner", "from total to detail,"

The hierarchical skeletal graph structure is an example of a dynamic approach to shape description. The advantage of using a dynamic approach is that similar shapes can be detected at different resolutions. For example, consider the shapes in FIG. 36. These shapes although visually similar, have very different shape descriptors through conventional approaches. The skeletons for these shapes at the same voxel resolution will also be different. However, they will yield similar skeletons at individually different voxel resolutions. Thus, one can detect them as similar at some level of detail.

2.3. Graph Creation

Figure 37:
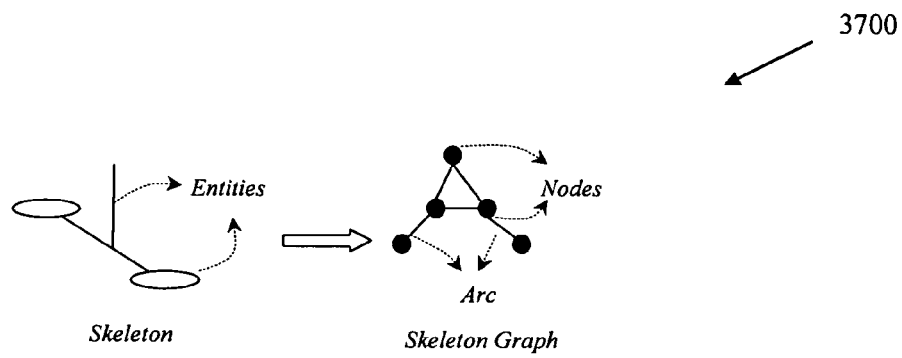
FIG. 37 is a diagram depicting an example skeleton graph.
Figure 38:
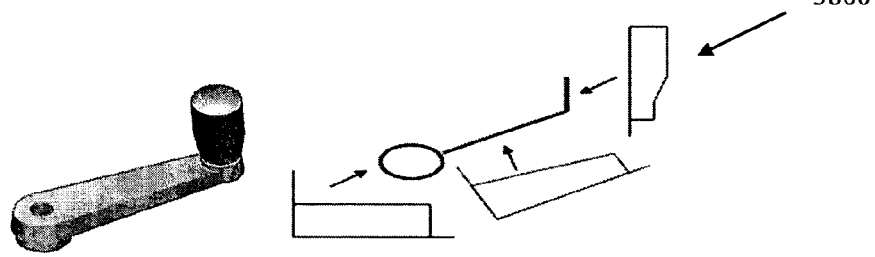
FIG. 38 is a diagram of example skeletal edges for local volume distributions.
Figure 39:
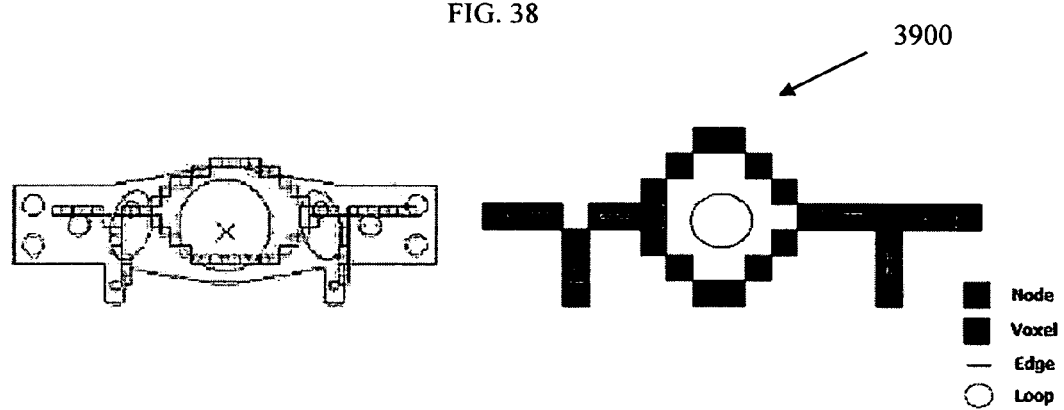
FIG. 39 is a diagram of an example CAD module with skeletal entities.

The skeleton obtained by the above method is processed to identify the high level entities—edges, loops, nodes. Edges are the set of voxels that form a basic geometric entity. Loops are a formed by a single or group of edges constituting a closed path. Nodes are the voxels that mark the ends/intersection of the edges/loops. An example of skeletal graph terminology is shown in FIG. 37. Example skeleton edges with volume distribution are shown in FIG. 38. Moreover, an example CAD model with example skeletons is shown in FIG. 39.

With various embodiments of this invention, a skeleton marching algorithm to identify these entities from the skeleton is depicted as example pseudo code 4000 of FIG. 40. This marching algorithm 4000 shown in FIG. 40 uses a set of masks to identify the types of neighboring voxels for each voxel in the skeleton. The algorithm 4000 selects a starting voxel for marching. An ordinary voxel has 2 neighbors. The number of neighbors for each voxel is calculated as they are visited. When a voxel has more than 2 neighbors, it is a potential node candidate. Also when a voxel has only one neighbor in its 26 voxel neighborhood it is a terminal node. Further processing is done at the region near these voxels to identify the correct nodes. The set of voxels visited between two nodes form an edge. This set of voxels forming an edge are then assigned an entity id and stored in the entity stack. A curve fitting subroutine is used to approximate the geometry of the edges. This can be used for exact matching in the search process.

When the marching algorithm 4000 revisits any node, it means that a loop has been traversed. The entity stack is then processed to identify the edge or set of edges which form the loop. The algorithm 4000 maintains a node stack and processes the branches at each node one by one. Once all the voxels are visited and the related edge/loop processing is done, the algorithm 4000 is complete. In the case of multiple loops in the same skeleton, some of the loops share one or many edges with other loops. The loops which do not share any edge or node with the other loops are called simple loops. The marching algorithm 4000 identifies all the simple loops. To get all the non-simple loops in the skeleton, some post processing needs to be done. The skeletal graph is analyzed based on the depth first technique to identify the multiple loops sharing an edge or a node.

Figure 41:
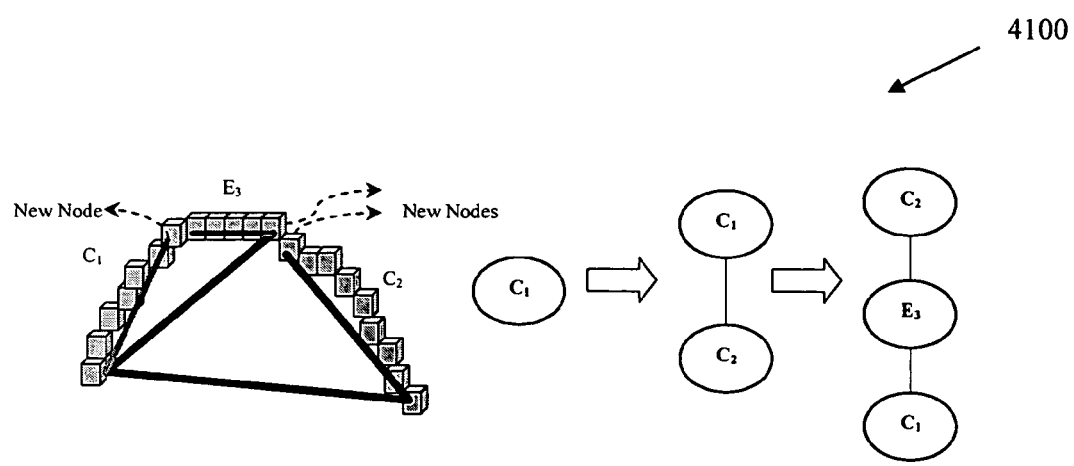
FIG. 41 is a diagram depicting edge segmentation.

Edge segmentation deals with converting the edges identified between junction vertices to simple geometric entities that can be easily compared. This involves checking whether a set of voxels belong to a straight line or planar curves without torsion. If the voxels do not form a planar curve, the curve is projected onto two perpendicular planes and the torsion values are used to segment the curve into planar curves. Each of the voxels in a set is treated as a discreet point in 3-space. A line is initially constructed between two newly found end points of the set of voxels. The distances between such straight lines and the farthest voxels in the set are used to determine new vertices and to form new simpler entities. This in turn causes new nodes and edges to be created in the skeletal graph. This process outputs simple entities that can be easily compared in 2D using curvatures at the low-level graph-matcher. FIG. 41 shows the subsequent steps in detecting new vertices and converting the curve to a set of simple segments (two planar curves $C_1$ and $C_2$, and a straight edge $E_3$). The diagram on the right of FIG. 41 shows the consequent changes in the graph structure due to creation of new entities.

Finally, an edge-loop list of the skeletal graph is constructed with pointers to the skeletal nodes. This graph is stored in the database for future search. Thus the geometry of the 3D model is captured in the individual entities of the skeleton (FIGS. 38 and 39) and the topology in the skeletal graph.

2.4. Feature Vectors Extraction

The skeletal graph is further processed to identify the graphs related feature vector components which can be used in the search. Some of the main components are the number of edges, loops, nodes etc. The skeletal graph is further processed to identify the degree of topological connections between the entities at the nodes. The different types of topological connections are represented by suitable Laplacian coefficients in the entity adjacency matrix calculated from the skeletal graph. More attributes are derived from the skeletal graph for use in the graph comparisons as described below.

2.5. Conversion of 2D Drawings into 3D Skeletons

The primary challenges of manufacturing companies are to design better products, in shorter time frames and at lower cost. Recently there has been a remarkable shift from 2D CAD design techniques to techniques that take the advantage of 3D solid modeling. With lower costs and universal accessibility to computer-aided tools, nearly all manufacturing firms have some kind of CAD systems installed. A 1998 survey by Mechanical Engineering magazine indicates that 96% of mechanical engineering professionals currently use a CAD system. But Despite the advent of affordable and easy to use 3D modeling technology, a majority of manufacturing firms still base their design processes on 2D CAD techniques and drawing data. A 1998 survey by the computer aided Engineering magazine revealed that more than 60 percent of CAD engineering work is done in 2D. Thus, there is a need for a search mechanism, which will allow designers to search for similar 3D models and 2D drawings for a given 2D drawing. Such a search system will enable companies to reuse their legacy data to the optimum. Most of the relevant work in the field focuses on the content/context based search mechanisms for retrieving similar parts and images. Geometry based search mechanisms have also been proposed to retrieve similar/matching 2D images & 2D drawings from a database. One such system has been proposed where images (drawings) are represented using attributed graphs based on extracted line-patterns or histograms of attributes computed from the graphs. Retrieval is either performed using histogram comparison or graph matching. Although, the method adopted by this approach includes the shape information, the fact that the three orthographic views are related to each other is not utilized to the fullest extent. These techniques compare different views to determine if two drawings match or not. Embodiments of this invention use an approach to convert the 2D drawing to a 3D model and search for similar models in 3D. The 3D representation obtained can be used to search for matching 3D models, thus allowing the search for 2D drawings and 3D models from a database of CAD drawings/models. This permits reuse of legacy data. A 3D shape search application has already been presented, which can use these reconstructed 3D models to search for similar models. The 3D model is first converted to a 3D skeleton and then it can be used for searching. Therefore, the technique is to come up with a 3D skeleton, which can be used by the 3D shape search engine.

Construction of solid models from engineering drawings continues to be a problem of interest. The work in this area dates back to nearly three decades. In these three decades many different approaches have been adopted to solve the problem, with fair amount of success. But the fact that the problem still remains a topic of interest is an indication of the complexity of the problem. The major driving factors in this field are design reuse, automatic verification of the consistency of complicated drawings and wide applicability. These generated solid models find applications in FEA, CFD, or simulation to analyze, optimize or evaluate the design and in manufacturing for rapid prototyping and NC path planning. There are two broad approaches for converting drawings to solid models. The existing methods of reconstruction of solid models from 2D drawings can be broadly categorized into two types:

Wire-Frame oriented approach or bottom-up approach.

Volume oriented approach or to-down approach.

The bottom-up approach assembles candidate vertices, edges and faces, in that order to construct the solid model. The top-down approach creates elementary solids by recognizing patterns in 2D projections and assembles them to get the solution.

Thus, embodiments of this invention convert a 2D drawing to a 3D skeleton.

Methodologies:

Conversion of a 2D drawing to a 3D skeleton can be achieved in many different ways. Some of the methods are listed as below:

a) Wire-Frame based Approach: Legacy data mostly exist as scanned drawings. Hence, it is most likely that input to can be a scanned drawing. The discussion hereafter will assume that the input is a scanned drawing. The wire-frame based approach will follow the following processing:

Pre-processing: This step converts the scanned 2D drawing into a vectorial format. The vectorized output contains data pertaining to the three orthographic views.

Vectorized drawing to 3D wire-frame: The three orthographic views are combined together to get a 3D wire-frame model.

3D wire-frame to 3D model: The 3D wire-frame model is then converted into volume based 3D model.

3D Model to 3D skeleton: The 3D model is then normalized and skeletonized to obtain a 3D skeleton. The processing after obtaining the 3D skeleton has been described in section 1.2.

b) Volume-Based Approach: The volume based approach will follow the following processing:

Pre-processing: This step converts the scanned 2D drawing into a vectorial format. The vectorized output contains data pertaining to the three orthographic views.

Vectorized views to 3D model: The three orthographic views model is then converted into volume based 3D model.

3D Model to 3D skeleton: The 3D model is then normalized and skeletonized to obtain a 3D skeleton. The processing after obtaining the 3D skeleton has been described in section 1.2.

c) Direct conversion to 3D Skeleton without obtaining any intermediate 3D model:

Pre-processing: This step converts the scanned 2D drawing into a vectorial format. The vectorized output contains data pertaining to the three orthographic views.

The Vectorized orthographic views are directly converted into a 3D skeleton: This process has been explained in section 2.3 above.

It is also important to note that immediately after the preprocessing is completed, normalization is done, to eliminate any size related errors.

Terminologies Used:

Terminology used is described below for purposes of readily comprehending various embodiments presented herein.

Figure 42:
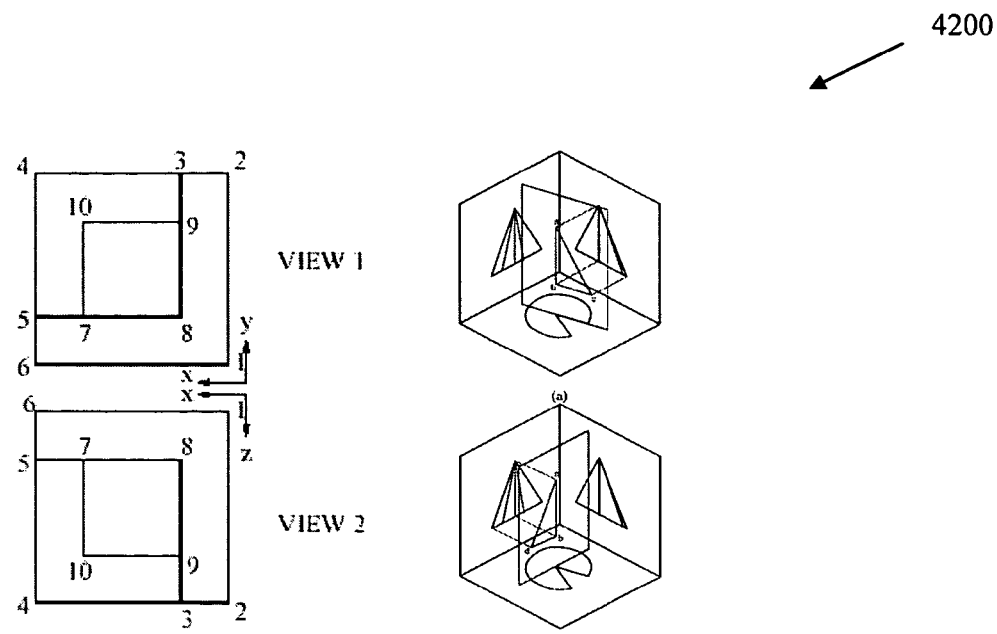
FIG. 42 is a diagram depicting the classification of loops.

1) Common Coordinate Axis: It is the coordinate axis that is common between pair of views.
2) Fundamental Edge & View—Edge: A 2D edge $^{G}E$ in a view G is said to be fundamental-edge, if there does not exist any vertex in view G, which lies IN edge $^{G}E$ Otherwise, it is called as view-edge.
3) Loop: A simple closed cycle of coplanar edges is defined as a loop.
4) Tangency vertex: A vertex in a 2D view that separates a pair of edges, which are first order continuous, is said to be tangency vertex. Since the notion of tangency vertex is associated with a pair of edges, it is used for vertices in a loop.
5) Silhouette vertex: A tangency vertex $^{G1}V$ in a 2D view G1 is said to be silhouette with respect to an adjacent view G2, if the tangent to the edges at that vertex is perpendicular to the common coordinate axis between G1 and G2. Silhouette vertex is therefore defined for a pair of views.
6) Classification of loops: A loop $^{G}L_2$ can be classified with respect to the loop $^{G}L_1$ as follows:
   Loop $^{G}L_1$ is said to have IN loop $^{G}L_2$, if all edges $^{G}E$ belonging to $^{G}L_2$ lie inside loop $^{G}L_1$.
   If some edges belonging to $^{G}L_2$ lie inside and others lie on the boundary of the region P, then $^{G}L_1$ is said to have ON-IN loop $^{G}L_2$.
   $^{G}L_1$ is said to have a ON-OUT loop $^{G}L_2$, if some of the edges belonging to $^{G}L_2$ lies outside and others lie on the boundary of the region P.
7) Dotted Loop & Solid Loop: A loop in 2D view is said to be a solid loop, if all of its edges are represented as solid line type in the view. Otherwise, it is called as a dotted-loop.
8) Adjacent loop: If two loops in a view have one or more common edges, then these loops are said to be adjacent loops.
9) Fundamental Loops and Non-Fundamental loop: A Fundamental loop is an edge loop that does not have any ON-IN loop in the view but it may have an IN loop. All other loops are called non-fundamental loops. FIG. 42 presents example classifications of loops. In FIG. 42 {1,2,3,9,8,7,5,6,1}, {8,9,10,7,8} and {3,4,5,7,10,9,3} in view 1, are fundamental loops.
10) Disjoint Loop: A disjoint loop is that fundamental loop which does not have any ON-OUT loops in the view but may have an OUT loop.
11) Matching Vertices: A vertex $^{G1}V$ in a view is said to be matching with a vertex $^{G2}V$ in another view G2, if they have the same coordinate value along the common coordinate axis. The matching vertices can be denoted by $^{G1}V\mathord{<}\mathord{-}\mathord{>}{}^{G2}V$. There may be more than one matching vertices in a view matching a vertex in other view.
12) Matching Loops: A loop $^{G1}L$ belonging to G1 is said to have matching loop $^{G2}L$ belonging to G2 (G1 !=G2), if every vertex $^{G2}V' \subset {}^{G2}L$ matches with at least one vertex in $^{G1}V \subset {}^{G1}L$. $^{G2}V'$ is obtained by removing all tangency vertices that are not silhouette vertices for the pair of views. Note that it is not necessary that $^{G2}L$ also have $^{G1}L$ as a matching loop. But if it does, then the two loops are known as onto-matching loops. They are denoted as $^{G1}L\mathord{<}\mathord{-}\mathord{>}{}^{G2}L$.
13) Onto formation: An onto-formation is a set of loops (l) satisfying following properties:
   a. For i,j=1, . . . n (i !=j), $^{Gi}Li\mathord{<}\mathord{-}\mathord{>}{}^{Gj}Lj$, where $^{Gi}Li$, $^{Gj}Lj$ belong to set l.
   b. |l|=n, where n is number of input 2D views.
14) Desirable Edge: It is an edge in the input orthographic views that is not there in the 2D projections of the current solid.

Example Embodiment of Method:

In the following sections, the processing for the above referenced methodologies is described:

1. Preprocessing:

In order to solve the problem of 2D shape searching, one first needs to transfer the document to electronic formats. The most widely used method is scanning, which produces "raster images". The scanned drawing is broken down into a matrix of pixels. But the semantic information contained in the document is not transferred to electronic file, i.e. the meaning of the symbol is not interpreted. Hence, some preprocessing steps known, as "Vectorization" is needed, by means of which the information necessary to define geometrical entities (such as straight lines, arcs, etc.) and symbols (such as letters) is obtained from a raster image. Hence the information stored on an electronic file can be interpreted and used for searching based on feature and reused based on solid model/skeleton reconstruction.

Scanning Type

Most engineering drawings can be scanned as 1-bit monochrome. It takes less storage space and is faster in displaying and processing. For drawings with dirty and smearing background, such as old blue prints, they can be scanned as 8-bit grayscale and enhanced using imaging software to remove background and noise (Noise and other artifacts can be easily smoothed out using a pair of gray level thresholds before automatic vectorization).

Raster to Vector Conversion

After obtaining a scanned raster image, one needs to convert it into vector format for further manipulation. A complete raster to vector conversion process includes image acquisition, pre-processing, line tracing, text extraction, shape recognition, topology creation and attribute assignment. Several raster to vector conversion software packages are commercially available for various types of applications. For engineering drawing conversion, in order to extract vectors from a raster image, it needs to determine which parts of the image constitute lines, and where those lines start and end. Typically there are two processes involved:

1. Treatment of the image (remove background and noise).
2. Thinning of the raster image to single pixel width lines.
3. Vectorization (Extraction of the edge from the pixel lines).
4. Entity recognition (define straight lines, arcs, circles, line loops, etc.)

The approach to reduce thick or blobby regions down to single pixel width items, so that the image is transformed into lines of pixels is called thinning. There are many current available thinning and edge detection methods, each utilizing different mathematical algorithms and producing different results.

All of these preprocessing steps involve image processing for understanding the information contained in the images in order to extract the relevant shape information.

2. Conversion of 3D Orthographic Views into 3D Model Using Bottom-Up Approach:

The wire-frame approach is also known as bottom-up approach. The various processing involved in this method are as follows:

Generate 3D candidate vertices from 2D vertices in each view.
Generate 3D candidate edges from 3D candidate vertices
Construct 3D candidate faces from 3D candidate edges on the same surface
Construct 3D objects from candidate faces.
Merits of this Approach:
More accurate
Other metrics which are usually obtained from ACIS can also be obtained
De-Merits of the Approach:
Problems may arise as a result of inconsistency in the input views
It is computationally very expensive. Especially, the conversion from a wireframe to solid is very computationally expensive, as it involves search with possibility of backtracking and heuristics to choose solution solid from a very large number of potential solids.

3. Conversion of 3D Orthographic Views into 3D Model Using Top-Down Approach:

The general processing, involved in this approach are described below:
1) Construct pseudo vertex skeletons.
2) Construct pseudo wireframes.
3) Construct virtual faces.
4) Introduce cutting edges.
5) Construct virtual blocks.
6) Make decisions.

Figure 43:
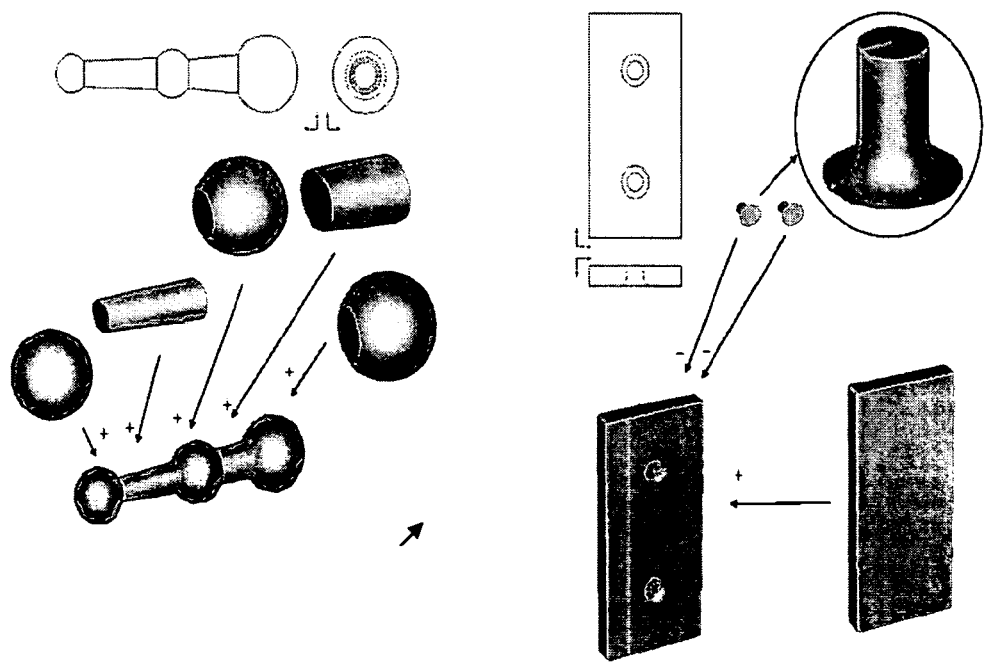
FIG. 43 is a diagram graphically depicting volume based reconstruction.

FIG. 43 presents more details of this process. There may be other methods as well. In another embodiment, a cell-based reconstruction is used. Similarly, two-phase reconstruction has also been developed.

Merits of this Approach:
Always have a valid solid model consistent with the input views.
Compared to wire-frame method, computationally inexpensive.
For shape searching, only an approximate 3D model is sufficient.
De-Merits of the Approach:
This approach is limited to only domain of objects they can handle.

4. Direct Conversion to 3D Skeleton without Obtaining Intermediate 3D Model:

As mentioned before, for 3D shape searching a valid 3D skeleton is sufficient. Hence, a method is presented for converting a given set of 2D orthographic views directly into a 3D skeleton. The 2D skeletons are obtained for each of the three orthographic views; the orthographic views are then combined to obtain the desired 3D skeleton. This method can be further subdivided into two approaches depending upon the 2D skeletonization process. The first approach uses image-processing methods to perform the skeletonization, and the second approach uses geometry based methods to do it. The following discussion assumes that geometry based approach for obtaining the 2D skeleton, but the approach can be modified suitably to work with the first approach as well.

Formation of Doubly Connected Linked List and Face Structure:

The line segments forming the three orthographic views are then expressed in a doubly connected linked list structure. Methods have been proposed for building a doubly connected linked list structure. A doubly connected linked list is an efficient representation of arrangement of line segments.

The data structure for vertex is expressed as:
X-coordinate of the vertex.
Y-coordinate of the vertex.
List of Incident Edges (ordered in counter-clockwise direction of the slope).
The Data structure for the Half Edge is given as:
Origin vertex.
Twin Half-Edge (the one coming in)
Incident Face (every half edge belongs to exactly one face)
Next Half-Edge (the next connected half-edge belonging to the face).
Previous Half-Edge (the previous connected half-edge belonging to the face).
Slope angle (between 0 to 360 degrees)
The data structure for a face is given as:
Starting edge of the outer loop.
List of starting edges of inner loops.

Hence, to travel the incident edges on a vertex in counter-clockwise direction, one can use the above data structures to full advantage. Given an edge incident on the vertex, one takes the twin of that half edge and finds the next half edge to that half edge. This will give us an incident half edge from the given vertex. The obtained half edge is the next in counter-clockwise direction, because the half-edges forming the faces have been obtained by walking in counter-clockwise direction through the edges. The same procedure can be repeated, to find all the faces/loops in the arrangement. The data structure and details of the algorithm are conventionally available. The arrangement of the set of line segments can be constructed in O(n Log n) time.

Identification of Matching Vertices, Edges and Loops of the Three Orthographic Views The identification of matching vertices, edges and loops has been conventionally explained in detail and is readily available to one of ordinary skill in the art. The method for finding matching loops and vertices has also been described:

1. Matching Vertices and Loops: Matching of loops and vertices implies grouping of the entities that correspond to the same entity in the 3D solid. The tangency vertices other than silhouette vertices are not used while matching a pair of two loops in different views. And vertices are matched according to the value of common coordinate. If loops are matching each other, then they are flagged as onto-matching.

2. Onto formation: For finding an onto-formation, loops matching a disjoint loop or a fundamental loop are considered. A loop in view can have fundamental or non-fundamental matching loops in the adjacent views. First of all, all fundamental loops matching the loop under consideration are checked, if they are onto-matching. Any onto-matching loops obtained are stored in a list. Next, it is checked if it is possible to obtain a non-fundamental onto matching loop by merging of adjacent fundamental loops, each of which matches the fundamental loop in the other view under consideration. These are stored for further processing. The data structure used for storing these entities is a graph.

In general, onto-formations are identified across the given set of views. In FIG. 44, loops are represented as nodes and edge joining two nodes shows that the two loops are onto-matching. This can be seen as a n-partite graph of loops, where n is the number of loops. So finding onto-formation is equivalent to finding a sub-graph of cardinality n. A breadth-first-search is used to find this in n log(n), where n is the average number of loops under consideration. An onto-matching set of loops is a set of loops in all the views, which are onto-matching with each other.

Cleaning Up the Three Orthographic Views:

After the set of onto-matching loops have been obtained, those set of onto-matching loops are eliminated, which describe small features. Care should be taken that the set of onto-matching loops are only disjoint or fundamental loops. Also, the resulting views should not be disconnected as a result of removal of these loops.

Figure 45:
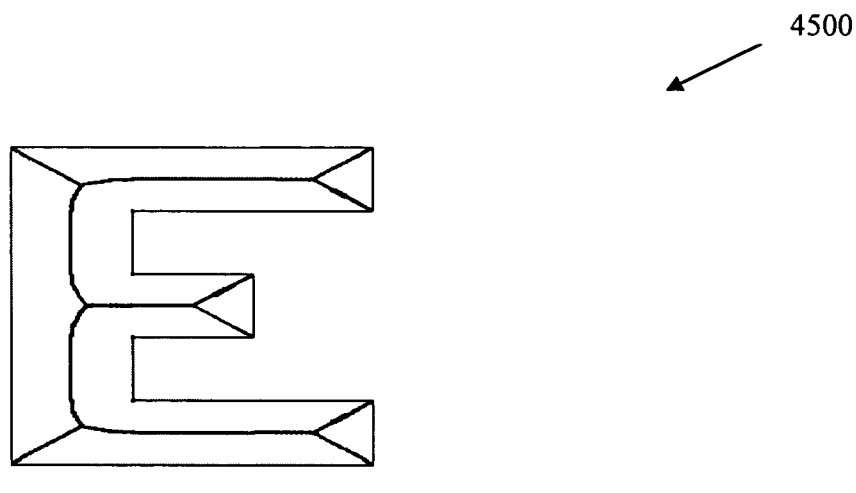
FIG. 45 is a diagram depicting an example skeleton model.

2D Skeletonization:

In the next step, these loops or faces are skeletonized to simplify the drawing while retaining the topology. Various methods have been proposed to obtain the skeleton for polygonal figures. Most of these methods determine the Medial Axis Transform (MAT). Most of these methods either make use of Voronoi diagrams or Delaunay Triangulations. There have been other approaches, which obtain the skeleton or MAT without using Voronoi or Delaunay triangulation. Also, adaptive subdivision algorithms have been proposed, which make use of Delaunay triangulations. A skeleton of a 2D region is defined as a set of its interior points that have not less than two nearest neighbors. The skeleton of polygonal figures can be obtained in O(n log n) worst case time, where n is the number of nodes of the polygonal figure boundary. FIG. 45 shows the skeleton for a general 2D polygonal figure.

Figure 46:
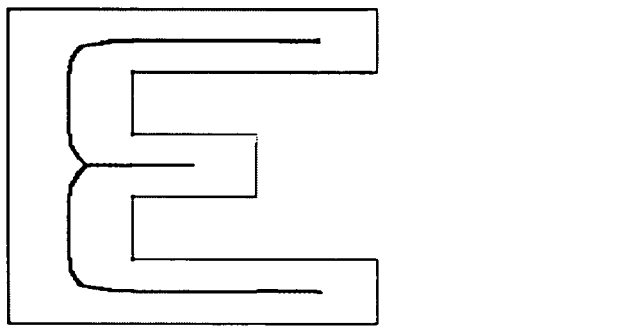
FIG. 46 is a diagram depicting a cleaned-up skeleton model.

Cleaning Up the Skeleton:

It can be observed from FIG. 45 that some portions of the obtained 2D skeleton are not required. The edges of the skeleton, which touch the boundaries/vertices of the input views, are then eliminated. Hence, a simplified skeleton is obtained (shown in FIG. 46).

Using Matching-Loop and Adjacent-Loop Relations Connect these Edges of the Skeleton in the Three Views to Obtain a 3D Skeleton:

Once the skeletons of various faces have been cleaned up, the next step is to connect the skeletons in the three views to arrive at the 3D skeleton. Referring now to FIG. 44; FIG. 44A shows an actual 3D model; and FIG. 44B shows the 2D orthographic views for the given object. FIG. 44C shows the cleaned up skeleton for each of the views. Using the matching loops obtained in the first $2^{nd}$ step, the connectivity of various edges of the 2D skeletal edges is determined. To maintain the connectivity all matching loops are connected, and also it is made sure that each edge in the 3D skeleton appears just once. For example, in the front view, the vertical line denotes the depth/height of the figure. Also in the side view the 5 vertical lines, too, give the depth of the figure. Hence in the final skeleton, only one vertical edge is retained to denote the depth of the figure.

Edges of 3D Skeleton are Voxelized:

Once the 3D edges are obtained, they are then converted into voxelized representation. Basically, voxelized representation is a discretized representation of the edges in the 3D skeleton. This step is a simple processing step. For more information on Voxelization and Normalization refer to subsection 2.1 above.

Store the Connectivity of Various Loops and Edges in a Data-Structure:

Finally, when the 3D skeleton is obtained, the various loops, edges, etc. are stored in a skeletal graph data structure as described in subsection 2.2. This is then provided as input to the graph comparison module.

3. Database, Search and Clustering 3.1. Compare Graphs

The search system searches for graphs in the database which are similar to the skeletal graph of the query 3D model. The system evaluates a similarity measure based on the degree of matching between the query graph and each of the models in the database. The current invention represents the skeleton in the form of an undirected graph, where a node of the graph represents an edge/entity of the skeleton, while any arc joining two nodes of the graph represents the connection between the corresponding skeletal entities. Hence, the skeleton is essentially represented as an edge-graph. Each node in the graph preserves the following geometric properties of the skeletal edge:

(1) Edge type (straight line, curve, surface loop or hole).

(2) Curvature information for surface loops (Convex/Concave/Plane).

(3) Parametric equation of the curve.

(4) Local Volume of the features that converge to the particular entity.

(5) Local Moments of the features that converge to the particular entity.

(6) Local Distances from the surface.

Figure 47:
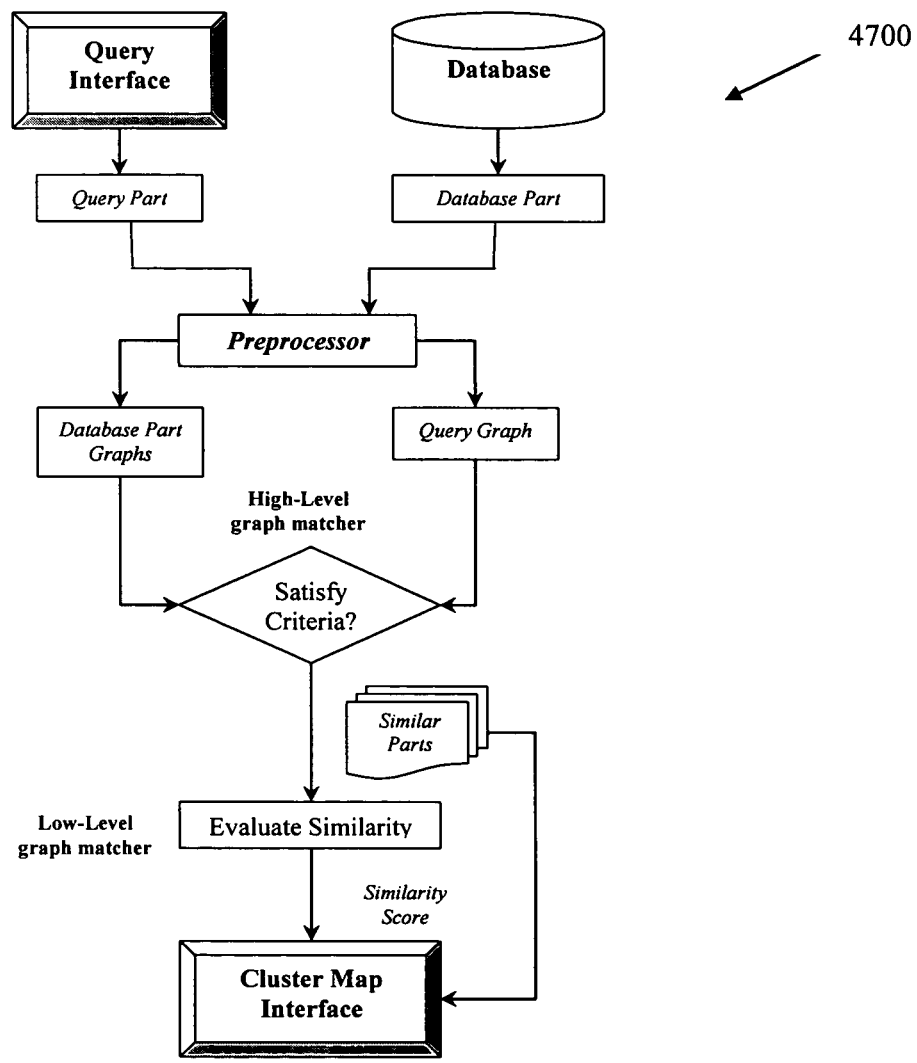
FIG. 47 is a diagram of a flowchart for the data flow associated with a marching algorithm.

Hence, the topology of the skeleton is captured by the topology of the graph, while the geometry is preserved in the nodes of the graph. FIG. 47 presents a flow chart of the graph matching module of the current system.

High-Level Graph Matching

The first two properties (1 and 2) cited above are used for a high-level graph matching step (see FIG. 47) after which a small subset of the database having similar models is retrieved. These models have overall geometric and topological similarity with the query model. In a follow-up step the retrieved models are further ranked (low-level graph matcher), based on the similarity of the individual geometric properties (3), (4) and (5) as described above. Hence, the high-level matcher filters the search space to find relevant parts. This filter uses graph properties including the highest degree of nodes, number of surface loops, number of straight and curved edges, and the number of holes in the skeleton to filter out graphs that are not close to the query model (or query graph).

The smaller set of models retrieved by the high-level graph matcher is then passed onto the low-level graph matcher. The low-level graph matcher which finds a similarity degree between the query model and these models, based on a graph matching algorithm as described below. However, the user may also choose to perform matching only at a higher level of abstraction using topology and high-level geometric properties. To enable this matching, the adjacency matrix of the graph is designed to represent these geometric properties. A non-zero entry in the matrix represents a connection between two geometric entities (topology). The value of the entry uniquely represents the type of connection (edge-loop, loop-loop, surface-surface, edge-edge, and so on). This adjacency matrix can be used for any graph matching method including the decision-theoretic sub-graph isomorphism algorithm as well as association graph techniques.

Low-Level Graph Matching

Various algorithms have been proposed in the past for comparing graphs and evaluating a similarity measure as described in the prior art section. These algorithms can be broadly classified into exact and inexact graph matching algorithms. While the former class of algorithms detects an exact match (i.e. without noise) between two graphs or sub-graphs of two graphs, the latter set of algorithms provides a fuzzy measure of similarity between two graphs in the form of a distance measure even in the presence of noise. Since the requirement of our system is to find parts that are similar (not exactly same), our system uses inexact algorithms for the purpose of graph comparison.

Traditional graph isomorphism for graph comparison leads to NP-complete problem, i.e. it is not possible to find a solution using a computer except for small graphs. The field of inexact graph matching (also called error-tolerant graph matching) has been studied for many years leading to many different frameworks of solutions. The association graph technique has been applied successfully to compare graphs in various applications including similarity of scene graphs. In the current system, the graph matching problem is converted into a maximum weighted-clique problem by forming the association graph for the query and model graphs. In the current invention probabilistic weights are included in the association graph nodes. These weights are evaluated based on the local geometric feature similarity of the entities including (1) curvatures, (2) local volumes, and (3) local moments. This allows for fuzziness in the similarity measure between models so that the relevant models are not rejected.

Association Graph Technique

Although, the association graph method is well-known in the field of graph matching for computer vision and pattern recognition, the method is describe here (in the context of our problem) for the sake of completeness along with the modifications to make it suitable for our problem. The nodes of an association graph (or assignment graph) represent the vertex pairs $(V_Q, V_M)$ of the graphs to be compared (say, $G_Q=(V_Q, E_Q)$ and $G_M=(V_M, E_M)$). A vertex pair $(v_Q, v_M)$, such that $v_Q \in V_Q, v_M \in V_M$ is called an assignment if the nodes $v_Q$ and $v_M$ have the same node property descriptions, and two assignments $(v_Q, v_M)$ and $(v_Q', v_M')$ are compatible if (in addition) all relations between $v_Q$ and $v_Q'$ also hold for $v_M$ and $v_M'$. The set of assignments defines the set of nodes $V_a$ of the assignment graph $G_a$. Two nodes, $V_a$ and $V_a'$, are connected by an arc in the assignment graph, $G_a$, (see FIG. 48) if these two nodes are compatible. Hence, the search for maximum matching sub-graph of two graphs $G_Q$ and $G_M$ is a search for the maximum clique (totally connected sub-graph) of the association graph $G_a$. Instead, if the assignments also represent a measure of similarity between $v_Q$ and $V_M$, represented as weights, then the graph matching problem is converted into a maximal weighted-clique problem. Hence, the largest maximal weighted-clique in the association graph will represent the best match between the two graphs $G_Q$ and $G_M$.

Local Similarity Metrics

This section is devoted to describe a shape matching algorithm in detail which is based on an association graph technique. Although the words 'node' and 'vertex' as well as 'edge' and 'arc' are interchangeably used in graph theory, for the sake of clarity a skeletal graph is described as using nodes and edges, while an association graph is made up of vertices and arcs. Vertices of an association graph represent the correspondences between nodes of the two original graphs. This process of determining correspondences between nodes is called association. In addition the arcs connecting two vertices of the association graph represent the compatibility between the corresponding nodes.

A graph A is represented as set of vertices $A_i$, a set of edges Aij, and set of vertex attributes, $v(A_i)$ and edge attributes.

A skeletal graph structure, in various embodiments presented herein, distinguishes between edges and loops; associations are allowed only between entities of the same type, and thereby associates loops of one graph only with loops of the other skeletons and so on. Similarity between associated nodes (say A1 and B2) is determined based on the length similarity as well as degree similarity. Weights are assigned to these two metrics.

Hence, the similarity between node A1 of graph A and B2 of graph B is represented as the weight of the nodes and is given by Equation (1).

$$VertexSimilarity(A_1, B_2) = W_l(1 - |l_{A1} - l_{B2}|) + W_d\left(1 - \frac{|d_{A1} - d_{B2}|}{\max(d_{A1}, d_{B2})}\right) \quad (1)$$

Here, $l_{E_i}$ is the length of entity $E_i$ while $d_{E_i}$ is the degree of entity $E_i$. $W_l$ is the weight given to the length similarity, while $W_d$ is the weight given to similarity between the skeletal entities based on their degree (number of other entities connected to the entity under consideration). A higher weight on the degree of nodes will retrieve models more similar in topology while a higher weight on the length similarity will result in models with higher geometric similarity. Correspondingly, the user can also change these weights depending on the search criteria. Additional metrics comparing other local properties including (i) Volume Distribution, (ii) Distance Transform, (iii) Local Principal Moments, and (iv) Local Curvature. These terms are added to equation (1)

Similarly, the arc of an association graph represents whether the corresponding entities are connected and if so the relative similarity between the entities. For example, the arc connecting the nodes (A1-B2) and (A2-B3) will describe whether A1 is connected to A2 and whether B2 is connected to B3. In addition, it may also contain other heuristics that better describe the connections between the corresponding entities, such as the angle between connected entities. In one implementation the measure given by Equation (2) I used to determine the weight on the arc.

$$EdgeSimilarity(A_1 A_2, B_2 B_3) = W_{lr}\left(1 - \left|\frac{l_{A1}}{l_{A2}} - \frac{l_{B2}}{l_{B3}}\right|\right) + W_\theta\left(1 - \frac{|\theta_{A1A2} - \theta_{B2B3}|}{\pi}\right) \quad (2)$$

Here, $\theta_{E_i E_j}$ is the angle between entities $E_i$ and $E_j$.

Figure 48:
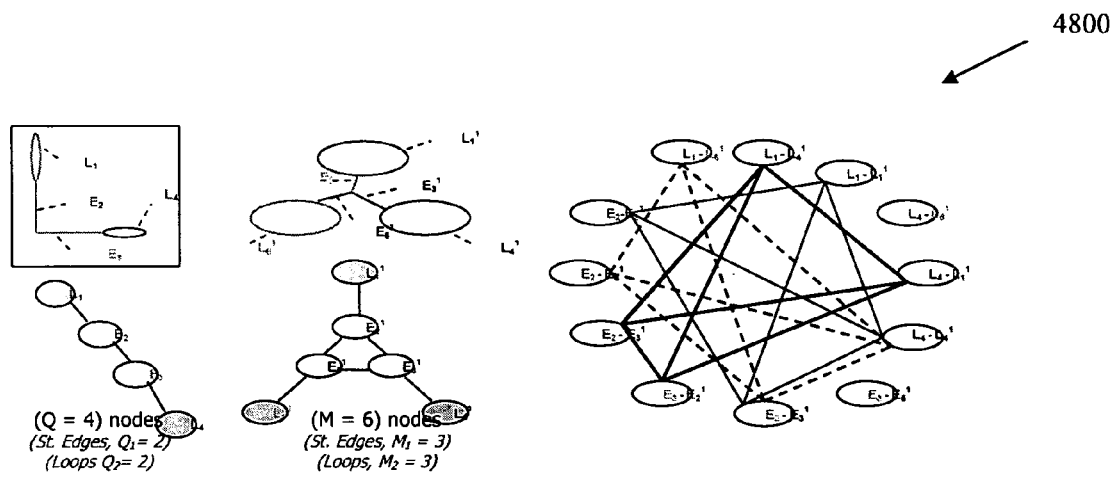
FIG. 48 is a diagram depicting an association graph technique.

$W_{lr}$ is the weight given to the ratio of lengths while $W_\theta$ is the weight given to angles. It is noted that a number of constraints have to be taken care of, in order to obtain valid graph matching. For instance, a given skeletal entity of model A cannot be matched to more than one entity of model B, and vice versa. These constraints are shown in FIG. 48 as ovals. Arcs of the association graph are formed with these constraints in consideration.

Subsequently, the graph matching problem between model A and model B is now posed as a maximum clique problem. Due to the presence of weights in the association graph in the application, the problem is formulated as a maximum-weighted clique problem. The clique with the largest weight, therefore, represents the best similarity between the two graphs. Similarity is therefore the sum of the node weights and the arc weights for a given clique. Hence, the problem of finding the 'best similarity matching' between two models is essentially a combinatorial optimization problem where the objective function is the similarity measure.

A heuristic based Genetic Algorithm is used to exploit the maximal weighted clique of the association graph described above; however, any combinatorial optimization algorithm can be employed for the obtaining the maximal weighted clique. Although approximate algorithms do no guarantee globally optimal solutions for large graphs, they avoid exhaustive search which becomes intractable for large graph sizes. Hence, approximate algorithms are advantageous in various embodiments for optimization while using the approach.

Computational Complexity

The main advantage of using the association graph technique is that it is a simple graph-theoretic structure which is amenable to pure graph-theoretic algorithms such as maximum clique finding. However, construction of the association graph is purely domain dependent. Therefore, the effectiveness of this approach depends on the construction of this graph and subsequent utilization of the graph-theoretic algorithms. It is noted that the maximum clique detection problem is NP-complete. However, the presence of rich geometric information in our skeleton graph will enable us to reduce the average-case complexity of the maximum clique finding problem (MC problem) considerably by eliminating many unnecessary comparisons. The algorithm is designed to utilize heuristics including a) lexicographic ordering of nodes b) size of the previous cliques and c) number of high-level geometric entities (Surface Loops/Holes/Edges) to prune the search space. For example, one can eliminate comparisons of loops with straight edges and curves, or curves with straight edges. Loops in the skeletons essentially represent major holes in the original 3D model. Hence, some of these features implicitly represent the manufacturing features in the original 3D models. This is an illustration of how the use of domain knowledge for graph matching can considerably reduce the average-case complexity. The modifications to the association graph technique permits one to achieve searches on 3D models in a reasonable time. This technique is better illustrated in the following discussion.

Suppose a query graph consists of Q nodes out of which $Q_1$ nodes represent straight edges, while $Q_2$ nodes represent loops. Similarly, let $M_1$ and $M_2$ be the number of nodes representing straight edges and loops, respectively, in the model graph (with a total of M nodes). Let us also assume that $M_1$, $M_2$ and M are individually greater than $Q_1$, $Q_2$ and Q. Hence, we find that the number of comparisons required for sub-graph isomorphism as:

$$\text{Number of Comparisons(w/ } attr) = \frac{M_1!}{(M_1 - Q_1)!} \times \frac{M_2!}{(M_2 - Q_2)!} \quad (3)$$

However, if the node attributes (Surface/Loop/Edge) are not used then the number of comparisons is given by following expression:

$$\text{Number of Comparisons(w/o } attr.) = \frac{M!}{(M - Q)!} \quad (4)$$

It may be observed that a large number of unnecessary (naïve) comparisons are eliminated using the geometric information present in the graph structure thereby reducing the computational complexity of matching. Moreover, the number of nodes which need to be formed in the association graph without this information would be M×Q. However, with the approach we reduce this number to $(M_1 \times Q_1)+(M_2 \times Q_2)$. The aforementioned simplifications reduce the size of our association graphs in the average case, although the worst-case complexity is exponential in the number of nodes in the input graphs. The worst-case occurs when a skeleton is made of the same type of entities (i.e. all loops, all straight edges, etc.). The graph matching algorithms described above can also be extended for shell-like and hybrid parts. Geometric features including 1) convexity 2) radius of curvature of the surface loops can be further used to reduce the search space for these parts.

Geometric Feature Matching

Geometric feature attributes of the skeletal entities are compared in order to provide more accurate measures of similarity/distance between the models retrieved from high level matching. As mentioned above, dissimilar entity types will not be compared for graph similarity metric.

Prismatic Shapes

Bezier curves are used to obtain a parametric equation of the prismatic skeletal entities. This provides an affine invariant measure of the curve shape. An algorithm based on the curvature for curve similarity comparison is used and similar curves have similar curvature profiles. To compare two curves the curves are divided into a defined number of entities and the curvature profile for the curve is the sequence of these curvatures from one end of the curve to the other. A fuzzy measure of similarity is derived from the distance between these two curvature profiles. Equations for the Bezier curve and the curvature at any given point on the curve are provided below.

Fifth-order Bezier curve fitting $$p(t) = \sum_{0}^{n} \binom{n}{i} (1-t)^{n-i} t^i p_i, 0 \le t \le 1$$

n=5
$p_i$—Control Points $$\binom{n}{i}(1-t)^{n-i}t^i$$

—Bernstein Polynomials
Curvature from equation $$\text{Curvature } \kappa = \frac{\left(\frac{d^2 y}{dx^2}\right)}{\left[1 + \left(\frac{dy}{dx}\right)^2\right]^{\frac{3}{2}}}$$

Other embodiments of local shape feature matching compares the volumes and surface areas of the local features that converge to a particular skeletal entity in the final skeleton. Similarly, local moment invariants and edge lengths for the individual features are also incorporated into the similarity metric.

Shell-Like and Hybrid Shapes

Shell-like and hybrid shapes produce different kinds of skeletal entities and hence require a different treatment for comparison. Global geometric features for these entities such as convexity and surface curvature will are used for similarity metrics after fitting parametric Bezier surfaces to the set of voxels forming the surfaces. Finer comparisons, similar to those described for prismatic skeletons can be used for surface entities of shell-like skeletons or wireframe skeleton entities. Surfaces are discretized into a standard number of divisions and the curvature profile as well as individual surface areas may be compared for these surfaces.

Local Emphasis and Relevance Feedback

The weights for the local geometric features such as $W_l$, $W_d$, $W_\theta$ and $W_{lr}$ (Equation 1 and 2) can be used to learn user preferences through relevance feedback thereby reducing the semantic gap between the system and the user. The weights can be learned through standard weight reconfiguration mechanisms described in section 3.6. In addition, the user can also emphasize on a local feature in the 3D solid model or the 3D skeleton model; weights can be attributed to specific skeletal entities thereby allowing the similarity metric to give higher weight to the particular local feature while matching.

Comparison of Different Levels of Detail

The different levels of detail in the Prismatic and Shell-like skeletons are used in the following manner. Each level of detail for a database model is compared with the query skeleton and the level of detail that yields the highest similarity value is considered as the similarity between the query 3D model and the particular model from the database. For clustering of 3D models based on skeletal graphs all the four levels of details for two models are compared with each other to yield the best similarity between the two models. These similarity values are used to cluster the database of models into groups of similar models. Alternatively, the user can specify particular levels of detail of all the models to be used for clustering in which case that particular LOD is used for clustering.

Parallelization

The graph matching step is parallelizable since this process takes the query graph and the graphs from the database and compares each of them individually. For the high-level graph matching step, the automatic clusters may be used to reduce the number of comparisons. Hence, each of the prototype models for each cluster is compared with the query graph. Subsequently, the cluster whose prototype is closest to the query graph is used for further search. The hierarchical cluster can thus be used to reduce the search space. When the search has reached to a reasonable state where the number of models in the next cluster is reasonable (to enable real-time search), the low-level graph matching can be parallelized, thereby optimizing the search time.

Distinction Over Conventional Systems:
Separation of Geometry and Topology.
Hierarchical graph matching.
Inclusion of high-level geometric features in adjacency matrix.
Parallelization of graph matching in conjunction with automatic clusters.

3.2. Multidimensional Index

With the proliferation of 3D models existing in companies, there is an urgent requirement for indexing the database to enable efficient retrieval. Unfortunately, it is presently mission impossible for the widely used index structures, such as B+ tree and hash table, to sufficiently improve efficiency in searching 3D models, although they have been widely used in commercial database system. Engineers who work in 3D model similarity focus on 3D shape matching of a few models more than shape searching of a database. Their approaches are hard to scale to database.

Thus, embodiments presented herein have developed an index structure that can index the database by the similarity of the models. This structure simultaneously uses the information of each element of feature vectors to evaluate the shape similarity. An innovative and novel method computes the overall similarity by combining the similarities supplied by the indexes of different features. The combining method coordinates the progression of the search in each index.

The index structure is implemented as a tree-based multi-dimensional index. Multidimensionality is important for the 3D model database, because the overall similarity is defined by the combination of these feature elements. Moreover, using feature element as filter is inappropriate in the context of searching 3D models.

Figure 49:
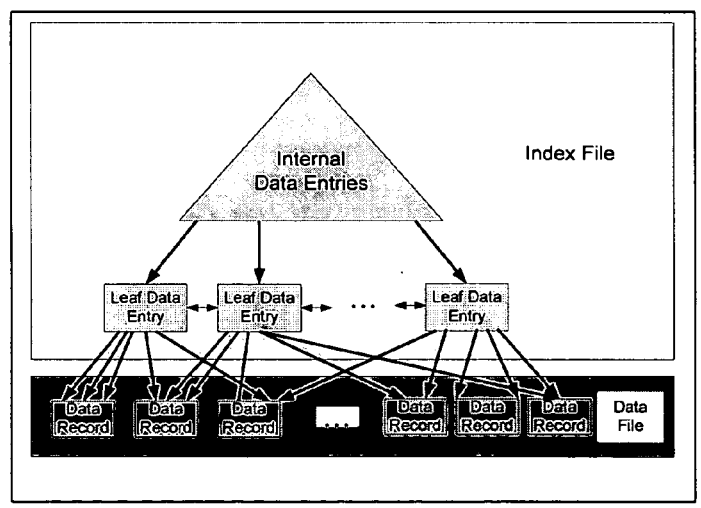
FIG. 49 is a diagram depicting a tree-based multidimensional index.

The structure of index structure is illustrated in FIGS. 49 and 50. The leaf nodes contain the representations of 3D models and the internal nodes help find a short path to the leaf nodes. Feature vectors that represent 3D models are grouped into leaf data nodes by their similarity. Each data node is represented as a containing box that stores the overall information of the models. Internal nodes are built to index leaf nodes. The abstract information of each node determines if similar models are possibly located in this data node. Thus, nodes are pruned and whole sub trees rooted at these nodes during a search phase.

FIG. 51A is a preliminary index structure of 39 models. FIG. 51B shows the content in two leaf data nodes. It shows that the present index sufficiently groups the models by their similarity. Furthermore, algorithms are developed that efficiently use multiple multidimensional indexes to compute the similarity. The 3D models are represented as multiple features. Each feature has a corresponding multidimensional index. The overall similarity is computed with the similarity retrieved from each index. The efficiency of the multidimensional index is determined by the ability to prune the search tree. The pruning ability is in turn depends on the search criterion, which is the radius from the query point. The algorithm coordinates the search in each index and endeavors to minimize the radius for the search in each index. These algorithms have greatly improved the pruning ability and the efficiency of the multidimensional indexes.

In order to ensure to similar models are grouped together, a SOM is used to preprocess the feature vectors and cluster similar models. The indexes are built as bulk-loading of these clustered models. This greatly improves the quality of multidimensional index, because it ensures the data nodes in the index group models by similarity. If a sufficient number of models are inserted in the database and corrupt the quality of index, a SOM is used again and reconstructed the index.

3.3. Feature Vector Comparison

Current search systems usually use single type features that are not sufficiently capture the intrinsic characteristics of 3D models. Even a few techniques use combinational feature vectors; the internal relationships between these features have not been fully understood. A linear combination is simple but commonly used to compute the overall similarity based on that of each feature, irrespective of their relationships.

Correspondingly, in embodiments of this invention, more and intrinsic feature vectors are extracted to capture the important characteristics of 3D models. Better understanding the relationships of feature vectors enabled one to develop more advanced methods to compute the overall similarity based on those defined on individual features.

Figure 52:
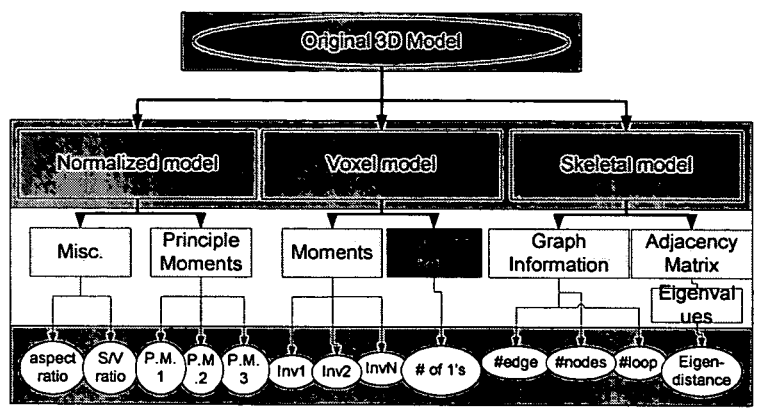
FIG. 52 is a diagram depicting feature vectors.

The present invention uses a system that is a feature-based 3D model search system. It uses low-level features instead of high-level keywords to represent the complex geometry. The original 3D models were processed which generated different models with different level of details. From these models, the statistical, spatial, and temporal information are extracted as features that representing 3D models. FIG. 52 is the feature vectors that are currently used in embodiments of the present system. These feature vectors are the numeric finger-prints of the original 3D models. The comparison and searching of 3D models are applied on these finger-prints, because the searching the original models is intractable.

Figure 53:
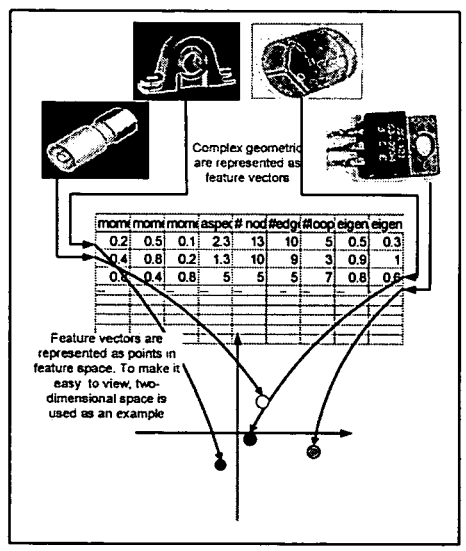
FIG. 53 is a diagram depicting models as points in feature space.

Considering feature elements as coordinates, a 3D model is further represented as a point in the multidimensional feature space which is illustrated in FIG. 53 using a two dimensional space as an example.

Considering a model as a data point in the feature space, different distance defined on the coordinates is used to measure the similarity of the models. For example, the Euclidean distance L2, Maximum metric L∞, and Manhattan metric L1 are used. The equations to compute these distances are listed as follows.

Based on these similarity definitions, the similarity measure for each feature is computed. Not like feature-based image search, some of the features in the system are not totally independent. Therefore, when the overall similarity based on feature similarities is computed, more complex combination methods besides linear combination are used. These methods include quadratic, cubic and even a complex function represented by neural network. Furthermore, graph matching is used with together with feature based similarity search. The feature representation is described here and graph representation is introduced in graph matching section.

Instead of using a one-step searching method, which uses all the feature vectors simultaneously to search the database, the search is simulated as a decision tree. Based on cognitive psychology research, some selective features are included, such as aspect ratio and symmetric information. In other embodiments, some other more advanced features can be used. Furthermore, features that have been previously used can be used subsequently.

The advantages of this retrieval system are: (1) it is an objective approach, since all the features are intrinsic values that are computed by the system objectively. The representation of the models in the databases is determined by the feature-extraction algorithms. The representations of CAD models in the system are unbiased by any user. Thus, the system has a neutral version of features for all users. (2) It is easy to automate, since all of the information is objective. Algorithms can be developed which are computed from the CAD models, without any involvement from the users. (3) It is more accurate to quantify the degree of the similarity than the keyword-based retrieval system. Since each feature is in a term represented by a scale number (usually 0-1), the similarity can be easily characterized by some mathematical operation. As long as the system has extracted enough information from he CAD models, the system will successfully retrieve the similar models.

The main disadvantages lie in the difficulty in defining the feature vectors that are suitable for filtering all dissimilar models while retaining all the similar ones. However, a multi-step search strategy (described in section 3.8) adopted with embodiments of this invention allow the user to experiment with different feature vectors to achieve the desired set of models.

3.4. Clustering Techniques

Figure 54:
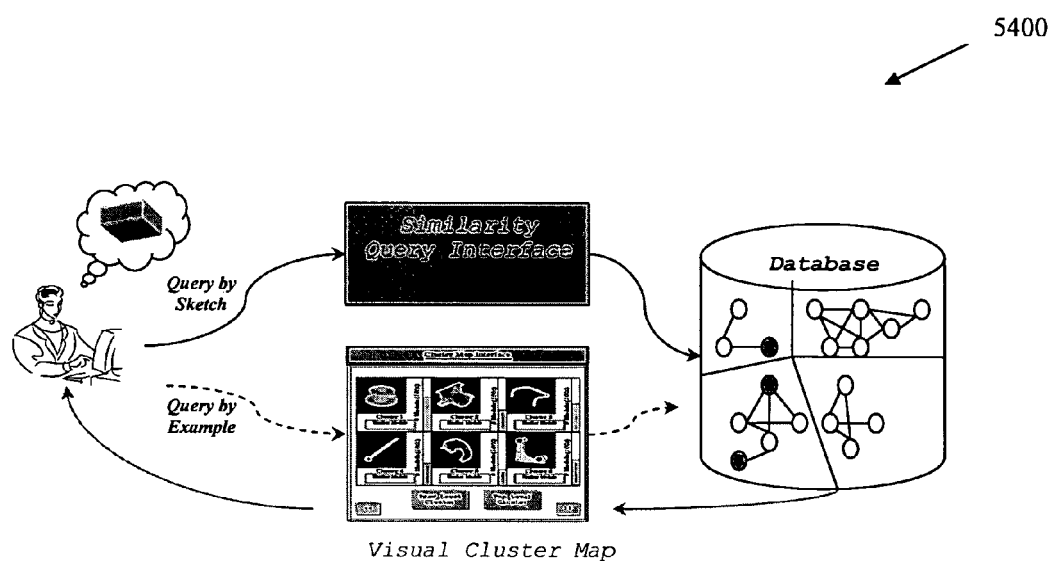
FIG. 54 is a diagram depicting a visual interface for a part cluster map.

Embodiments of the present invention allow the user to easily browse through different models in the database to find parts similar to his/her requirements. A portion of the visual query interface is dedicated to facilitate this functionality. The interface can be visualized to be working in two different scenarios (see FIG. 54). In the first case the user may only have formed a mental idea of the 3D model and accordingly wants to browse through the parts available in the database and pick the relevant parts. In order to make this search efficient, a hierarchical part cluster map of all the models in the database is provided which is updated dynamically with the addition of new models to the database. Each part cluster in a higher level cluster will point to a number of clusters in the next level and so forth. In the other scenario, the user may input a query model from the sketching interface, and all the parts that are found similar to the query are retrieved. Each of the retrieved models shows a link to the cluster that it belongs, thereby allowing further browsing. The corresponding link can be followed to browse the cluster to which the model belongs.

Clustering algorithms are extensively used in the field of knowledge discovery and data-mining, the most important of which are hierarchical clustering, k-clustering and Self-Organizing Maps (SOMs). Of these different algorithms, the SOMs are the easiest to implement and also allow for easy visualization and interpretation of the clusters. A SOM is a neural network algorithm that is based on unsupervised learning. It consists of a layer of computational units, often called neurons that adapt themselves to a population of input patterns. Upon presenting an input pattern the neuron that is closest to this pattern is determined (called the winning neuron) and then updated to include the new pattern, while some of the neighboring nodes are updated to move closer to the winning neuron. The SOM has properties of both vector quantization and vector projection algorithms, thereby allowing projection of data in higher dimensions to lower (typically two-dimensions) which is amenable for visualization. This feature is advantageous with embodiments of this invention because it assists in developing a useful visual interface for the user to browse through the models. A SOM also allows dynamic updating of the cluster map with addition of new parts to the database.

Figure 55:
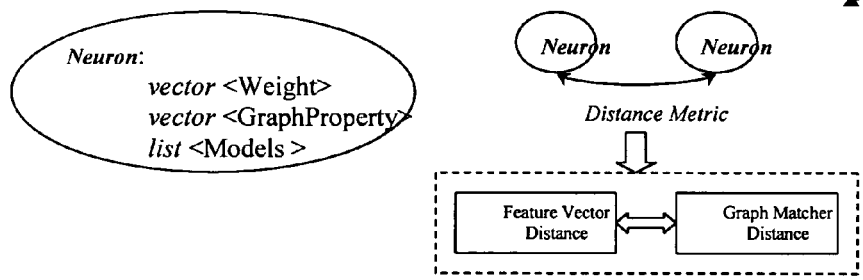
FIG. 55 is a diagram depicting a Self Organizing Map (SOM) data structure.

Traditionally SOMs have been used only with feature vectors. Only recently, have there been attempts to use the SOMs with more powerful data structures such as graphs and trees for use with pattern recognition tasks. These attempts have used a graph distance metric based on graph edit distance which is used update the neurons in the SOM. Conversely, the embodiments of the presenting invention uses a combination of (a) feature vectors obtained from the 3D model and (b) graph distance measure distances obtained from graph comparison. Hence, the neuron is designed to contain all the feature vectors as well as a representative graph of the 3D skeleton (see FIG. 55). The SOM is updated to show the new cluster map (1) with different similarity definitions configured by the user (2) with addition of new models to the system. This interface is useful in quickly evaluating the (1) similarity metrics proposed in this invention and (2) metrics proposed in prior techniques for comparing 3D models. The distance metric between two neurons can be any of the standard vector distances such as Euclidean, Manhattan distance, etc.

Distinction from Prior Techniques:

1. Inclusion of graph properties in SOM neuron data structure.

2. Use of SOM for clustering 3D models based on skeletal graph.

3. User interaction in forming similarity definition for clustering.

3.5. Cluster Map Interface

Figure 56:
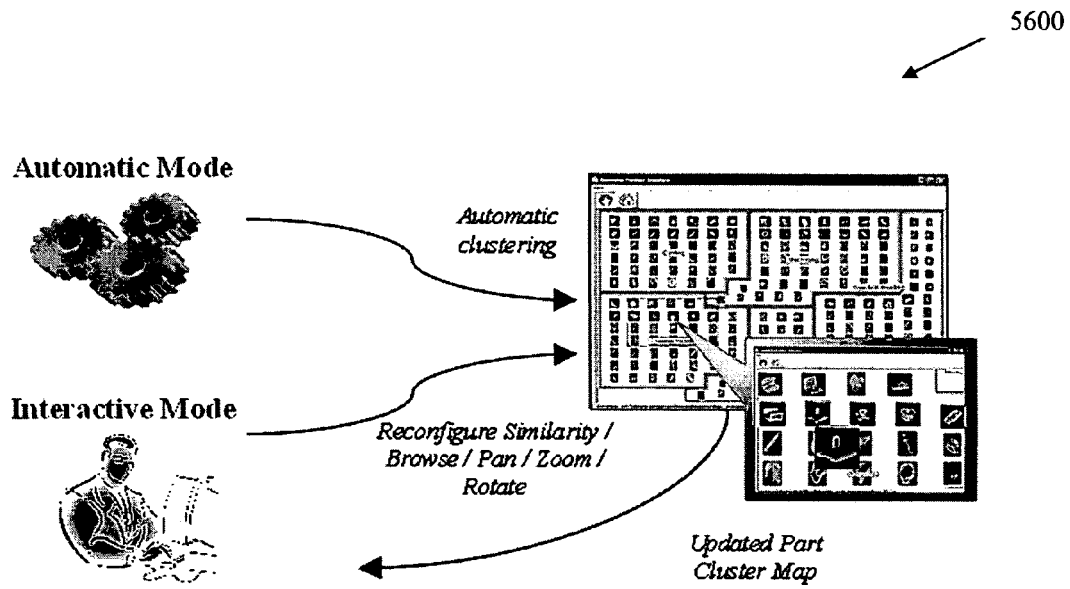
FIG. 56 is a diagram depicting a cluster map interface.
Figure 57:
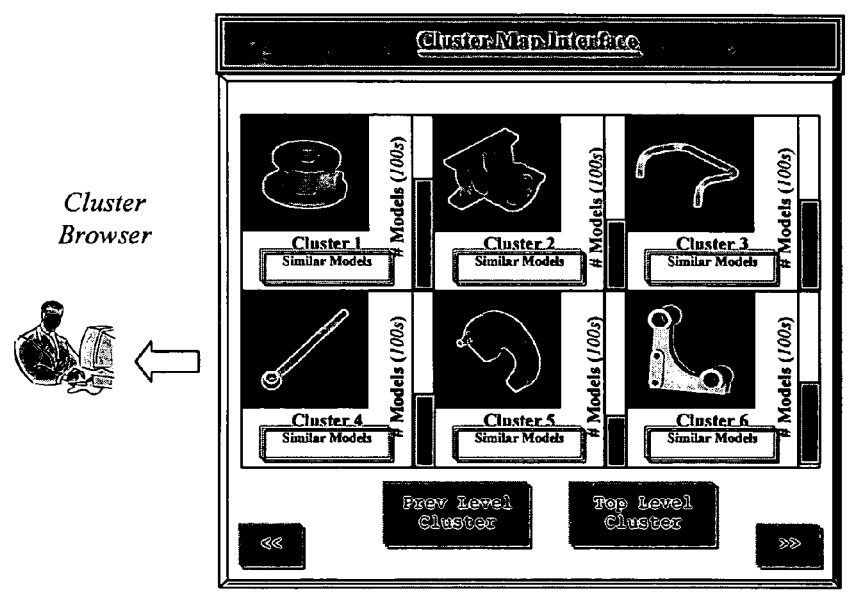
FIG. 57 is a diagram depicting a cluster map with automatic clusters for browsing.

The cluster map interface is the main visual output interface for the search system. The interface works in two scenarios 1) Automatic 2) Interactive. FIG. 56 illustrates the two different paths for the two situations. In the automatic mode, the database models are classified into various clusters automatically, based on the default similarity metrics defined in the system. The cluster map (FIG. 57) presents representative 3D models to the user on a part cluster window allowing the user to pan, zoom and rotate the model with buttons and mouse motion. The field to the right of each picture shows a bar graph of the number of models present in the particular cluster. Further browsing in a cluster is allowed by clicking the "Similar Models" button. In the interactive mode the user 1) communicates his similarity measure by reconfiguring the feature vectors and 2) also browses the hierarchical database to search for the model he has in mind. The part cluster map is updated accordingly and presented to the user through the cluster map interface.

Figure 58:
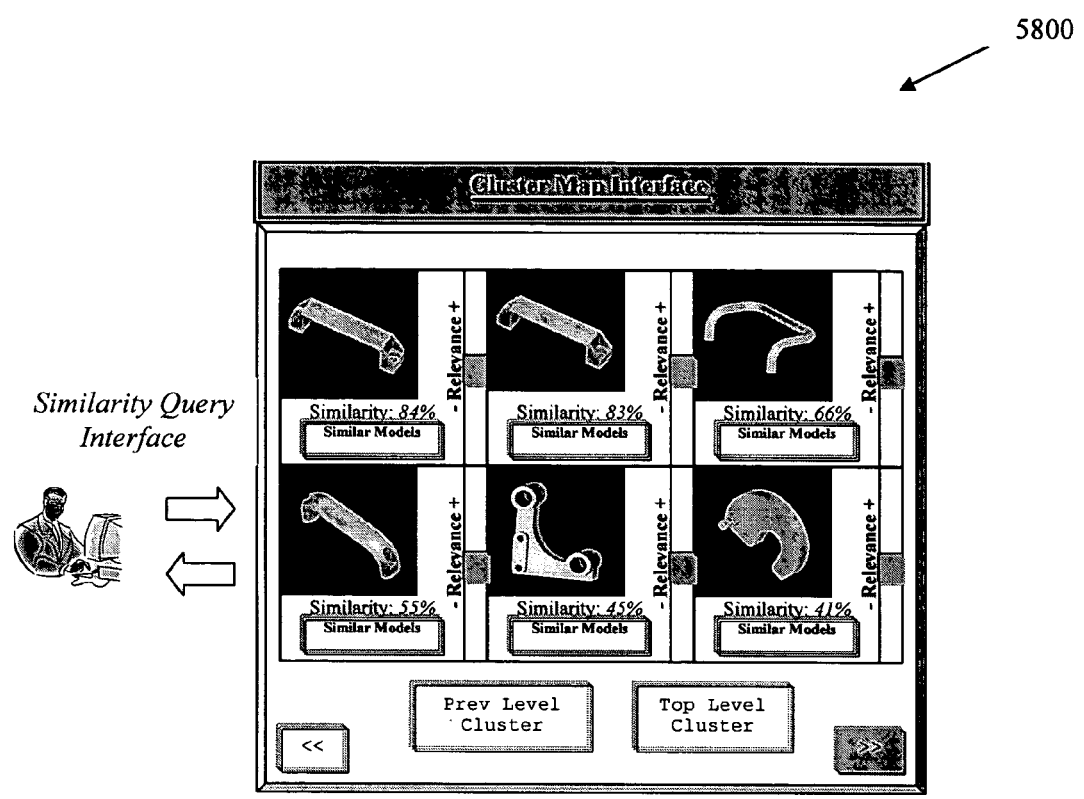
FIG. 58 is a diagram depicting a cluster map after performing a similarity query.

The cluster map interface is also used to represent the similar models retrieved after submitting a search query (FIG. 58). Each of the models, retrieved from similarity query, provides a link to the cluster it belongs to, through the "Similar Models" button. The degree of similarity of each retrieved model is also presented to the user as a percentage measure. Each model is also provided with a slid bar to give relevance feedback to the system for neural network learning.

3.6. Relevance Feedback

The retrieval system only measures the similarity in terms of the low level feature vectors. However, a user's similarity is based on his perception. Since the 3D models are complex objects it is challenging to extract features that accurately represent the 3D models. There is a "semantic gap" between the similarity definition of low level feature vectors and the high level 3D models.

Conventional 3D shape search systems search models are based on predefined similarity measures and one-shot mechanism. The semantic gap of similarity between users and system seriously corrupts the performance of these conventional systems.

However, relevance feedback is an important way to improve the communication between users and the system. It is a bridge between the two semantic planes on which the system and users similarity definitions lie, respectively. The relevance feedback greatly reduces the burden for the users to accurately construct a query and to choose the features for similarity measure. In addition, it enables the search system to learn from the communication and reconfigure the system based on the communications.

An example procedure consists of the following steps: (a) when the system retrieves some models based on the query example, it orders them by similarity measure of feature vectors and presents them to the user. (b) Users classify them into relevant and irrelevant groups and inform the system. (c) The system, in turn, configures itself to respect the user's preference and redo the search. (d) This process iterates for sometime until either the user is satisfied or the system thinks that it cannot make it better.

Figure 59:
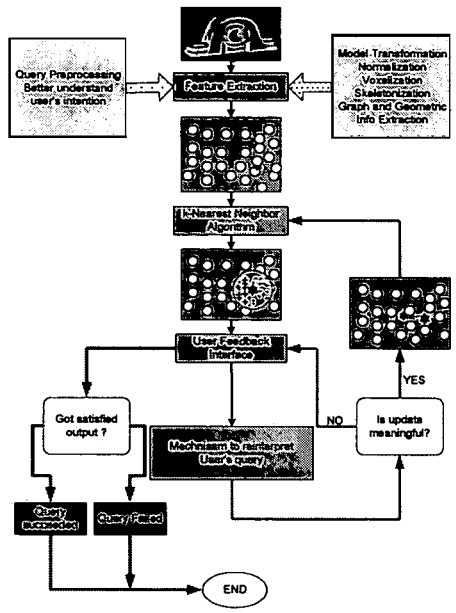
FIG. 59 is a diagram of a flowchart depicting a method for relevance feedback.

FIG. 59 illustrates the procedure of relevance feedback. Different methods to use the information in user's relevance feedback can also be implemented and are intended to fall within the generous scope of the present invention. The methods are based on computational geometry and simulating social behavior, such as particle swarms.

The presented methods enable communication of users and the system, thus bridging the semantic gap of similarity. In addition, algorithms are developed that reconstruct a query vector and reconfigure the system based on the relevance feedback.

Search results are presented on the interface so that a user can tell the system what the relevant and irrelevant models are from his/her point of view.

Algorithms are developed that reconfigure the search system, based on the information of relevance feedback. This is important for any successful search system, because different users may have different perception about the similarity of 3D models. Initially, the system is configured to reflect the similarity of most users, for example, it can find models that 90% users think similar. When a user is using the system for searching, his/her relevance feedback is used to fine reconfigure the system. From feedback, the system can use feature vectors that the user are more interested in and reconfigure the system to reflect user's preference. Also, the system can reconstruct the query vector based on the initial query vector and the relevance feedback.

3.7. Learning Agents

Although relevance feedback is an effective way to bridge semantic gap, it is time consuming. Even for the same model, if user submits as query model again, the time-consuming relevance feedback has to be done again.

Figure 60:
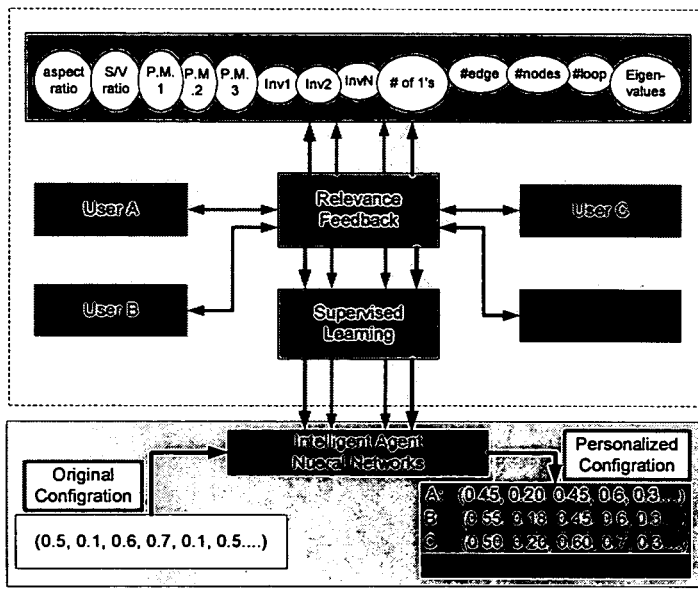
FIG. 60 is a diagram of a technique for customization based on relevance feedback.

Thus, techniques for embodiments of this invention implement artificial intelligence-neural networks-to learn from user's relevance feedback. This technique enables the customization of the system to different users and input query models without changing the content of database and index structures. It is a layer above the index for learning and customization. FIG. 60 illustrates one such method.

Neural networks are deployed to learn and identify the patterns in a user's relevance feedback. The key point is to implement network systems that can be trained fast, such as a neural network. A multi-layer feed-forward neural network system was used for some embodiment of this invention. Algorithms from social behavior-particle system, and back-propagation can be used to initially train the neural network.

A learning agent is used to quickly reconstruct the query vector that better represents a particular user's intention. Because of the semantic gap, it is difficult for a user to submit a query with low level feature elements. Query by example may only let a user give a rough idea about his/her intention. Therefore, the query vector is refined to better interpret a user's intention. Relevance feedback that a user has done is used as a training example, if the user activates the learning agent. The goal is to directly reconstruct a query vector based on a user's searching history and currently submitted query. The key points include detecting the maturity of neural network, and avoiding over-fitting.

A learning agent can also be used to reconfigure the search system, i.e., reconfigure the weights of the feature elements. If a stable pattern is identified, then the system can be reconfigured to reflect a user's view about the relative importance of features. The goal here is also to save the time for relevance feedback. The advantages of introducing learning agent are: a) to separate the query reconstruction and weight reconfiguration during the relevance feedback, b) to customize the system for different users and/or different queries submitted by the same user.

What makes the neural network an important contribution is that it can customize the system to both users and the query input. The following is an example that shows why the weight setting may depend on input in some cases.

Figure 61:
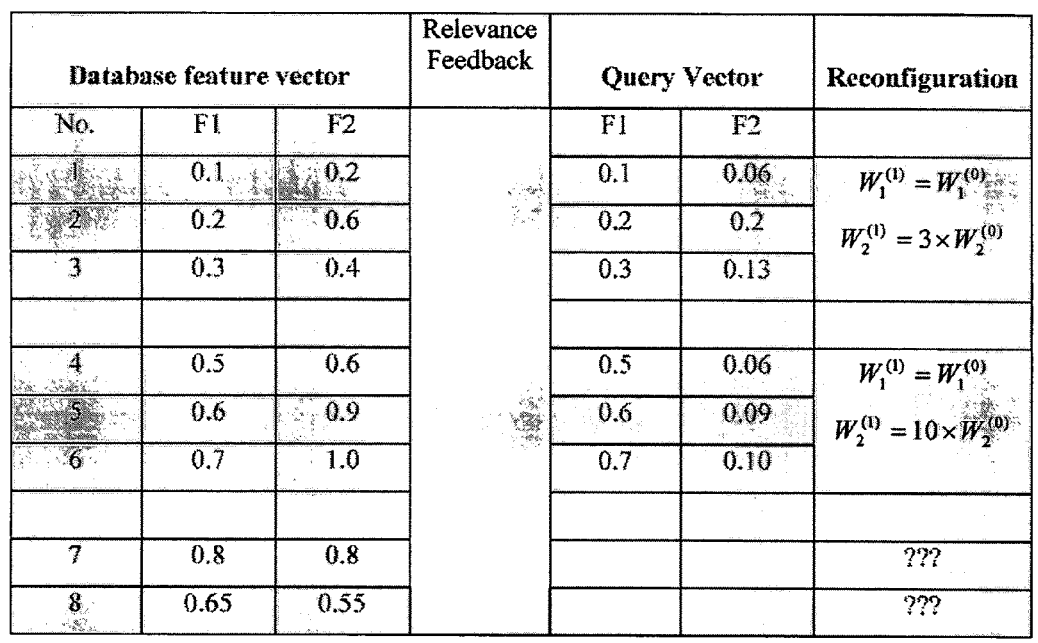
FIG. 61 is a diagram of a matching technique between data store vectors and query vectors.

Suppose the feature vector consists of two elements. One is F1 and the other is F2. FIG. 61 shows feature vectors in the database on the left side of the table. The user's query vectors are on the right side of the table. The arrows show the matching between the user's query inputs and those in the database. This matching can be discovered by the user's relevance feedback.

Based on the first three relevance feedback, it is reasonable to reconfigure the weights as $W_1^{(1)}=W_1^{(0)}$ and $W_2^{(1)}=3\times W_2^{(0)}$. However, based on the second three relevance feedbacks, the system is reconfigured to $W_1^{(1)}=W_1^{(0)}$ and $W_2^{(1)}=10\times W_2^{(0)}$. In other words, the reconfigurations depend on the scope where F1 lies in. If one weight is simply assigned, the accuracy of the system can be far from satisfactory for some of the models, although it may work for some others.

3.8 Multi-Step Search Process

A true search system should allow a user to find a model which he/she is looking for, instead of presenting a set of models based on a predefined similarity metric. Towards this end the embodiments of this invention incorporate a multi-step search strategy to allow the user to search for a part using different matching criteria. For example, a user can search the database using skeletal graphs in the first step of the search, which will retrieve topologically similar models. Subsequently, a different metric, say the total volume, can be used to filter out the retrieved models. This allows the user to use Boolean operations for the search criteria, thereby retrieving a relevant part quickly.

The multi-step approach is the first of its kind proposed for a 3D shape search system in general and for the engineering domain in particular.

Figure 62:
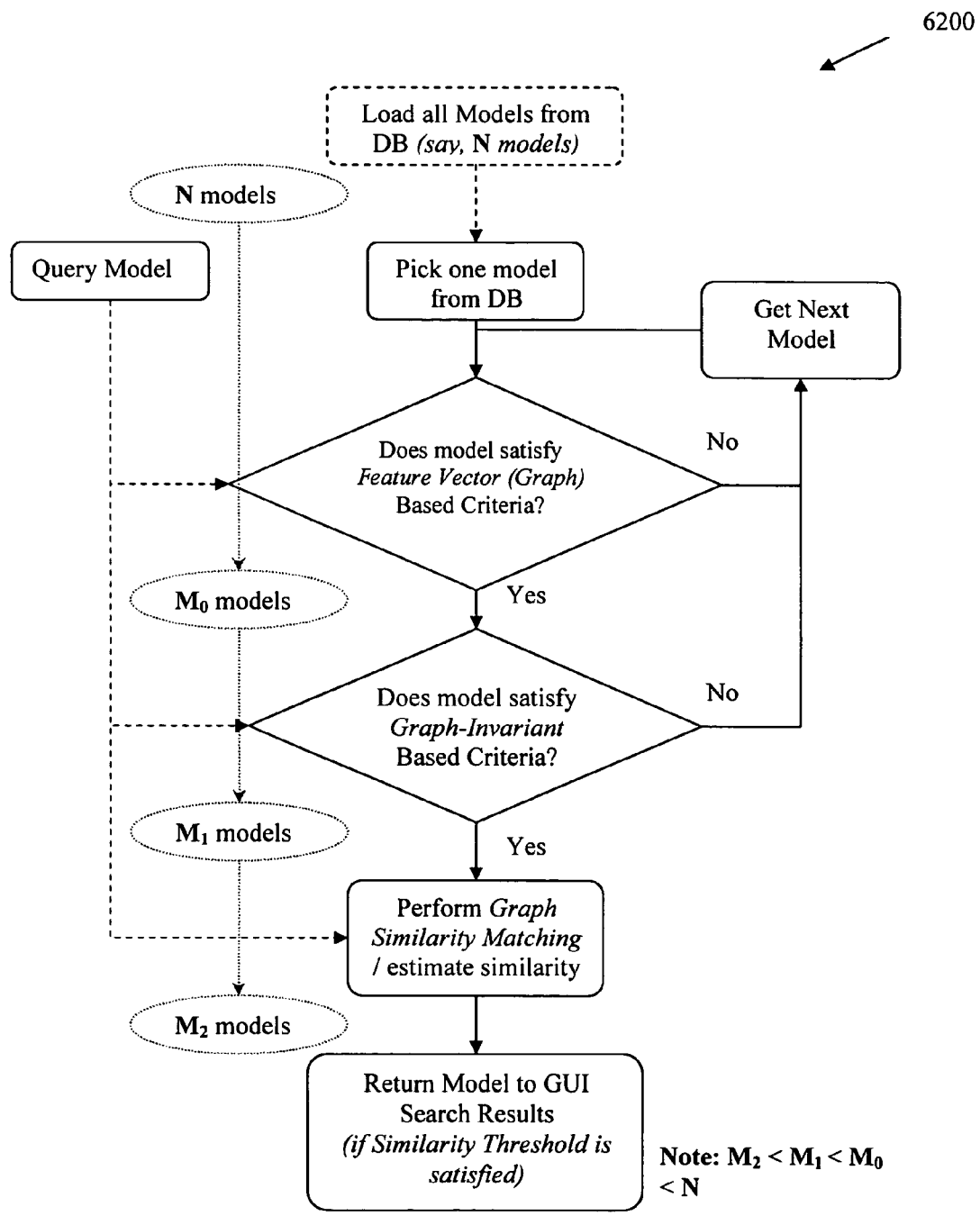
FIG. 62 is a diagram depicting an example method for a multi-step search process.

Embodiments of the present invention's system allow incorporating similarity invariants as well as Skeletal graphs for the multi-step search. One instance of such a multi-step search process is presented in FIG. 62:

a. Various feature vectors (viz. Moments invariants, Eigenvalues of skeletal graphs, Geometric parameters) are used to reduce search space (Database with N models) to small number, $M_0$, where $M_0 < N$.

b. Skeletal Graph-Invariants (<Degree of Nodes>, <Number of L, E and C>, <Number of L-L, L-E, E-E connections>, etc.) used to further reduce search space, to say $M_1$, where $M_1 < M_0$.

c. Inexact Graph Matching is performed to further reduce the search space and for ordering the search results on this smaller set of models, $M_2 < M_1$.

d. User interacts with system in the following steps to reduce search space (if necessary)
      i. Specify Invariants-based criteria for reducing search space.
      ii. Use Boolean operations on search criteria.
      iii. Specify Similarity Threshold criteria for final results.

FIG. 63 depicts a particular search result from multi-step refinement where the initial query was posed using the skeletal graph-based similarity and the results were refined using moment invariants to retrieve the relevant models.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for searching, comprising:
receiving a three dimensional object;
searching one or more data stores with the three dimensional object as a first search query;
presenting results from the search, wherein the results include an answer set;
dynamically receiving modifications for one or more items in the answer set; and
re-searching the one or more data stores with the modifications associated with the one or more items as a second search query.

2. The method of claim 1 further comprising, converting the three dimensional object into a graph skeleton defining a graph data structure, wherein the graph data structure is the first search query.

3. The method of claim 1 wherein the receiving the three dimensional object further includes interactively permitting the three dimensional object to be sketched.

4. The method of claim 1 wherein the receiving the three dimensional object further includes presenting a list of three dimensional models and permitting the three dimensional object to be formed from selective ones of the list of three dimensional models.

5. The method of claim 1 wherein the presenting the results further include grouping selective portions of the one or more items in the answer set into related clusters.

6. The method of claim 5 further comprising, selecting a cluster to allow further browsing within that selected cluster.

7. The method of claim 1 further comprising, receiving one or more filters which constrain the first or second search queries.

8. The method of claim 7, wherein one said filter comprises a total volume filter.

9. The method of claim 1 wherein the re-searching further includes identifying in the modifications for the one or more items information that identifies selective ones of the items that are more relevant to the first search query than selective other ones of the items.

10. A method of searching, comprising:
receiving a two dimensional object;
mapping the two dimensional object to a three dimensional representation;
searching one or more data stores with the three dimensional representation as a first search query; and
presenting one or more items in an answer set that is responsive to the first search query of the one or more data stores.

11. The method of claim 10 wherein the mapping further includes:
representing the two dimensional object as a two dimensional skeleton;
converting the two dimensional skeleton into a three dimensional skeleton; and
representing the three dimensional skeleton as a three dimensional graph structure, wherein the three dimensional graph structure is used as the first search query.

12. The method of claim 10 further comprising:
receiving relevance indications for a selective number of the one or more items in the answer set; and
searching the one or more data stores with the selective number of the one or more items and the relevance indications as a second search query.

13. The method of claim 12 retaining the relevance indications as preferences for subsequent search queries received and processed, where the retained relevance indications are used as filters to subsequent first queries.

14. The method of claim 10 further comprising organizing the answer set as a plurality of related clusters, wherein each related cluster includes a selective number of the one or more items.

15. The method of claim 10 wherein the mapping further includes:
converting the two dimensional object into a two dimensional skeleton;
generating candidate three dimensional vertices for each of two dimensions of the two dimensional skeleton;
generating candidate three dimensional edges from the candidate three dimensional vertices;
creating candidate three dimensional faces from the three dimensional edges on a same surface;
creating one or more three dimensional objects from the candidate three dimensional faces; and
associating the one or more three dimensional objects with the received two dimensional object as the three dimensional skeleton.

* * * * *